(12) United States Patent
Northrup

(10) Patent No.: US 6,671,713 B2
(45) Date of Patent: *Dec. 30, 2003

(54) EXECUTION OF DYNAMICALLY CONFIGURED APPLICATION SERVICE IN ACCESS METHOD-INDEPENDENT EXCHANGE

(76) Inventor: Charles J. Northrup, 4 West Ave., Old Bridge, NJ (US) 08857

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,263

(22) Filed: Dec. 14, 1998

(65) Prior Publication Data

US 2003/0101211 A1 May 29, 2003

Related U.S. Application Data

(63) Continuation of application No. 08/353,905, filed on Dec. 12, 1994, now Pat. No. 5,850,518.

(51) Int. Cl.[7] .............................................. G06F 15/14
(52) U.S. Cl. ....................... 709/203; 709/204; 709/205; 709/105; 709/106; 709/107
(58) Field of Search ................................. 709/203, 105, 709/106, 107, 201, 204, 205

(56) References Cited

U.S. PATENT DOCUMENTS

| 4,918,646 | A | | 4/1990 | Hirose ............................ 707/3 |
| 4,989,139 | A | | 1/1991 | Friedman et al. ............ 364/200 |
| 5,475,819 | A | * | 12/1995 | Miller et al. |
| 5,485,617 | A | * | 1/1996 | Stutz et al. |
| 5,548,726 | A | | 8/1996 | Pettus .................... 395/200.09 |
| 5,548,745 | A | * | 8/1996 | Egan et al. |
| 5,606,493 | A | * | 2/1997 | Duscher et al. |
| 5,634,127 | A | * | 5/1997 | Cloud et al. ................. 395/680 |
| 5,754,857 | A | * | 5/1998 | Gadol ......................... 395/680 |
| 5,838,906 | A | * | 11/1998 | Doyle ......................... 709/202 |
| 5,941,949 | A | | 8/1999 | Pedersen ..................... 709/227 |
| 5,960,420 | A | * | 9/1999 | Leymann et al. ............... 707/1 |
| 6,029,201 | A | | 2/2000 | Neill ........................... 709/228 |
| 6,049,799 | A | | 4/2000 | Mangat et al. ................ 707/10 |
| 6,157,944 | A | | 12/2000 | Pedersen ..................... 709/204 |

* cited by examiner

Primary Examiner—Frantz Jean
(74) Attorney, Agent, or Firm—Elman Technology Law, P.C.; Gerry J. Elman

(57) ABSTRACT

The present invention provides a virtual network, sitting "above" the physical connectivity and thereby providing the administrative controls necessary to link various communication devices via an Access-Method-Independent Exchange. In this sense, the Access-Method-Independent Exchange can be viewed as providing the logical connectivity required. In accordance with the present invention, connectivity is provided by a series of communication primitives designed to work with each of the specific communication devices in use. As new communication devices are developed, primitives can be added to the Access-Method-Independent Exchange to support these new devices without changing the application source code. A Thread Communication Service is provided, along with a Binding Service to link Communication Points. A Thread Directory Service is available, as well as a Broker Service and a Thread Communication Switching Service. Intraprocess, as well as Interprocess, services are available. Dynamic Configuration Management and a Configurable Application Program Service provide software which can be commoditized, as well as upgraded while in operation.

89 Claims, 114 Drawing Sheets

VPEINIT :

VAPINIT :

MAIN : Rule-A

DONE : Rule-C

VAPDONE :

VPEDONE :

Rule-A : Rule-B

Rule-B :

Rule-C :

| 7. Application Layer |
|---|
| 6. Presentation Layer |
| 5. Session Layer |
| 4. Transport Layer |
| 3. Network Layer |
| 2. Data Link Layer |
| 1. Physical Layer |

Figure 11.

```
PROCEDURE make_target(target)
        for each prerequisite of target
                create a thread to execute PROCEDURE make_target(prerequisite)
        end_for
        for each thread created
                wait for thread to complete
                if the return code from this thread is ERROR
                then
                        return ERROR
                end_if
        end_for
        if target already exists
        then
                CALL PROCEDURE get_time_stamp(target)
        else
                target's time stamp is zero
        end_if for each prerequisite of target
        do
                if the prerequisite's time stamp is newer then the target's
                then
                        trigger the action to build the target
                        if the action completed with an ERROR condition
                        then
                                return ERROR condition
                        end_if
                        CALL PROCEDURE get_time_stamp(target)
                        break out of this for loop
                end_if
        end for_do
        return SUCCESS

END_PROCEDURE
```

Figure 12.A

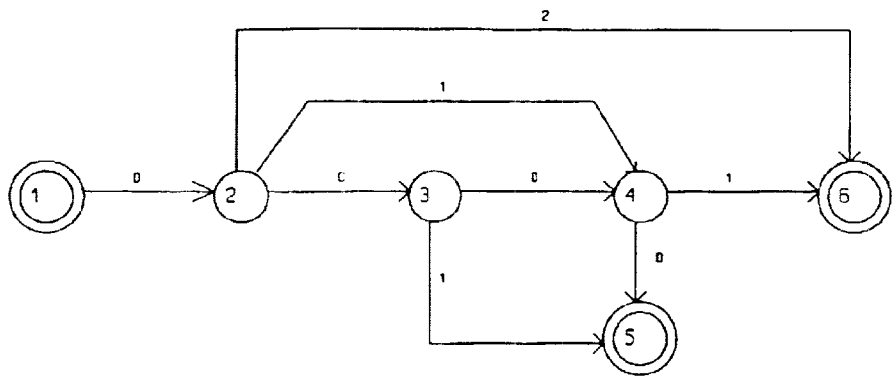

Figure 12.B.1

DEFINE MAKE_STATE_MACHINE

STATE 1
    STATE THREAD make_target( target )
        for each prerequisite of target
        do
            ATTACH prerequisite to MAKE_STATE_MACHINE
        end_for_do
        retrieve time stamp associated with target
        return transition code 0

STATE 2
    STATE THREAD synchronize(target)
        for each immediate prerequisite
        do
            wait for prerequisite to complete MAKE_STATE_MACHINE
            if the prerequisite's ending state was ERROR (STATE 7)
                return transition code 2
            end
        end_for_do
        if target does not exist

Figure 12.B.2

```
                    return transition code 1
        end_if
        return transition code 0

STATE 3
    STATE THREAD check_prerequisites(target)
        set transition code to 1
        for each prerequisite of target
            if prerequisite's time stamp is newer then the target's
            then
                    set transition code to 0
            end_if
        end_for
        return transition code STATE 4
    STATE THREAD construct_target(target)
        trigger action to construct the target
        if the action completed successfully
        then
                set transition code to 0
        else
                set transition code to 1
        end_if_else
        return transition code STATE 5
    ENDING STATE
        success STATE 6
    ENDING STATE
        error condition

END MAKE_STATE_MACHINE
```

Figure 13.A.

Commands Used to Compile Binder Example.
```
$ cc -G -D_REENTRANT foo.c -o foo.so
$ cc gbinder.c m.c object.c shared.c -o binder.test
```

Figure 13.B.

Running Binding Service Example.
```
./a.out foo.so foo
```

Figure 13.C.

Sample Output from Binding Service
```
$ ./binder.Test foo.so foo
foo.so is bound using method shared library
shared library [foo.so]is now open
[foo.so] is BOUND
foo is not a [shared library] type
foo is bound using method shared object
Located object [foo]
[foo] is BOUND
$
```

Figure 13.D.

Simple Services.
foo.c Page 1
```
1
2   int
3   foo(char *name)
4   {
5           printf("foo: name is %s\n", name);
6           return(0);
7   }
```

Figure 13.E.

Registering Binding Method and Binding Arbitrary Named Representatives.
main.c Page 1

```
1    #include <stdio.h>
2
3    #include "bind.h"
4    #include "shared.h"
5    #include "object.h"
6
7
8    main(int argc, char *argv[])
9    {
10           int     i = 0;
11           char    *cp;
12           int     status = 0;
13
14           RegisterMethod(&sharedBind_f,"shared library");
15           RegisterMethod(&objectBind_f,"shared object");
16
17           for(i=1; i<argc; ++i ) {
18                   status= Bind(argv[i]);
19                   if( status & BOUND )
20                           printf("[%s] is BOUND\n", argv[i]);
21                   if( status & FOUND )
22                           printf("[%s] was located\n", argv[i]);
23           }
24   }
25
```

Figure 13.F.

Header File Declaring Binding Method.
object.h Page 1

```
1
2    extern bind_f_t objectBind_f;
```

Figure 13.G.1

Examples of Pattern, Transformation, Locate, Status and Query for a Shared Object in a Shared Library.

object.c Page 1

```
 1
 2   #include <malloc.h>
 3   #include <unistd.h>
 4   #include <dlfcn.h>
 5   #include "bind.h"
 6   #include "shared.h"
 7
 8   static int
 9   ObjectPattern(char *pattern)
10   {
11           char    *c;
12           int     l, m;
13
14           c = pattern;
15           l = strlen(pattern);
16
17           m = 0;
18
19           while( *c && l > 2 ) {
20                   if( c[0] == '.' && c[1] == 's' && c[2] == 'o' )
21                           m=1;
22                   --l;
23                   ++c;
24           }
25           return(m);
26   }
27
28   static char *
29   ObjectTrans(char **pattern)
30   {
31           char    *newPattern;
32
33           return(*pattern);
34   }
35
```

Figure 13.G.2

```
36
37  static void *
38  ObjectLocate( char *token)
39  {
40          void    *handle = NULL;
41          void    *object = NULL;
42          int     index = 0;
43
44          for(index=0; index < SharedLibIndex; ++index ) {
45                  handle = SharedLibHandles[index];
46                  object = dlsym(handle,token);
47                  if( object )
48                          break;
49          }
50          if( object == NULL )
51                  printf("Unable to locate object [%s]\n",token);
52          else
53                  printf("Located object [%s]\n", token);
54          return(object);
55  }
56
57
58  static int
59  ObjectGstatus(gstatus_t *gstatus)
60  {
61          gstatus->value=0;
62          gstatus->entitySpecific = 0;
63          return(0);
64  }
65
66
67  static gquery_t *
68  ObjectQuery(gstatus_t *gstatus )
69  {
70          gquery_t *gquery = (gquery_t *) gstatus;
71
72          return(gquery);
73  }
74
```

Figure 13.G.3

```
75  bind_f_t objectBind_f = {
76       ObjectPattern,
77       ObjectTrans,
78       ObjectLocate,
79       ObjectGstatus,
80       ObjectQuery,
81       NULL
82  };
```

Figure 13.H.

Example of Shared Library Binding Method.
shared.h Page 1
```
1
2   extern void   *SharedLibHandles[];
3   extern int    SharedLibIndex;
4   extern bind_f_t sharedBind_f;
```

Figure 13.I.1

Example of Shared Library Binding Method including Pattern, Transformation, Locate, Status & Query.
shared.c Page 1
```
1
2   #include <malloc.h>
3   #include <unistd.h>
4   #include <dlfcn.h>
5   #include "bind.h"
6
7
8   void *SharedLibHandles[100];
9   int  SharedLibIndex = 0;
10
11  static int
12  SharedPattern(char *pattern)
```

Fig. 13.I.2

```
13  {
14          char    *c;
15          int     l, m;
16
17          c = pattern;
18          l = strlen(pattern);
19
20          m = 1;
21
22          while( *c && l > 2 ) {
23                  if( c[0] == '.' && c[1] == 's' && c[2] == 'o' )
24                          m=0;
25                  --l;
26                  ++c;
27          }
28          return(m);
29  }
30
31  static char *
32  SharedTrans(char **pattern)
33  {
34          char    *newPattern;
35
36          if( *pattern[0] == '-' && *pattern[1] == 'l' ) {
37                  newPattern=malloc(strlen(*pattern)+3);
38                  strcpy(newPattern,*pattern);
39                  free(*pattern);
40                  *pattern=newPattern;
41          }
42          return(*pattern);
43  }
44
45
46  static void *
47  SharedLocate( char *token)
48  {
49          void *handle;
50
51          if( access(token,F_OK)) {
```

Fig. 13.I.3

```
52              printf("cannot locate shared library [%s]\n", token);
53              return(NULL);
54      }
55
56      if( (handle = dlopen(token,RTLD_NOW)) == NULL ) {
57              printf("cannot open shared library [%s]\n", token);
58              return(NULL);
59      }
60
61      printf("shared library [%s]is now open\n", token);
62      SharedLibHandles[SharedLibIndex] = handle;
63      ++SharedLibIndex;
64      return(token);
65 }
66
67
68 static int
69 SharedGstatus(gstatus_t *gstatus)
70 {
71      int errorCondition=0;
72
73      gstatus->value=0;
74      gstatus->entitySpecific = 0;
75      errorCondition = stat(gstatus->location,gstatus->statBuffer);
76      return(errorCondition);
77 }
78
79
80 static gquery_t *
81 SharedQuery(gstatus_t *gstatus )
82 {
83      gquery_t *gquery = (gquery_t *) gstatus;
84
85      return(gquery);
86 }
87
88 bind_f_t sharedBind_f = {
89      SharedPattern,
```

Fig. 13.I.4

```
90          SharedTrans,
91          SharedLocate,
92          SharedGstatus,
93          SharedQuery,
94          NULL
95       };
```

Figure 13.J.1

Example of Data Structures Header File.
bind.h Page 1

```
1
2    typedef struct      _gstatus {
3              char    *arbitrary;
4              char    *expanded;
5              char    *location;
6              int     *value;
7              struct  stat *statBuffer;
8              int     *entitySpecific;
9              int     bindMethod;
10             int     status;
11   } gstatus_t;
12
13   typedef gstatus_t gquery_t;
14
15   typedef struct      _gbindf      {
16             int     (*pattern)(char *);
17             char    *(*trans)(char **);
18             void    *(*locate)(char *);
19             int     (*status)(gstatus_t *);
20             gquery_t *(*query)(gstatus_t *);
21             char    *methodName;
22   } bind_f_t;
23
24   int RegisterMethod(bind_f_t *, char *);
25   int Bind(char *);
26
27   #define UNBOUND 1
```

Fig. 13.J.2

```
28  #define BOUND    2
29  #define FOUND    4
```

Figure 13.K.1

Example of Registering a Binding Service Method to Make Such Method Available to Binding Services (BSV).
gbinder.c Page 1

```
 1  #include <stdio.h>
 2  #include <malloc.h>
 3  #include "bind.h"
 4
 5  bind_f_t *gbinders[100];
 6  int      gbindIndex = 0;
 7
 8  int
 9  RegisterMethod(bind_f_t *bindMethod, char *name)
10  {
11          char   *cp = NULL;
12
13          cp = malloc(strlen(name)+1);
14          strcpy(cp, name);
15          bindMethod->methodName = cp;
16          gbinders[gbindIndex] = bindMethod;
17          ++gbindIndex;
18  }
19
20  int
21  Bind(char *token)
22  {
23          bind_f_t    *method_f;
24          int     index = 0;
25          gstatus_t   *gstatus = NULL;
26
27          gstatus = malloc(sizeof(gstatus_t));
28          memset(gstatus,'\0',sizeof(gstatus));
29          gstatus->status   = UNBOUND;
30          gstatus->arbitrary = malloc(strlen(token)+1);
```

Fig. 13.K.2

```
31          strcpy(gstatus->arbitrary, token);
32
33          for(index=0; index < gbindIndex; ++index ) {
34                  method_f = gbinders[index];
35                  if( method_f->pattern( token) != 0 ) {
36                          printf("%s is not a [%s] type\n", token,
method_f->methodName);
37                          continue;
38                  }
39                  printf("%s is bound using method %s\n", token,
method_f->methodName);
40                  gstatus->bindMethod= index;
41                  gstatus->status    |= BOUND;
42                  gstatus->location  = method_f->locate( token );
43                  if( gstatus->location != NULL ) {
44                          gstatus->status |= FOUND;
45                  }
46                  break;
47          }
48          return( gstatus->status & BOUND );
49  }
50
```

Figure 14.A.1 sample.c — example program using the technology for communications

```
1   /*
2    *  This is an example of registering communication points (services),
3    *  and connecting to this communication points to take advantage of
4    *  the service.
5    */
6
7   #include <thread.h>
8   #include <synch.h>
9   #include <stdio.h>
10  #include <errno.h>
```

Fig. 14.A.2

```
11  #include <malloc.h>
12  #include <dlfcn.h>
13
14  #include "threadLinks.h"
15  #include "threadrw.h"
16  #include "primid.h"
17  #include "primdata.h"
18  #include "primitive.h"
19  #include "point.h"
20  #include "comreg.h"
21  #include "comdata.h"
22  #include "comframe.h"
23  #include "registery.h"
24  #include "compoints.h"
25  #include "generic.h"
26
27  char            emptyString[2] = { '\0' };
28  linkbase_t      *createdCompoints;
29  extern linkbase_t   *registeredPrimitives;
30  extern linkbase_t   *registeredCompoints;
31
32  compoint_t      *mainService;
33
34
35  /*
36   * This function permits the user to define a communication primitive
37   * available to the application.
38   *      get name of primitive
39   *      get for location of primitive
40   *      CALL primid_f.reference to establish a reference for the primitive.
41   */
42  DefineComprim()
43  {
44          primid_t        *primid;
45          char            primitiveName[BUFSIZ];
46          char            primitiveLocation[BUFSIZ];
47
48          fprintf(stdout,"please enter the name of the primitive:\n");
```

Fig. 14.A.3

```
49      scanf(primitiveName);
50      fprintf(stdout,"please enter the location for this primitive: [NULL]\n");
51      scanf(primitiveLocation);
52      if( strcmp(primitiveLocation,"NULL")==0)
53              primid = primid_f.reference(emptyString,primitiveName);
54      else
55              primid = primid_f.reference(primitiveLocation,primitiveName);
56      if( primid == NULL ){
57              fprintf(stderr,"can't reference %s from location [%s]\n",
58                      primitiveName,
59                      primitiveLocation);
60      }
61  }
62
63
64
65  /*
66   * This function permits the user to define a communication point available
67   * to the system. This, is an example of a Thread Directory, but this
68   * version is maintained in memory as opposed to storing in a permanent
69   * location on the disk, or other media.
70   *     get name of service
71   *     get location of service
72   *     get attributes of service
73   *             get default sender primitive
74   *             get default sender location
75   *             get default receiver primitive
76   *             get default receiver location
77   *     CALL comid_f.reference to register the service
78   */
79  DefineCompoint()
80  {
81          char    serviceName[BUFSIZ];
82          char    *serviceNamePtr;
83          char    serviceLocation[BUFSIZ];
84          char    *serviceLocationPtr;
85          char    senderName[BUFSIZ];
86          char    *senderNamePtr;
87          char    senderLocation[BUFSIZ];
```

Fig. 14.A.4

```
 88     char    *senderLocationPtr;
 89     char    receiverName[BUFSIZ];
 90     char    *receiverNamePtr;
 91     char    receiverLocation[BUFSIZ];
 92     char    *receiverLocationPtr;
 93     int     errorCondition = 0;
 94
 95     fprintf(stderr,"Please enter the name of the service\n");
 96     scanf("%s",serviceName);
 97     fprintf(stderr,"Please enter the location of the service\n");
 98     scanf("%s",serviceLocation);
 99     if( strcmp(serviceLocation,"NULL")==0 )
100             serviceLocationPtr = emptyString;
101     else
102             serviceLocationPtr = serviceLocation;
103
104     fprintf(stderr,"Please enter the default sender primitive name:\n");
105     scanf("%s",senderName);
106     if( strcmp(senderName,"NULL")==0 )
107             senderNamePtr = emptyString;
108     else
109             senderNamePtr = senderName;
110
111     fprintf(stderr,"Please enter the default sender primitive location:\n");
112     scanf("%s",senderLocation);
113     if( strcmp(senderLocation,"NULL")==0 )
114             senderLocationPtr = emptyString;
115     else
116             senderLocationPtr = senderLocation;
117
118     fprintf(stderr,"Please enter the default receiver primitive name:\n");
119     scanf("%s",receiverName);
120     if( strcmp(receiverName,"NULL")==0 )
121             receiverNamePtr = emptyString;
122     else
123             receiverNamePtr = receiverName;
124
125     fprintf(stderr,"Please enter the default receiver primitive location:\n");
126     scanf("%s",receiverLocation);
```

Fig. 14.A.5

```
127     if( strcmp(receiverLocation,"NULL")==0 )
128             receiverLocationPtr = emptyString;
129     else
130             receiverLocationPtr = receiverLocation;
131
132
133     comid_f.reference(serviceLocationPtr,serviceName,senderLocationPtr,
134 senderNamePtr,receiverLocationPtr,receiverNamePtr,S_IDLE);
135 }
136
137
138 /*
139  *
140  * This function creates a communication point (actually establishes an
141  * instance of the point as opposed to merely defining that the point
142  * appears in the TDS.
143  *     get name of service
144  *     get location of service
145  *     get default sender communicaiton primitive name
146  *     get default sender communicaiton primitive location
147  *     get default receiver communicaiton primitive name
148  *     get default receiver communicaiton primitive location
149  *     CALL compoint_f.create to create the instance of the communicaiton point
150  *     CALL threadLink_f.add to add the communication point to the list of
151  *             available communication points.
152  */
153 CreateCompoint()
154 {
155     char    serviceName[BUFSIZ];
156     char    *serviceNamePtr;
157     char    serviceLocation[BUFSIZ];
158     char    *serviceLocationPtr;
159     char    senderName[BUFSIZ];
160     char    *senderNamePtr;
161     char    senderLocation[BUFSIZ];
162     char    *senderLocationPtr;
163     char    receiverName[BUFSIZ];
```

Fig. 14.A.6

```
164     char    *receiverNamePtr;
165     char    receiverLocation[BUFSIZ];
166     char    *receiverLocationPtr;
167     int     errorCondition = 0;
168     compoint_t *compoint;
169
170     fprintf(stderr,"Please enter the name of the service\n");
171     scanf("%s",serviceName);
172     fprintf(stderr,"Please enter the location of the service\n");
173     scanf("%s",serviceLocation);
174     if( strcmp(serviceLocation,"NULL")==0 )
175             serviceLocationPtr = emptyString;
176     else
177             serviceLocationPtr = serviceLocation;
178
179     fprintf(stderr,"Please enter the default sender primitive name:\n");
180     scanf("%s",senderName);
181     if( strcmp(senderName,"NULL")==0 )
182             senderNamePtr = emptyString;
183     else
184             senderNamePtr = senderName;
185
186     fprintf(stderr,"Please enter the default sender primitive location:\n");
187     scanf("%s",senderLocation);
188     if( strcmp(senderLocation,"NULL")==0 )
189             senderLocationPtr = emptyString;
190     else
191             senderLocationPtr = senderLocation;
192
193     fprintf(stderr,"Please enter the default receiver primitive name:\n");
194     scanf("%s",receiverName);
195     if( strcmp(receiverName,"NULL")==0 )
196             receiverNamePtr = emptyString;
197     else
198             receiverNamePtr = receiverName;
199
200     fprintf(stderr,"Please enter the default receiver primitive location:\n");
201     scanf("%s",receiverLocation);
202     if( strcmp(receiverLocation,"NULL")==0 )
```

Fig. 14.A.7

```
203            receiverLocationPtr = emptyString;
204        else
205            receiverLocationPtr = receiverLocation;
206
207
208 compoint=compoint_f.create(serviceLocationPtr,serviceName,senderLocationPtr,
209            senderNamePtr,receiverLocationPtr,receiverNamePtr);
210
211        if( compoint == NULL ) {
212            fprintf(stderr,"failed to create the specified communication point\n");
213            return;
214        }
215        threadLink_f.add(createdCompoints,compoint);
216        return;
217 }
218
219
220 /*
221  *   this function just dumps some information about the communication
222  *   primitive for visual display.
223  */
224 PrintPrimids(void *arg)
225 {
226        primid_t    *primid = arg;
227
228        printf("Primitive:    %s\n", primid->name);
229        printf("-----------------------------------\n");
230        printf("Location:     %s\n", primid->location);
231        printf("Status:                %d\n", primid->status);
232 }
233
234 /*
235  *   this function will generate a list of available communication
236  *   primitives.
237  */
238 ListPrims()
239 {
```

Fig. 14.A.8

```
240         printf("REGISTERED COMMUNICATION PRIMITIVES\n");
241         printf("-------------------------------\n\n");
242         threadLink_f.printF(registeredPrimitives,PrintPrimids);
243         printf("-------------------------------\n\n");
244 }
245
246
247 /*
248  * this function displays useful info on a communication id, such as
249  * seriveRegistraiton name, location, sender name and location, and receiver
250  * name and location.
251  */
252 PrintComid(void *arg)
253 {
254         comid_t     *comid = arg;
255
256         printf("Service:       %s\n",comid->serviceRegistration->name);
257         printf("-------------------------------------\n");
258         printf("Loaded From:\t\t%s\n", comid->serviceRegistration->location);
259         printf("Attributes:\t\t%d\n", comid->serviceAttributes);
260         printf("Default Sender Primitive:\n");
261         printf("    Name:\t\t%s\n", comid->senderPrimitive->name);
262         printf("    Location:\t%s\n", comid->senderPrimitive->location);
263         printf("Default Receiver Primitive:\n");
264         printf("    Name:\t\t%s\n", comid->receiverPrimitive->name);
265         printf("    Location:\t%s\n", comid->receiverPrimitive->location);
266         return(0);
267 }
268
269 /*
270  * this function will generate a list of available communication points.
271  */
272
273 ListComids()
274 {
275         printf("REGISTERED COMMUNICATION POINTS\n");
276         printf("-------------------------------\n\n");
277         threadLink_f.printF(registeredCompoints,PrintComid);
```

Fig. 14.A.9

```
278          printf("--------------------------\n\n");
279
280   }
281
282
283   /*
284    * this function will display the name and location of a paritcular
285    * communicaiton primitive.
286    */
287   PrintPrimitive(void *arg)
288   {
289          primitive_t   *primitive = arg;
290
291          printf("\tName:\t\t%s\n", primitive->id->name);
292          printf("\tLocation\t%s\n", primitive->id->location);
293          return(0);
294   }
295
296   /*
297    * this function will display info on a paritcular communicaiton point.
298    */
299   PrintCompoint(void *arg)
300   {
301          compoint_t   *compoint = arg;
302          printf("Communication Point:\n");
303          printf("---------------------------------\n");
304          printf("Name:           %s\n",
      compoint->service->comid->serviceRegistration->name);
305          printf("Location:       %s\n",
      compoint->service->comid->serviceRegistration->location);
306          printf("Sender Primitive List:\n");
307          threadLink_f.printF(compoint->senderList,PrintPrimitive);
308          printf("Receiver Primitive List:\n");
309          threadLink_f.printF(compoint->senderList,PrintPrimitive);
310   }
311
312   /*
313    * this function generates a list of all created communication points.
```

Fig. 14.A.10

```
314   */
315   ListCompoints()
316   {
317         printf("CREATED COMMUNICATION POINTS\n");
318         printf("-----------------------------\n\n");
319         threadLink_f.printF(createdCompoints,PrintCompoint);
320         printf("-----------------------------\n\n");
321   }
322
323
324   /*
325    * this function will locate a particular communication point in the list
326    * of available communication points.
327    */
328   compoint_t *
329   locateCompoint(char *name, char *location)
330   {
331         link_t       *linkPtr = NULL;
332         compoint_t   *compoint = NULL;
333
334         threadLink_f.readLock(createdCompoints);
335         linkPtr = createdCompoints->head;
336         while( linkPtr != NULL ){
337               compoint=linkPtr->data;
338               if( strcmp(compoint->service->comid->serviceRegistration->name,
339                     name) == 0)
340                     break;
341               linkPtr=linkPtr->forward;
342         }
343         threadLink_f.unlock(createdCompoints);
344         if( linkPtr == NULL )
345               return(NULL);
346         return(compoint);
347   }
348
349   /*
350    * this function gives an example of using the communication manager to
351    * connect one service to another service.
352    * NOTE: Since the TDS is in main memory, there is no need to use the
```

Fig. 14.A.11

```
353      *       communication identifers, and instead, this example illustrates
354      *       how to connect to a service just given the name and location.
355      *       For this example, the application assumes that it will establish
356      *       a generic reader thread to read the data being sent from the
357      *       service. So here is a case where the application is not connecting
358      *       the main thread, but rather, is connecting a new generic reader
359      *       thread to the service. In this case, the application requires
360      *       predefined location of the reader, but the service is dynamically
361      *       loadable through a shared library that could have been installed
362      *       after the application has already been installed. The point is
363      *       that the application could have been written with a dynamic
364      *       loadable generic reader and a dynamic loadable service without
365      *       the applicaiton knowing about either when the application was
366      *       first written.
367      */
368      ConnectService()
369      {
370              char    serviceName[BUFSIZ];
371              char    serviceLocation[BUFSIZ];
372              char    *serviceLocationPtr;
373              char    answer[BUFSIZ];
374              link_t       *linkPtr;
375              compoint_t   *compoint = NULL;
376
377              fprintf(stderr,"what service do you want to connect to?\n");
378              scanf("%s",serviceName);
379              fprintf(stderr,"where is the service located?\n");
380              scanf("%s",serviceLocation);
381              if( strcmp(serviceLocation,"NULL")==0)
382                      serviceLocationPtr = emptyString;
383              compoint = locateCompoint(serviceName,serviceLocationPtr);
384              if( compoint == NULL ) {
385                      fprintf(stderr,"sorry: service does not exist\n");
386                      return;
387              }
388              fprintf(stderr,"is this a 2-way communication? [y/n]\n");
389              scanf("%s",answer);
390              if( answer[0]=='Y' || answer[0]=='y' )
391
```

Fig. 14.A.12
generic_f.connect(compoint,mainService,CLIENT_TO_SERVICE|SERVICE_TO_CLIENT);
```
392            else
393                    generic_f.connect(compoint,mainService,SERVICE_TO_CLIENT);
394    }
395
396
397    /*
398     * this function disconnects from the service. If this is a disconnect
399     * from a 2-way service, then the application will disconnect both parties.
400     */
401    DisconnectService()
402    {
403            char    serviceName[BUFSIZ];
404            char    serviceLocation[BUFSIZ];
405            char    *serviceLocationPtr;
406            link_t        *linkPtr;
407            compoint_t  *compoint = NULL;
408            char    answer[BUFSIZ];
409
410            fprintf(stderr,"what service do you want to disconnect from?\n");
411            scanf("%s",serviceName);
412            fprintf(stderr,"where is the service located?\n");
413            scanf("%s",serviceLocation);
414            if( strcmp(serviceLocation,"NULL")==0)
415                    serviceLocationPtr = emptyString;
416            compoint = locateCompoint(serviceName,serviceLocationPtr);
417            if( compoint == NULL ) {
418                    fprintf(stderr,"sorry: service does not exist\n");
419                    return;
420            }
421            fprintf(stderr,"is this a 2-way communication? [y/n]\n");
422            scanf("%s",answer);
423            if( answer[0]=='Y' || answer[0]=='y' )
424
generic_f.disconnect(compoint,mainService,CLIENT_FROM_SERVICE|SERVICE_FROM_CLIENT);
425            else
426
```

Fig. 14.A.13
```
        generic_f.disconnect(compoint,mainService,SERVICE_FROM_CLIENT);
427 }
428
429 GenericReader()
430 {
431         char    *message;
432         int     s;
433
434         generic_f.receive(mainService,&message,512,&s,0);
435         fprintf(stdout,"%s", message);
436         free(message);
437         return;
438 }
439
440 GenericSender()
441 {
442         char    buffer[BUFSIZ];
443         char    *message;
444
445         fprintf(stdout,"what message do you want\n");
446         scanf("%s", buffer);
447         message = malloc(strlen(buffer)+1);
448         generic_f.send(mainService,message,512,0);
449         return;
450 }
451
452
453
454
455 /*
456  * This is the main function describing what commands are available
457  * for this example. The program is interactive and thus prompts
458  * you to determine what action it should follow.
459  */
460 main()
461 {
462         char    command[BUFSIZ];
463         char    verb[BUFSIZ];
464         char    noun[BUFSIZ];
```

Fig.14.A.14

```
465         int             runflag = 1;
466
467
468         createdCompoints = threadLink_f.create();
469
470         mainService = compoint_f.create(NULL,NULL,
471                             "threadQcond.so","threadQcond_f",
472                             "threadQcond.so","threadQcond_f");
473         if( mainService == NULL ) {
474                 fprintf(stderr,"can't create main compoint\n");
475                 exit(1);
476         }
477         while(runflag) {
478                 printf("COMMAND:\n");
479                 scanf("%s",verb);
480                 if( strcmp(verb,"register")==0 ) {
481                         scanf("%s",noun);
482                         if(strcmp(noun,"compoint")==0)
483                                 DefineCompoint();
484                         else if(strcmp(noun,"primitive")==0)
485                                 DefineComprim();
486                         else
487                                 fprintf(stderr,"Error: can't register a [%s]\n",
                    noun);
488                 }
489                 if( strcmp(verb,"create")==0 ) {
490                         scanf("%s",noun);
491                         if(strcmp(noun,"compoint")==0)
492                                 CreateCompoint();
493                         else
494                                 fprintf(stderr,"Error: can't create a [%s]\n",
495                                         noun);
496                 }
497                 if(strcmp(verb,"list")==0) {
498                         scanf("%s",noun);
499                         if(strcmp(noun,"primitives")==0)
500                                 ListPrims();
501                         else if(strcmp(noun,"comids")==0)
502                                 ListComids();
```

Fig. 14.A.15

```
503             else if(strcmp(noun,"compoints")==0)
504                     ListCompoints();
505             else
506                     fprintf(stderr,"Error: can't list a [%s]\n",
507                             noun);
508     }
509     if(strcmp(verb,"connect") == 0 ) {
510             ConnectService();
511     }
512
513     if(strcmp(verb,"disconnect")==0) {
514             DisconnectService();
515     }
516     if(strcmp(verb,"receive")==0) {
517             GenericReader();
518     }
519     if(strcmp(verb,"send")==0) {
520             GenericSender();
521     }
522
523     if(strcmp(verb,"help")==0) {
524             fprintf(stderr,"Available Commands are:\n");
525             fprintf(stderr,"register compoint\n");
526             fprintf(stderr,"register primitive\n");
527             fprintf(stderr,"create compoint\n");
528             fprintf(stderr,"list comids\n");
529             fprintf(stderr,"list compoints\n");
530             fprintf(stderr,"list primitives\n");
531             fprintf(stderr,"connect\n");
532             fprintf(stderr,"disconnect\n");
533             fprintf(stderr,"receive\n");
534             fprintf(stderr,"send\n");
535             fprintf(stderr,"help\n");
536             fprintf(stderr,"quit\n");
537     }
538     if(strcmp(verb,"quit")==0)
539             runflag=0;
540     if(strcmp(verb,"wait")==0)
541             sleep(2);
```

Figure 14.B.1 sample broker.data   data file contents

| | | | |
|---|---|---|---|
| 1 | ABC_MAGIC_CORP | 20 | 20+5/8 |
| 2 | DEF_MAGIC_CORP | 10 | 20+5/8 |
| 3 | GHI_MAGIC_CORP | 5 | 20+3/8 |
| 4 | JKL_MAGIC_CORP | 15 | 20+5/8 |
| 5 | MNO_MAGIC_CORP | 25 | 20+5/8 |
| 6 | PQR_MAGIC_CORP | 13 | 20+5/8 |
| 7 | STU_MAGIC_CORP | 25 | 20+5/8 |
| 8 | VWX_MAGIC_CORP | 60 | 20+1/8 |
| 9 | YZA_MAGIC_CORP | 34 | 20+5/8 |
| 10 | ABC_MAGIC_CORP | 20 | 20+1/2 |
| 11 | DEF_MAGIC_CORP | 10 | 20+1/2 |
| 12 | GHI_MAGIC_CORP | 5 | 20+3/8 |
| 13 | JKL_MAGIC_CORP | 15 | 20+3/8 |
| 14 | MNO_MAGIC_CORP | 20 | 20+3/8 |
| 15 | PQR_MAGIC_CORP | 19 | 20+1/2 |
| 16 | STU_MAGIC_CORP | 17 | 20+3/8 |
| 17 | VWX_MAGIC_CORP | 15 | 20+3/8 |
| 18 | YZA_MAGIC_CORP | 14 | 20+3/8 |
| 19 | ABC_MAGIC_CORP | 20 | 20+1/2 |
| 20 | DEF_MAGIC_CORP | 10 | 20+5/8 |
| 21 | GHI_MAGIC_CORP | 5 | 20+5/8 |
| 22 | JKL_MAGIC_CORP | 15 | 20+5/8 |
| 23 | MNO_MAGIC_CORP | 16 | 20+5/8 |
| 24 | PQR_MAGIC_CORP | 18 | 20+5/8 |
| 25 | STU_MAGIC_CORP | 21 | 20+5/8 |
| 26 | VWX_MAGIC_CORP | 41 | 20+3/4 |
| 27 | YZA_MAGIC_CORP | 64 | 20+7/8 |
| 28 | ABC_MAGIC_CORP | 20 | 20+7/8 |
| 29 | DEF_MAGIC_CORP | 10 | 20+7/8 |
| 30 | GHI_MAGIC_CORP | 5 | 21 |

Figure 14.B.2

| | | | |
|---|---|---|---|
| 31 | JKL_MAGIC_CORP | 15 | 21+1/2 |
| 32 | MNO_MAGIC_CORP | 78 | 21+5/8 |
| 33 | PQR_MAGIC_CORP | 62 | 21+5/8 |
| 34 | STU_MAGIC_CORP | 79 | 21+5/8 |
| 35 | VWX_MAGIC_CORP | 90 | 21+1/2 |
| 36 | ABC_MAGIC_CORP | 20 | 21+1/2 |
| 37 | DEF_MAGIC_CORP | 10 | 21+1/2 |
| 38 | GHI_MAGIC_CORP | 5 | 21+1/2 |
| 39 | JKL_MAGIC_CORP | 15 | 21+3/8 |
| 40 | MNO_MAGIC_CORP | 65 | 21+3/8 |
| 41 | PQR_MAGIC_CORP | 11 | 21+3/8 |
| 42 | STU_MAGIC_CORP | 43 | 21+3/8 |
| 43 | ABC_MAGIC_CORP | 20 | 21+1/4 |
| 44 | DEF_MAGIC_CORP | 10 | 21+1/4 |
| 45 | GHI_MAGIC_CORP | 5 | 21+1/8 |
| 46 | JKL_MAGIC_CORP | 15 | 21+1/8 |
| 47 | MNO_MAGIC_CORP | 35 | 21+1/4 |
| 48 | PQR_MAGIC_CORP | 45 | 21+1/4 |
| 49 | STU_MAGIC_CORP | 23 | 21+1/4 |
| 50 | ABC_MAGIC_CORP | 20 | 21+1/4 |
| 51 | DEF_MAGIC_CORP | 10 | 21+1/4 |
| 52 | GHI_MAGIC_CORP | 5 | 21+1/8 |
| 53 | JKL_MAGIC_CORP | 15 | 21+1/8 |
| 54 | MNO_MAGIC_CORP | 66 | 21+1/8 |
| 55 | PQR_MAGIC_CORP | 10 | 21+1/4 |
| 56 | STU_MAGIC_CORP | 15 | 21+1/4 |
| 57 | VWX_MAGIC_CORP | 11 | 21+1/4 |
| 58 | ABC_MAGIC_CORP | 20 | 21+1/8 |
| 59 | DEF_MAGIC_CORP | 10 | 21+1/8 |
| 60 | GHI_MAGIC_CORP | 5 | 21 |
| 61 | JKL_MAGIC_CORP | 15 | 21 |
| 62 | MNO_MAGIC_CORP | 66 | 21 |
| 63 | PQR_MAGIC_CORP | 70 | 21 |
| 64 | STU_MAGIC_CORP | 44 | 20+8/8 |
| 65 | VWX_MAGIC_CORP | 33 | 20+7/8 |
| 66 | YZA_MAGIC_CORP | 22 | 21 |
| 67 | ABC_MAGIC_CORP | 20 | 21 |
| 68 | DEF_MAGIC_CORP | 10 | 20+7/8 |

Figure 14.B.3

| | | | |
|---|---|---|---|
| 69 | GHI_MAGIC_CORP | 5 | 20+7/8 |
| 70 | JKL_MAGIC_CORP | 15 | 20+7/8 |
| 71 | MNO_MAGIC_CORP | 51 | 20+7/8 |
| 72 | PQR_MAGIC_CORP | 46 | 20+3/4 |
| 73 | STU_MAGIC_CORP | 35 | 20+7/8 |
| 74 | VWX_MAGIC_CORP | 20 | 20+7/8 |
| 75 | YZA_MAGIC_CORP | 83 | 20+7/8 |
| 76 | ABC_MAGIC_CORP | 20 | 20+7/8 |
| 77 | DEF_MAGIC_CORP | 10 | 20+7/8 |
| 78 | GHI_MAGIC_CORP | 5 | 20+7/8 |
| 79 | JKL_MAGIC_CORP | 15 | 20+3/4 |
| 80 | MNO_MAGIC_CORP | 21 | 20+3/4 |
| 81 | PQR_MAGIC_CORP | 16 | 20+3/4 |
| 82 | STU_MAGIC_CORP | 19 | 20+3/4 |
| 83 | VWX_MAGIC_CORP | 66 | 20+3/4 |
| 84 | YZA_MAGIC_CORP | 77 | 20+5/8 |
| 85 | ABC_MAGIC_CORP | 20 | 20+5/8 |
| 86 | DEF_MAGIC_CORP | 10 | 20+5/8 |
| 87 | GHI_MAGIC_CORP | 5 | 20+5/8 |
| 88 | JKL_MAGIC_CORP | 15 | 20+5/8 |
| 89 | MNO_MAGIC_CORP | 44 | 20+5/8 |
| 90 | PQR_MAGIC_CORP | 43 | 20+5/8 |
| 91 | STU_MAGIC_CORP | 22 | 20+3/4 |
| 92 | VWX_MAGIC_CORP | 99 | 20+3/4 |
| 93 | ABC_MAGIC_CORP | 20 | 20+3/4 |
| 94 | DEF_MAGIC_CORP | 10 | 20+5/8 |
| 95 | GHI_MAGIC_CORP | 5 | 20+3/4 |
| 96 | JKL_MAGIC_CORP | 15 | 20+3/4 |
| 97 | MNO_MAGIC_CORP | 78 | 20+5/8 |
| 98 | PQR_MAGIC_CORP | 54 | 20+3/4 |
| 99 | STU_MAGIC_CORP | 44 | 20+5/8 |
| 100 | ABC_MAGIC_CORP | 20 | 20+5/8 |
| 101 | DEF_MAGIC_CORP | 10 | 20+5/8 |
| 102 | GHI_MAGIC_CORP | 5 | 20+5/8 |
| 103 | JKL_MAGIC_CORP | 15 | 20+5/8 |
| 104 | MNO_MAGIC_CORP | 45 | 20+5/8 |
| 105 | PQR_MAGIC_CORP | 90 | 20+5/8 |
| 106 | STU_MAGIC_CORP | 44 | 20+5/8 |

Figure 14.B.4

| | | | |
|---|---|---|---|
| 107 | ABC_MAGIC_CORP | 20 | 20+5/8 |
| 108 | DEF_MAGIC_CORP | 10 | 20+5/8 |
| 109 | GHI_MAGIC_CORP | 5 | 20+1/2 |
| 110 | JKL_MAGIC_CORP | 15 | 20+1/2 |
| 111 | MNO_MAGIC_CORP | 44 | 20+1/2 |
| 112 | PQR_MAGIC_CORP | 39 | 20+3/8 |
| 113 | STU_MAGIC_CORP | 69 | 20+3/8 |
| 114 | VWX_MAGIC_CORP | 55 | 20+1/2 |
| 115 | ABC_MAGIC_CORP | 20 | 20+1/2 |
| 116 | ABC_MAGIC_CORP | 20 | 20+1/2 |
| 117 | DEF_MAGIC_CORP | 10 | 20+1/2 |
| 118 | GHI_MAGIC_CORP | 5 | 20+1/2 |
| 119 | JKL_MAGIC_CORP | 15 | 20+1/4 |
| 120 | MNO_MAGIC_CORP | 76 | 20+1/4 |
| 121 | PQR_MAGIC_CORP | 56 | 20+1/4 |
| 122 | STU_MAGIC_CORP | 35 | 20+1/8 |
| 123 | VWX_MAGIC_CORP | 44 | 20+1/8 |
| 124 | YZA_MAGIC_CORP | 21 | 20+1/8 |
| 125 | ABC_MAGIC_CORP | 20 | 20 |
| 126 | DEF_MAGIC_CORP | 10 | 19+7/8 |
| 127 | GHI_MAGIC_CORP | 5 | 19+7/8 |
| 128 | JKL_MAGIC_CORP | 15 | 19+3/4 |
| 129 | MNO_MAGIC_CORP | 41 | 19+3/4 |
| 130 | PQR_MAGIC_CORP | 11 | 19+5/8 |
| 131 | STU_MAGIC_CORP | 85 | 19+5/8 |
| 132 | VWX_MAGIC_CORP | 87 | 19+5/8 |
| 133 | YZA_MAGIC_CORP | 44 | 19+1/2 |
| 134 | ABC_MAGIC_CORP | 20 | 19+1/2 |
| 135 | DEF_MAGIC_CORP | 10 | 19+1/2 |
| 136 | GHI_MAGIC_CORP | 5 | 19+1/2 |
| 137 | JKL_MAGIC_CORP | 15 | 19+1/2 |
| 138 | MNO_MAGIC_CORP | 17 | 19+1/2 |
| 139 | PQR_MAGIC_CORP | 23 | 19+3/8 |
| 140 | STU_MAGIC_CORP | 77 | 19+1/4 |
| 141 | VWX_MAGIC_CORP | 11 | 19+1/4 |
| 142 | YZA_MAGIC_CORP | 56 | 19+1/4 |
| 143 | ABC_MAGIC_CORP | 20 | 19+1/4 |
| 144 | DEF_MAGIC_CORP | 10 | 19+3/8 |

Figure 14.B.5

| | | | |
|---|---|---|---|
| 145 | GHI_MAGIC_CORP | 5 | 19+1/4 |
| 146 | JKL_MAGIC_CORP | 15 | 19+1/4 |
| 147 | MNO_MAGIC_CORP | 88 | 19+1/4 |
| 148 | PQR_MAGIC_CORP | 11 | 19+3/8 |
| 149 | STU_MAGIC_CORP | 12 | 19+1/4 |
| 150 | VWX_MAGIC_CORP | 99 | 19+1/4 |
| 151 | ABC_MAGIC_CORP | 20 | 19+3/8 |
| 152 | DEF_MAGIC_CORP | 10 | 19+3/8 |
| 153 | GHI_MAGIC_CORP | 5 | 19+3/8 |
| 154 | JKL_MAGIC_CORP | 15 | 19+3/8 |
| 155 | MNO_MAGIC_CORP | 11 | 19+3/8 |
| 156 | PQR_MAGIC_CORP | 14 | 19+3/8 |
| 157 | STU_MAGIC_CORP | 82 | 19+1/4 |
| 158 | ABC_MAGIC_CORP | 20 | 19+1/4 |
| 159 | DEF_MAGIC_CORP | 10 | 19+1/4 |
| 160 | GHI_MAGIC_CORP | 5 | 19+1/4 |
| 161 | JKL_MAGIC_CORP | 15 | 19+1/4 |
| 162 | MNO_MAGIC_CORP | 22 | 19+1/8 |
| 163 | PQR_MAGIC_CORP | 78 | 19+1/8 |
| 164 | STU_MAGIC_CORP | 88 | 19+1/8 |
| 165 | ABC_MAGIC_CORP | 20 | 19+1/8 |
| 166 | DEF_MAGIC_CORP | 10 | 19+1/8 |
| 167 | GHI_MAGIC_CORP | 5 | 19+1/8 |
| 168 | JKL_MAGIC_CORP | 15 | 19 |
| 169 | MNO_MAGIC_CORP | 75 | 19 |
| 170 | PQR_MAGIC_CORP | 34 | 19 |
| 171 | STU_MAGIC_CORP | 66 | 19 |
| 172 | VWX_MAGIC_CORP | 28 | 19 |
| 173 | ABC_MAGIC_CORP | 20 | 19 |
| 174 | DEF_MAGIC_CORP | 10 | 19 |
| 175 | GHI_MAGIC_CORP | 5 | 18+7/8 |
| 176 | JKL_MAGIC_CORP | 15 | 18+7/8 |
| 177 | MNO_MAGIC_CORP | 91 | 19 |
| 178 | PQR_MAGIC_CORP | 10 | 19 |
| 179 | STU_MAGIC_CORP | 81 | 19 |
| 180 | VWX_MAGIC_CORP | 11 | 18+7/8 |
| 181 | YZA_MAGIC_CORP | 71 | 18+7/8 |
| 182 | ABC_MAGIC_CORP | 20 | 18+7/8 |

Figure 14.B.6

| | | | |
|---|---|---|---|
| 183 | DEF_MAGIC_CORP | 10 | 18+7/8 |
| 184 | GHI_MAGIC_CORP | 5 | 18+7/8 |
| 185 | JKL_MAGIC_CORP | 15 | 18+7/8 |
| 186 | MNO_MAGIC_CORP | 91 | 18+3/4 |
| 187 | PQR_MAGIC_CORP | 11 | 18+3/4 |
| 188 | STU_MAGIC_CORP | 82 | 18+3/4 |
| 189 | VWX_MAGIC_CORP | 22 | 18+3/4 |
| 190 | YZA_MAGIC_CORP | 73 | 18+5/8 |
| 191 | ABC_MAGIC_CORP | 20 | 18+3/4 |
| 192 | DEF_MAGIC_CORP | 10 | 18+5/8 |
| 193 | GHI_MAGIC_CORP | 5 | 18+3/4 |
| 194 | JKL_MAGIC_CORP | 15 | 18+3/4 |
| 195 | MNO_MAGIC_CORP | 91 | 18+3/4 |
| 196 | PQR_MAGIC_CORP | 82 | 18+3/4 |
| 197 | STU_MAGIC_CORP | 73 | 18+5/8 |
| 198 | VWX_MAGIC_CORP | 64 | 18+5/8 |
| 199 | YZA_MAGIC_CORP | 65 | 18+5/8 |
| 200 | ABC_MAGIC_CORP | 20 | 18+5/8 |
| 201 | DEF_MAGIC_CORP | 10 | 18+3/4 |
| 202 | GHI_MAGIC_CORP | 5 | 18+3/4 |
| 203 | JKL_MAGIC_CORP | 15 | 18+5/8 |
| 204 | MNO_MAGIC_CORP | 56 | 18+3/4 |
| 205 | PQR_MAGIC_CORP | 47 | 18+5/8 |
| 206 | STU_MAGIC_CORP | 38 | 18+3/4 |
| 207 | VWX_MAGIC_CORP | 29 | 18+3/4 |
| 208 | ABC_MAGIC_CORP | 20 | 18+5/8 |
| 209 | DEF_MAGIC_CORP | 10 | 18+5/8 |
| 210 | GHI_MAGIC_CORP | 5 | 18+5/8 |
| 211 | JKL_MAGIC_CORP | 15 | 18+5/8 |
| 212 | MNO_MAGIC_CORP | 1 | 18+5/8 |
| 213 | PQR_MAGIC_CORP | 18 | 18+1/2 |
| 214 | STU_MAGIC_CORP | 17 | 18+1/2 |
| 215 | ABC_MAGIC_CORP | 20 | 18+1/2 |
| 216 | DEF_MAGIC_CORP | 10 | 18+5/8 |
| 217 | GHI_MAGIC_CORP | 5 | 18+1/2 |
| 218 | JKL_MAGIC_CORP | 15 | 18+5/8 |
| 219 | MNO_MAGIC_CORP | 22 | 18+5/8 |

Figure 14.B.7

| | | | |
|---|---|---|---|
| 220 | PQR_MAGIC_CORP | 41 | 18+1/2 |
| 221 | STU_MAGIC_CORP | 34 | 18+5/8 |
| 222 | ABC_MAGIC_CORP | 20 | 18+5/8 |
| 223 | DEF_MAGIC_CORP | 10 | 18+1/2 |
| 224 | GHI_MAGIC_CORP | 5 | 18+1/2 |
| 225 | JKL_MAGIC_CORP | 15 | 18+1/2 |
| 226 | MNO_MAGIC_CORP | 66 | 18+1/2 |
| 227 | PQR_MAGIC_CORP | 45 | 18+1/2 |
| 228 | STU_MAGIC_CORP | 42 | 18+1/2 |
| 229 | VWX_MAGIC_CORP | 88 | 18+1/2 |
| 230 | ABC_MAGIC_CORP | 20 | 18+3/8 |
| 231 | ABC_MAGIC_CORP | 20 | 18+3/8 |
| 232 | DEF_MAGIC_CORP | 10 | 18+3/8 |
| 233 | GHI_MAGIC_CORP | 5 | 18+1/2 |
| 234 | JKL_MAGIC_CORP | 15 | 18+1/2 |
| 235 | MNO_MAGIC_CORP | 67 | 18+5/8 |
| 236 | PQR_MAGIC_CORP | 22 | 18+1/2 |
| 237 | STU_MAGIC_CORP | 48 | 18+5/8 |
| 238 | VWX_MAGIC_CORP | 44 | 18+5/8 |
| 239 | YZA_MAGIC_CORP | 99 | 18+1/2 |
| 240 | ABC_MAGIC_CORP | 20 | 18+1/2 |
| 241 | DEF_MAGIC_CORP | 10 | 18+5/8 |
| 242 | GHI_MAGIC_CORP | 5 | 18+5/8 |
| 243 | JKL_MAGIC_CORP | 15 | 18+5/8 |
| 244 | MNO_MAGIC_CORP | 91 | 18+5/8 |
| 245 | PQR_MAGIC_CORP | 81 | 18+1/2 |
| 246 | STU_MAGIC_CORP | 53 | 18+1/2 |
| 247 | VWX_MAGIC_CORP | 28 | 18+1/2 |
| 248 | YZA_MAGIC_CORP | 74 | 18+5/8 |
| 249 | ABC_MAGIC_CORP | 20 | 18+5/8 |
| 250 | DEF_MAGIC_CORP | 10 | 18+5/8 |
| 251 | GHI_MAGIC_CORP | 5 | 18+1/2 |
| 252 | JKL_MAGIC_CORP | 15 | 18+1/2 |
| 253 | MNO_MAGIC_CORP | 45 | 18+1/2 |
| 254 | PQR_MAGIC_CORP | 49 | 18+5/8 |
| 255 | STU_MAGIC_CORP | 99 | 18+1/2 |
| 256 | VWX_MAGIC_CORP | 67 | 18+1/2 |

Figure 14.B.8

| | | | |
|---|---|---|---|
| 257 | YZA_MAGIC_CORP | 55 | 18+5/8 |
| 258 | ABC_MAGIC_CORP | 20 | 18+5/8 |
| 259 | DEF_MAGIC_CORP | 10 | 18+1/2 |
| 260 | GHI_MAGIC_CORP | 5 | 18+1/2 |
| 261 | JKL_MAGIC_CORP | 15 | 18+1/2 |
| 262 | MNO_MAGIC_CORP | 45 | 18+5/8 |
| 263 | PQR_MAGIC_CORP | 23 | 18+5/8 |
| 264 | STU_MAGIC_CORP | 99 | 18+1/2 |
| 265 | VWX_MAGIC_CORP | 100 | 18+1/2 |
| 266 | ABC_MAGIC_CORP | 20 | 18+1/2 |
| 267 | DEF_MAGIC_CORP | 10 | 18+1/2 |
| 268 | GHI_MAGIC_CORP | 5 | 18+5/8 |
| 269 | JKL_MAGIC_CORP | 15 | 18+5/8 |
| 270 | MNO_MAGIC_CORP | 15 | 18+1/2 |
| 271 | PQR_MAGIC_CORP | 17 | 18+1/2 |
| 272 | STU_MAGIC_CORP | 19 | 18+5/8 |
| 273 | ABC_MAGIC_CORP | 20 | 18+5/8 |
| 274 | DEF_MAGIC_CORP | 10 | 18+1/2 |
| 275 | GHI_MAGIC_CORP | 5 | 18+5/8 |
| 276 | JKL_MAGIC_CORP | 15 | 18+1/2 |
| 277 | MNO_MAGIC_CORP | 28 | 18+1/2 |
| 278 | PQR_MAGIC_CORP | 29 | 18+1/2 |
| 279 | STU_MAGIC_CORP | 54 | 18+1/2 |
| 280 | ABC_MAGIC_CORP | 20 | 18+1/2 |
| 281 | DEF_MAGIC_CORP | 10 | 18+1/2 |
| 282 | GHI_MAGIC_CORP | 5 | 18+3/8 |
| 283 | JKL_MAGIC_CORP | 15 | 18+3/8 |
| 284 | MNO_MAGIC_CORP | 55 | 18+3/8 |
| 285 | PQR_MAGIC_CORP | 89 | 18+3/8 |
| 286 | STU_MAGIC_CORP | 48 | 18+3/8 |
| 287 | VWX_MAGIC_CORP | 38 | 18+3/8 |
| 288 | ABC_MAGIC_CORP | 20 | 18+3/8 |
| 289 | DEF_MAGIC_CORP | 10 | 18+3/8 |
| 290 | GHI_MAGIC_CORP | 5 | 18+3/8 |
| 291 | JKL_MAGIC_CORP | 15 | 18+3/8 |
| 292 | MNO_MAGIC_CORP | 67 | 18+3/8 |
| 293 | PQR_MAGIC_CORP | 54 | 18+3/8 |

Figure 14.B.9

| | | | |
|---|---|---|---|
| 294 | STU_MAGIC_CORP | 63 | 18+3/8 |
| 295 | VWX_MAGIC_CORP | 31 | 18+3/8 |
| 296 | YZA_MAGIC_CORP | 67 | 18+3/8 |
| 297 | ABC_MAGIC_CORP | 20 | 18+1/4 |
| 298 | DEF_MAGIC_CORP | 10 | 18+1/4 |
| 299 | GHI_MAGIC_CORP | 5 | 18+1/4 |
| 300 | JKL_MAGIC_CORP | 15 | 18+3/8 |
| 301 | MNO_MAGIC_CORP | 99 | 18+1/4 |
| 302 | PQR_MAGIC_CORP | 80 | 18+1/4 |
| 303 | STU_MAGIC_CORP | 100 | 18+3/8 |
| 304 | VWX_MAGIC_CORP | 75 | 18+3/8 |
| 305 | YZA_MAGIC_CORP | 60 | 18+1/4 |
| 306 | ABC_MAGIC_CORP | 20 | 18+1/4 |
| 307 | DEF_MAGIC_CORP | 10 | 18+3/8 |
| 308 | GHI_MAGIC_CORP | 5 | 18+3/8 |
| 309 | JKL_MAGIC_CORP | 15 | 18+1/4 |
| 310 | MNO_MAGIC_CORP | 86 | 18+1/4 |
| 311 | PQR_MAGIC_CORP | 92 | 18+1/4 |
| 312 | STU_MAGIC_CORP | 29 | 18+3/8 |
| 313 | VWX_MAGIC_CORP | 11 | 18+3/8 |
| 314 | YZA_MAGIC_CORP | 05 | 18+1/4 |
| 315 | ABC_MAGIC_CORP | 20 | 18+1/8 |
| 316 | DEF_MAGIC_CORP | 10 | 18+1/4 |
| 317 | GHI_MAGIC_CORP | 5 | 18+1/4 |
| 318 | JKL_MAGIC_CORP | 15 | 18+1/4 |
| 319 | MNO_MAGIC_CORP | 11 | 18+1/8 |
| 320 | PQR_MAGIC_CORP | 8 | 18+1/4 |
| 321 | STU_MAGIC_CORP | 19 | 18+1/4 |
| 322 | VWX_MAGIC_CORP | 13 | 18+1/4 |
| 323 | ABC_MAGIC_CORP | 20 | 18+1/4 |
| 324 | DEF_MAGIC_CORP | 10 | 18+1/4 |
| 325 | GHI_MAGIC_CORP | 5 | 18+1/4 |
| 326 | JKL_MAGIC_CORP | 15 | 18+1/4 |
| 327 | MNO_MAGIC_CORP | 21 | 18+1/8 |
| 328 | PQR_MAGIC_CORP | 28 | 18+1/4 |
| 329 | STU_MAGIC_CORP | 24 | 18+1/4 |
| 330 | ABC_MAGIC_CORP | 20 | 18+1/4 |
| 331 | DEF_MAGIC_CORP | 10 | 18+1/4 |

Figure 14.B.10

| | | | |
|---|---|---|---|
| 332 | GHI_MAGIC_CORP | 5  | 18+1/4 |
| 333 | JKL_MAGIC_CORP | 15 | 18+1/4 |
| 334 | MNO_MAGIC_CORP | 22 | 18+1/8 |
| 335 | PQR_MAGIC_CORP | 1  | 18+1/4 |
| 336 | STU_MAGIC_CORP | 5  | 18+1/4 |
| 337 | ABC_MAGIC_CORP | 20 | 18+1/4 |
| 338 | DEF_MAGIC_CORP | 10 | 18+1/4 |
| 339 | GHI_MAGIC_CORP | 5  | 18+1/8 |
| 340 | JKL_MAGIC_CORP | 15 | 18+1/4 |
| 341 | MNO_MAGIC_CORP | 19 | 18+1/4 |
| 342 | PQR_MAGIC_CORP | 21 | 18+1/4 |
| 343 | STU_MAGIC_CORP | 11 | 18+1/8 |
| 344 | VWX_MAGIC_CORP | 10 | 18+1/4 |
| 345 | ABC_MAGIC_CORP | 20 | 18+1/8 |

Figure 14.C.1 sample weather.data data file contents

| | | | | |
|---|---|---|---|---|
| 1  | NJ | Atlantic_City     | 50 | |
| 2  | NJ | Barnagate         | 51 | |
| 3  | NJ | Bloomfield        | 55 | |
| 4  | NJ | Clark             | 56 | |
| 5  | NJ | Dover             | 54 | |
| 6  | NJ | Flemmington       |    | 50 |
| 7  | NJ | East_Brunswick    |    | 57 |
| 8  | NJ | Englishtown       | 57 | |
| 9  | NJ | Holmdel           |    | 55 |
| 10 | NJ | Long_Beach_Island |    | 48 |
| 11 | NJ | Longport          | 46 | |
| 12 | NJ | Lynwood           |    | 50 |
| 13 | NJ | Margate           |    | 51 |
| 14 | NJ | Matawan           |    | 58 |
| 15 | NJ | Murray_Hill       | 49 | |
| 16 | NJ | New_Brunswick     |    | 50 |
| 17 | NJ | Newark            |    | 58 |
| 18 | NJ | North_Brunswick   |    | 60 |

Figure 14.C.2

| 19 | NJ | Northfield | 55 | |
|----|----|------------|----|----|
| 20 | NJ | Ocean_City | 50 | |
| 21 | NJ | Old_Bridge | 57 | |
| 22 | NJ | Pleasantville | 52 | |
| 23 | NJ | Pomona | | 51 |
| 24 | NJ | Randolph | 57 | |
| 25 | NJ | Somers_Point | | 49 |
| 26 | NJ | Summit | | 50 |
| 27 | NJ | Ventnor | | 48 |

Figure 15.A.

comdata.h — communication data header file

```
1
2
3   typedef struct _comdata {
4              thread_t    id;
5              void        *handle;
6              void        *(*function)(void *);
7   } comdata_t;
8
9   typedef struct _comdata_f {
10             comdata_t   *(*create)(void);
11             int         (*destroy)(comdata_t *);
12  } comdata_f_t;
13
14  extern comdata_f_t comdata_f;
```

Figure 15.B.1 comdata.c — communication data module

```
1
2   #include <stdio.h>
3   #include <malloc.h>
```

Figure 15.B.2

```
4    #include <errno.h>
5    #include <thread.h>
6
7    #include "comdata.h"
8
9    static comdata_t *
10   Create(void)
11   {
12           comdata_t   *comdata;
13
14           comdata = malloc(sizeof(comdata_t));
15           if( comdata != NULL )
16                   memset(comdata,'\0',sizeof(comdata_t));
17           return(comdata);
18   }
19
20   static int
21   Destroy(comdata_t *comdata)
22   {
23           if( ! comdata II comdata->handle II comdata->id )
24                   return(EBUSY);
25           else
26                   free(comdata);
27           return(0);
28   }
29
30   comdata_f_t comdata_f = {
31           Create,
32           Destroy,
33   };
```

Figure 16.A.1 compoints.h -- compoints header file Page 1
```
1
2    typedef struct _compoint   {
```

Figure 16.A.2

```
 3              registery_t      *service;
 4              primitive_t      *receiver;
 5              primitive_t      *sender;
 6              linkbase_t       *senderList;
 7              linkbase_t       *receiverList;
 8              unsigned long             currentAttributes;
 9              rwlock_t         *rwlock;
10      } compoint_t;
11
12      typedef struct _compoint_f     {
13              compoint_t    *(*create)(char *, char *, char *, char *, char *, char *);
14              int           (*destroy)(compoint_t *);
15      } compoint_f_t;
16
17      extern compoint_f_t compoint_f;
```

Figure 16.B.1 compoints.c -- compoints module
```
 1    #include <thread.h>
 2    #include <synch.h>
 3    #include <stdio.h>
 4    #include <errno.h>
 5    #include <malloc.h>
 6    #include <dlfcn.h>
 7
 8    #include "threadLinks.h"
 9    #include "threadrw.h"
10    #include "primid.h"
11    #include "primdata.h"
12    #include "primitive.h"
13    #include "point.h"
14    #include "comreg.h"
15    #include "comdata.h"
16    #include "comframe.h"
17    #include "registery.h"
18    #include "compoints.h"
```

Fig. 16.B.2

```
19
20   /*
21      Communicaiton Point Module
22          Create     - creates a communication point
23      1.             in creating the communication point, use the name and
24                     location of the desired communication point in place of a
25                     communicaiton identifier.  We don't need to use the TDS
26                     since this is all in main memory for this example.
27      2.             If there is a service name and/or a serviceLocation, then
28                     call the
29                             registery_f.create()
30                     to register the service.
31      3.             If there is a sender location or a sender name, then
32                     call the
33                             primitive_f.create()
34                     to establish the communicaiton primitive for the sender.
35      3.             We set the threshold to 25 min, 50 max which means for
36                     this implementation that if there are more than 50
37                     messages sent from the sender and the receiver has not
38                     yet processed these 50 messages, then suspend the sender
39                     until the receiver has a chance to digest the info.  When
40                     the receiver has taken messages, and there are 25 or less
41                     messages still pending from the sender, then resume the
42                     sender.
43                     This is similar to two people talking on the phone and
44                     one person saying too much too quickly; the sending
45                     person would typically pause for awhile until the
46                     recevier has had a chance to digest some of the info.
47                     The sender can then resume.
48                     For the computer system implementation, it means that we
49                     don't have to consume too much memory while waiting for
50                     the receiver to digest the info.
51                     Next, we will load the sender primitive, if we need to,
52                     by calling the primitve_f.load() function and then add
53                     the instance of the primitive to the sender list.
54
55      4.             If there is a receiver location or a receiver name, then
56                     call the
57                             primitive_f.create()
```

Fig. 16.B.3

```
58              to establish the communicaiton primitive for the receiver.
59              Now do the same steps as in #2) above, but this time with
60              prejudice for the receiver.
61  5.          We are now ready to establish the connection instance.
62              If a service location and name was specified, then CALL
63              the UNIX function dlopen() to open the shared library and
64              load the service providing function by the specified
65              service name.
66              If a service location was not specified, but a service
67              name was given, then load the specified service name from
68              the currently executing application program. (Still
69              calls dlopen()). The distinction herein is that a
70              service can be provided from the the application process
71              to the application process. (i.e., we don't require a
72              shared library to be installed, but the application must
73              have been compiled with the service available inside the
74              executable, or through a shared library already known to
75              the application when the application was compiled.)
76              Now that we have an open descriptor, we call the UNIX
77              dlsym() function to reference the particular named
78              service we are interested in. (This returns the location
79              of the named service). Finally, we will create the
80              sender thread and the receiver thread, if necessary.
81              This creates the two ends of the connection; one sending
82              data, and the other receiving data.
83
84
85          Destroy - destroys a communicaiton point
86  */
87  static compoint_t *
88  Create( char *serviceLocation, char *serviceName,
89          char *senderLocation,  char *senderName,
90          char *receiverLocation, char *receiverName)
91  {
92          comid_t            *comid;
93          compoint_t   *compoint;
94          int             loadSender = 0;
95          int             loadReceiver = 0;
```

Fig. 16.B.4

```
96          primitive_t   *primitive   = NULL;
97
98          if( !serviceLocation && ! serviceName && ! senderName &&
!receiverName)
99                  return(NULL);
100
101         compoint = malloc(sizeof(compoint_t));
102         memset(compoint,'\0',sizeof(compoint_t));
103         compoint->senderList   = threadLink_f.create();
104         compoint->receiverList = threadLink_f.create();
105         compoint->rwlock   = threadrw_f.create();
106
107         if( serviceLocation || serviceName ) {
108                 compoint->service = registery_f.create(serviceLocation,
109                                                      serviceName);
110             if( compoint->service == NULL ) {
111                     free(compoint);
112                     fprintf(stderr,"service %s [%s] is not registered\n",
113                                     serviceName,serviceLocation);
114                     return(NULL);
115             }
116         }
117
118         if( senderLocation || senderName ) {
119 compoint->sender=primitive_f.create(senderLocation,senderName);
120             loadSender=1;
121         }
122         else if( compoint->service &&
123             (compoint->service->comid->senderPrimitive->location ||
124             compoint->service->comid->senderPrimitive->name)) {
125             compoint->sender =primitive_f.create(
126                 compoint->service->comid->senderPrimitive->location,
127                 compoint->service->comid->senderPrimitive->name);
128             loadSender=1;
129         }
130
```

Fig. 16.B.5

```
131     if( loadSender ) {
132             compoint->sender->threshold.min = 25;
133             compoint->sender->threshold.max = 50;
134             compoint->sender->threshold.pending = 0;
135             compoint->sender->connector = compoint;
136             primitive_f.load(compoint->sender);
137             threadLink_f.add(compoint->senderList,compoint->sender);
138     }
139
140     if( receiverLocation || receiverName ) {
141             compoint->receiver = primitive_f.create(receiverLocation,
142                                     receiverName);
143             loadReceiver = 1;
144     }
145     else if( compoint->service &&
146             (compoint->service->comid->receiverPrimitive->location ||
147             compoint->service->comid->receiverPrimitive->name)) {
148             compoint->receiver = primitive_f.create(
149                     compoint->service->comid->receiverPrimitive->location,
150                     compoint->service->comid->receiverPrimitive->name);
151             loadReceiver = 1;
152     }
153
154     if( loadReceiver ) {
155             compoint->receiver->connector = compoint;
156             compoint->receiver->threshold.min = 25;
157             compoint->receiver->threshold.max = 50;
158             compoint->receiver->threshold.pending = 0;
159             primitive_f.load(compoint->receiver);
160             threadLink_f.add(compoint->receiverList, compoint->receiver);
161     }
162
163
164     if( compoint->service &&
165       compoint->service->comid->serviceRegistration->name &&
166       compoint->service->comid->serviceRegistration->name[0] != '\0' ) {
167
```

Fig. 16.B.6

```
168            if(compoint->service->comid->serviceRegistration->location &&
169                compoint->service->comid->serviceRegistration->location[0] != 
'\0') {
170                compoint->service->comdata->handle = 
dlopen(compoint->service->comid->serviceRegistration->location, RTLD_NOW);
171                if( compoint->service->comdata->handle == NULL ) {
172                    fprintf(stderr,"error: can't dlopen(%s)\n",
173 
compoint->service->comid->serviceRegistration->location);
174                    exit(1);
175                }
176            }
177            else
178                compoint->service->comdata->handle = 
dlopen(NULL,RTLD_NOW);
179            compoint->service->comdata->function = 
dlsym(compoint->service->comdata->handle, 
compoint->service->comid->serviceRegistration->name);
180            if( compoint->service->comdata->function == NULL ) {
181                fprintf(stderr,"error: can't reference %s\n",
182 
compoint->service->comid->serviceRegistration->name);
183                exit(1);
184            }
185
186            if( compoint->service->comid->serviceAttributes & S_IDLE ) {
187 
thr_create(NULL,0,compoint->service->comdata->function,compoint,THR_DAEMON | 
THR_SUSPENDED | THR_BOUND ,&(compoint->service->comdata->id));
188                compoint->currentAttributes |= S_IDLE;
189            }
190            else
191 
thr_create(NULL,0,compoint->service->comdata->function,compoint,THR_DAEMON | 
THR_BOUND,&(compoint->service->comdata->id));
192        }
193        return(compoint);
```

Fig. 16.B.7

```
194 }
195
196 static int
197 Destroy( compoint_t *compoint )
198 {
199         primitive_f.destroy(compoint->sender);
200         threadLink_f.destroy(compoint->senderList);
201         primitive_f.destroy(compoint->receiver);
202         threadLink_f.destroy(compoint->receiverList);
203         registery_f.destroy(compoint->service);
204         threadrw_f.destroy(compoint->rwlock);
205         free(compoint);
206         return(0);
207 }
208
209 compoint_f_t compoint_f = {
210         Create,
211         Destroy,
212 };
```

Figure 17.A.1 comreg.h -- communication registration header file Page 1

```
 1
 2
 3  #define      S_DAEMON  0x00000001  /* start service as a daemon        */
 4  #define S_BOUND        0x00000002  /* start service as bound to LWP    */
 5  #define S_THREAD       0x00000004  /* start service as a thread        */
 6  #define S_PROCESS      0x00000010  /* start service as a process       */
 7  #define      S_LOCAL   0x00000020        /* start service locally
*/
 8  #define S_REMOTE       0x00000040  /* start service remotely           */
 9  #define S_STARTABLE    0x00000080  /* service is startable             */
10  #define S_NOT_MTSAFE   0x00000100  /* service isn't multithreaded safe */
11
12  #define S_PUBLIC 0x00001000  /* service is public                      */
13  #define S_PRIVATE      0x00002000  /* service is private               */
14  #define S_GEN_READER         0x00004000  /* default generic reader
connected */
15
16  #define S_SUSPENDED 0x00010000  /* service is suspended                */
17  #define S_RUNNING      0x00020000  /* service is running               */
18
19  #define S_IDLE         0x00100000  /* service is idle when not connect */
20
21  typedef struct _comid    {
22            point_t              *serviceRegistration;
23            point_t              *senderPrimitive;
24            point_t              *receiverPrimitive;
25            unsigned long        serviceAttributes;
26  } comid_t;
27
28  typedef struct _comid_f {
29            comid_t              (*reference)(char *, char *,
30                                 char *, char *,
31                                 char *, char *,
32                                 unsigned long);
33            int                  (*unreference)(char *, char *,
```

Figure 17.A.2

```
34                                         char *, char *,
35                                         char *, char *);
36  } comid_f_t;
37
38  extern comid_f_t comid_f;
```

Figure 17.B.1 comreg.c -- communication registration module

```
1   /*      comreg.c            */
2
3   #include <thread.h>
4   #include <synch.h>
5   #include <stdio.h>
6   #include <errno.h>
7   #include <malloc.h>
8   #include <dlfcn.h>
9
10  #include "threadLinks.h"
11  #include "threadrw.h"
12  #include "point.h"
13  #include "comreg.h"
14
15  #define     SENDER          ((unsigned short) 0x0001)
16  #define            RECEIVER ((unsigned short) 0x0002)
17  #define            SERVICE          ((unsigned short) 0x0004)
18
19  linkbase_t   *registeredCompoints = NULL;
20
21  static int
22  compareAll( void *m, void *n)
23  {
24          int      match   = 0;
25          comid_t  *member = m;
26          comid_t  *entry  = n;
27
28          match = compareService(member,entry) |
29                  compareSender(member,entry) |
```

Figure 17.B.2

```
30                compareReceiver(member,entry);
31            return(match);
32    }
33
34
35    static int
36    compareService( void *m, void *n)
37    {
38            int       match    = 0;
39            comid_t   *member  = m;
40            comid_t   *entry   = n;
41
42            match = strcmp(member->serviceRegistration->location,
43                           entry->serviceRegistration->location);
44            match |= strcmp(member->serviceRegistration->name,
45                            entry->serviceRegistration->name);
46            return(match);
47    }
48
49    static int
50    compareSender( void *m, void *n)
51    {
52            int       match    = 0;
53            comid_t   *member  = m;
54            comid_t   *entry   = n;
55
56            match = strcmp(member->senderPrimitive->location,
57                           entry->senderPrimitive->location)      |
58               strcmp(member->senderPrimitive->name,
59                           entry->senderPrimitive->name)           |
60               compareService(m,n);
61            return(match);
62    }
63
64    static int
65    compareReceiver( void *m, void *n)
66    {
67            int       match    = 0;
68            comid_t   *member  = m;
```

Figure 17.B.3

```
69          comid_t     *entry = n;
70
71          match =
strcmp(member->receiverPrimitive->location,entry->receiverPrimitive->location) |
72
strcmp(member->receiverPrimitive->name,entry->receiverPrimitive->name) |
compareService(m,n);
73          return(match);
74      }
75
76
77   static comid_t *
78   CreateComid(char *serviceLocation, char *serviceName,
79           char *senderLocation, char *senderName,
80           char *receiverLocation,char *receiverName)
81   {
82          comid_t     *comid;
83
84          comid = malloc(sizeof(comid_t));
85          memset(comid,'\0',sizeof(comid_t));
86          comid->serviceRegistration=
point_f.create(serviceLocation,serviceName);
87          comid->senderPrimitive   = point_f.create(senderLocation, senderName);
88          comid->receiverPrimitive =
point_f.create(receiverLocation,receiverName);
89          return(comid);
90   }
91
92   static void
93   DestroyComid(void *arg)
94   {
95          comid_t     *comid = arg;
96          if( comid ) {
97                  point_f.destroy(comid->serviceRegistration);
98                  point_f.destroy(comid->senderPrimitive);
99                  point_f.destroy(comid->receiverPrimitive);
100                 free(comid);
101         }
```

Figure 17.B.4

```
102     }
103
104     static comid_t *
105     ReferenceComid( char *serviceLocation, char *serviceName,
106                     char *senderLocation, char *senderName,
107                     char *receiverLocation,char *receiverName,
108                     unsigned long attributes)
109     {
110             mutex_t         mutex       = { 0 };
111             comid_t         *comid      = NULL;
112             comid_t         *member     = NULL;
113             unsigned short              compareLevel = 0;
114
115             mutex_lock( &mutex );
116             if( registeredCompoints == NULL ) {
117                     registeredCompoints = threadLink_f.create();
118                     if(registeredCompoints == NULL) {
119                             fprintf(stderr,"can't create registeredCompoints\n");
120                             mutex_unlock(&mutex);
121                             return(NULL);
122                     }
123             }
124             mutex_unlock( &mutex);
125             comid =
CreateComid(serviceLocation,serviceName,senderLocation,senderName,
126                             receiverLocation, receiverName);
127
128             compareLevel = SERVICE;
129             if( senderLocation != NULL || senderName != NULL ) {
130                     compareLevel |= SENDER;
131             }
132
133             if( receiverLocation != NULL || receiverName != NULL ) {
134                     compareLevel |= RECEIVER;
135             }
136             comid->serviceAttributes = attributes;
137
```

Figure 17.B.5

```
138        if( (compareLevel & (SERVICE | RECEIVER | SENDER
))==(SERVICE|RECEIVER|SENDER) ) {
139            member=threadLink_f.add_c(registeredCompoints,compareAll,
140                                 comid);
141        }
142
143        else if (compareLevel & RECEIVER ) {
144
member=threadLink_f.add_c(registeredCompoints,compareReceiver,
145                                 comid);
146        }
147        else if (compareLevel & SENDER ) {
148            member=threadLink_f.add_c(registeredCompoints,compareSender,
149                                 comid);
150        }
151        else  {
152
member=threadLink_f.add_c(registeredCompoints,compareService,
153                                 comid);
154        }
155        if( member == NULL ) {
156            fprintf(stderr,"ERROR: member is NULL\n");
157            exit(1);
158        }
159        if( member != comid && threadLink_f.findFirst(registeredCompoints) !=
comid ) {
160            DestroyComid(comid);
161            comid = NULL;
162        }
163        return(member);
164 }
165
166 static int
167 UnreferenceComid(char *serviceLocation, char *serviceName,
168            char *senderLocation, char *senderName,
169            char *receiverLocation,char *receiverName)
170 {
```

Figure 17.B.6

```
171        comid_t    *comid;
172        comid_t    *member;
173        int        errorCondition = 0;
174        int        compareLevel   = 0;
175
176        comid = CreateComid(serviceLocation,serviceName,senderLocation,
177                       senderName, receiverLocation, receiverName);
178        compareLevel = SENDER;
179        if( senderLocation II senderName )
180              compareLevel I= SENDER;
181        if( receiverLocation II receiverName )
182              compareLevel I= RECEIVER;
183
184
185        if (compareLevel & (RECEIVER & SENDER ) )
186              threadLink_f.delete_c(registeredCompoints,compareAll,
187                             comid, DestroyComid);
188        else if (compareLevel & RECEIVER )
189              threadLink_f.delete_c(registeredCompoints,compareReceiver,
190                             comid, DestroyComid);
191        else if (compareLevel & SENDER )
192              threadLink_f.delete_c(registeredCompoints,compareSender,
193                             comid, DestroyComid);
194        else
195              threadLink_f.delete_c(registeredCompoints,compareService,
196                             comid, DestroyComid);
197        DestroyComid(comid);
198  }
199
200  printComid( comid_t *comid)
201  {
202        fprintf(stderr,"communication point:\n");
203        fprintf(stderr,"    service registered:\n");
204        fprintf(stderr,"          location: %s\n",
comid->serviceRegistration->location);
205        fprintf(stderr,"          name: %s\n",
comid->serviceRegistration->name);
```

Figure 17.B.7

```
206        fprintf(stderr,"         sender registered:\n");
207        fprintf(stderr,"         location: %s\n",
comid->senderPrimitive->location);
208        fprintf(stderr,"         name: %s\n", comid->senderPrimitive->name);
209        fprintf(stderr,"         receiver registered:\n");
210        fprintf(stderr,"         location: %s\n",
comid->receiverPrimitive->location);
211        fprintf(stderr,"         name: %s\n",
comid->receiverPrimitive->name);
212        return(0);
213 }
214
215 listComids()
216 {
217        threadLink_f.printF(registeredCompoints, printComid);
218        return(0);
219 }
220
221
222 comid_f_t comid_f = {
223        ReferenceComid,
224        UnreferenceComid,
225 };
```

Figure 17.C.1

```
point.h -- communicaiton point header file
1
2
3   typedef struct _point    {
4            char    *name;
5            char    *location;
6            int     status;
7   } point_t;
8
9
10  typedef struct _point_f {
```

Figure 17.C.2

```
11              point_t             *(*create)(char *, char *);
12              int                 (*destroy)(point_t *);
13      } point_f_t;
14
15      extern point_f_t    point_f;
```

Figure 17.D.

point.c -- communication point module

```
1   #include <thread.h>
2   #include <synch.h>
3   #include <stdio.h>
4   #include <errno.h>
5   #include <malloc.h>
6   #include <dlfcn.h>
7
8
9   #include "threadLinks.h"
10  #include "threadrw.h"
11  #include "point.h"
12
13  static point_t *
14  CreatePoint(char *location, char *name)
15  {
16          point_t             *point;
17
18          point = malloc(sizeof(point_t));
19          point->name = malloc(strlen(name)+1);
20          strcpy(point->name, name);
21          point->location = malloc(strlen(location)+1);
22          if( location )
23                  strcpy(point->location, location);
24          else
25                  point->location[0]='\0';
26
27          point->status  = 0;
28          return(point);
```

Figure 17.D.2

```
29  }
30
31  static int
32  DestroyPoint( point_t *point )
33  {
34      if( point ) {
35          if( point->name )
36              free(point->name);
37          if( point->location)
38              free(point->location);
39          free(point);
40      }
41      return(0);
42  }
43
44  point_f_t point_f = {
45      CreatePoint,
46      DestroyPoint,
47  };
```

Figure 18.A.

threadCondv.h -- thread condition variable header file Page 1

```
1
2   typedef struct _threadCondv_f   {
3                   cond_t *(*create)(void);
4                   int    (*destroy)(cond_t *);
5   } threadCondv_t;
6
7   extern threadCondv_t threadCondv_f;
```

Figure 18.B.1 threadCondv.c -- thread condition variable module Page 1

```
1   #include <malloc.h>
2   #include <memory.h>
```

Figure 18.B.2

```
3   #include <synch.h>
4   #include <thread.h>
5   #include <errno.h>
6
7   #include "mthreadLog.h"
8   #include "threadCondv.h"
9
10  static cond_t     *Create(void);
11  static int        Destroy(cond_t *);
12
13  static cond_t *
14  Create(void)
15  {
16          cond_t      *condvPtr      = NULL;
17          int         errorCondition = 0;
18
19          condvPtr = (cond_t *) malloc(sizeof(cond_t));
20          if( condvPtr == NULL )
21                  threadLog_f.setError(ENOMEM);
22          else {
23                  memset((void *)condvPtr,'\0', sizeof(cond_t));
24                  errorCondition = cond_init( condvPtr, USYNC_THREAD, NULL);
25                  if ( errorCondition ) {
26                          free((void *) condvPtr );
27                          condvPtr = NULL;
28                          threadLog_f.setError( errorCondition );
29                  }
30          }
31          return(condvPtr);
32  }
33
34  static int
35  Destroy( cond_t *condvPtr)
36  {
37          int    errorCondition = 0;
38
39          errorCondition = cond_destroy(condvPtr);
40          if( errorCondition )
```

Figure 18.B.3

```
41              threadLog_f.setError( errorCondition );
42          else
43              free((void *)condvPtr);
44          return( errorCondition );
45      }
46
47
48      threadCondv_t   threadCondv_f = {
49                      Create,
50                      Destroy,
51      };
```

Figure 19.A.

generic.h -- generic compoint header file Page 1

```
1   #define         CLIENT_TO_SERVICE       0x00000001
2   #define         SERVICE_TO_CLIENT       0x00000002
3
4   #define         CLIENT_FROM_SERVICE     0x00000001
5   #define         SERVICE_FROM_CLIENT     0x00000002
6
7   #define         CONNECT                 0x00000001
8
9   #define         S_PENDING               0x00000001
10  #define         S_DUPLICATE             0x00000002
11
12  typedef struct _generic_f {
13          int     (*connect)(compoint_t *,compoint_t *,int);
14          int     (*disconnect)(compoint_t *, compoint_t *,int);
15          int     (*send)(compoint_t *, char *, int,int );
16          int     (*receive)(compoint_t *, char**,int, int *,int);
17          int     (*clear)(compoint_t *, char**,int,void *(function)(void *));
18  } generic_f_t;
19
20  extern generic_f_t generic_f;
```

Figure 19.B.1 generic.c -- generic compoint module

```
1   #include <thread.h>
2   #include <synch.h>
3   #include <stdio.h>
4   #include <errno.h>
5   #include <malloc.h>
6   #include <dlfcn.h>
7
8   #include "threadLinks.h"
9   #include "threadrw.h"
10  #include "primid.h"
11  #include "primdata.h"
12  #include "primitive.h"
13  #include "point.h"
14  #include "comreg.h"
15  #include "comdata.h"
16  #include "comframe.h"
17  #include "registery.h"
18  #include "compoints.h"
19  #include "generic.h"
20
21  #define MIN(a)          (a->threshold.min)
22  #define MAX(a)          (a->threshold.max)
23  #define PENDING(a)      (a->threshold.pending)
24  #define RECEIVE(a)      (((primops_f_t *)a->primops)->receive)
25  #define SEND(a)         (((primops_f_t *)a->primops)->send)
26  #define COMLINK(a)      (a->data->comlink)
27  #define CONNECTID(a)    (a->connector->service->comdata->id)
28  #define SERVICEID(a)    (a->service->comdata->id)
29
30  #define      S_FAIL       0x01
31  #define      S_SUCCESS    0x02
32
33  static int
34  Disconnect(compoint_t *service, compoint_t *client, int connectionType)
35  {
36          int          errorCondition       = 0;
```

Figure 19.B.2

```
37      primitive_t    *senderPrimitive   = NULL;
38      primitive_t    *receiverPrimitive = NULL;
39
40      if( ! (service && client) )
41              return(EINVAL);
42
43      if( connectionType & SERVICE_FROM_CLIENT) {
44              rw_wrlock(service->rwlock);
45              rw_wrlock(client->rwlock);
46              threadLink_f.delete(service->senderList,client->receiver,NULL);
47              threadLink_f.delete(client->receiverList,service->sender,NULL);
48              --(service->sender->data->status);
49              --(client->receiver->data->status);
50              if( service->sender->data->status == 0 &&
51                  service->service->comid->serviceAttributes & S_IDLE)
52              {
53                      thr_suspend(SERVICEID(service));
54                      service->currentAttributes &= ~S_IDLE;
55              }
56              rw_unlock(service->rwlock);
57              rw_unlock(client->rwlock);
58      }
59      if( connectionType & CLIENT_FROM_SERVICE) {
60              rw_wrlock(client->rwlock);
61              rw_wrlock(service->rwlock);
62              threadLink_f.delete(client->senderList,service->receiver,NULL);
63              threadLink_f.delete(service->receiverList,client->sender,NULL);
64              --(client->sender->data->status);
65              --(service->receiver->data->status);
66              rw_unlock(client->rwlock);
67              rw_unlock(service->rwlock);
68      }
69
70      return(errorCondition);
71 }
72
73
74 static int
```

Figure 19.B.3

```
75   Connect(compoint_t *service, compoint_t *client, int connectionType )
76   {
77        int            errorCondition    = 0;
78        primitive_t    *senderPrimitive   = NULL;
79        primitive_t    *receiverPrimitive = NULL;
80
81        if( ! (service && client) )
82                return(EINVAL);
83
84        if( connectionType & SERVICE_TO_CLIENT) {
85                rw_wrlock(service->rwlock);
86                rw_wrlock(client->rwlock);
87                threadLink_f.add(service->senderList,client->receiver);
88                threadLink_f.add(client->receiverList,service->sender);
89                ++(service->sender->data->status);
90                ++(client->receiver->data->status);
91                rw_unlock(service->rwlock);
92                rw_unlock(client->rwlock);
93        }
94        if( connectionType & CLIENT_TO_SERVICE ) {
95                rw_wrlock(service->rwlock);
96                rw_wrlock(client->rwlock);
97                threadLink_f.add(client->senderList,service->receiver);
98                threadLink_f.add(service->receiverList,client->sender);
99                ++(client->sender->data->status);
100               ++(service->receiver->data->status);
101               rw_unlock(service->rwlock);
102               rw_unlock(client->rwlock);
103       }
104       if( service ) {
105               rw_wrlock(service->rwlock);
106               if( service->currentAttributes & S_IDLE ) {
107                       thr_continue(SERVICEID(service));
108                       service->currentAttributes &= ~S_IDLE;
109               }
110               rw_unlock(service->rwlock);
111       }
112       return(errorCondition);
```

Figure 19.B.4

```
113    }
114
115
116    static int
117    Receive( compoint_t *compoint, char **buffer, int maxsize, int *size, int flags)
118    {
119            int             errorCondition = 0;
120            int             receiveCode    = 0;
121            primitive_t     *primitive = NULL;
122            link_t          *linkPtr   = NULL;
123
124            if( ! (compoint && buffer && size) ) {
125                    return(EINVAL);
126            }
127
128            rw_rdlock(compoint->rwlock);
129            threadLink_f.readLock(compoint->receiverList);
130            linkPtr = compoint->receiverList->head;
131            if( linkPtr == NULL ) {
132                    rw_unlock(compoint->rwlock);
133                    return(EINVAL);
134            }
135
136            while( linkPtr != NULL ) {
137                    primitive = (primitive_t *) linkPtr->data;
138
139                    if( ! (primitive && primitive->primops && primitive->data) ) {
140                            threadLink_f.unlock(compoint->receiverList);
141                            rw_unlock(compoint->rwlock);
142                            return(EINVAL);
143                    }
144
145                    if( primitive->data->status) {
146                            mutex_lock(primitive->mutex);
147                            if( flags & S_PENDING ) {
148                                    if( PENDING(primitive))
149
```

Figure 19.B.5

```
    errorCondition=(RECEIVE(primitive))(COMLINK(primitive),
150                                             buffer, maxsize,size);
151                         else
152                                 receiveCode |= S_FAIL;
153                     }
154                 else
155
    errorCondition=(RECEIVE(primitive))(COMLINK(primitive),
156                                             buffer, maxsize,size);
157                     if( ! errorCondition ) {
158                         receiveCode |= S_SUCCESS;
159                         --(PENDING(primitive));
160                         if(PENDING(primitive)< MIN(primitive))
161                             thr_continue(CONNECTID(primitive) );
162                     }
163                     else {
164                         receiveCode |= S_FAIL;
165                     }
166                     mutex_unlock(primitive->mutex);
167             }
168             else {
169                 receiveCode |= S_FAIL;
170             }
171             linkPtr = linkPtr->forward;
172         }
173         threadLink_f.unlock(compoint->receiverList);
174         rw_unlock(compoint->rwlock);
175         if( receiveCode & S_SUCCESS )
176             return(errorCondition);
177         else if( receiveCode & S_FAIL)
178             return(EINVAL);
179         return(errorCondition);
180 }
181
182 static int
183 Send(compoint_t *compoint, char *buffer, int size, int flags)
184 {
185
```

Figure 19.B.6

```
186
187     int          errorCondition = 0;
188     int          sendCode       = 0;
189     int          mutexIsLocked  = 0;
190     primitive_t  *primitive     = NULL;
191     link_t       *linkPtr       = NULL;
192     void         *data          = NULL;
193
194                  /* validate parameters returning EINVAL on failure */
195     if( ! (compoint && buffer) ) {
196             return(EINVAL);
197     }
198
199     rw_rdlock(compoint->rwlock);
200     threadLink_f.readLock( compoint->senderList );
201     linkPtr  = compoint->senderList->head;
202     if( linkPtr == NULL ) {
203             rw_unlock(compoint->rwlock);
204             threadLink_f.unlock(compoint->senderList);
205             return(0);
206     }
207     if( flags & S_DUPLICATE ) {
208             data = malloc(size);
209             memcpy(data,buffer,size);
210     }
211     else
212             data = buffer;
213
214     while( linkPtr ) {
215             primitive = (primitive_t *)linkPtr->data;
216             if( ! (primitive && primitive->primops && primitive->data) )
217                     break;
218
219             errorCondition = mutex_lock(primitive->mutex);
220             if( errorCondition ) {
221                     threadLink_f.unlock(compoint->senderList);
222                     rw_unlock(compoint->rwlock);
```

Figure 19.B.7

```
223                    return(errorCondition);
224            }
225
226            mutexIsLocked = 1;
227            if( primitive->data->status ) {
228                    errorCondition = (SEND(primitive))(COMLINK(primitive),
229                                            data, size);
230                    if( ! errorCondition ) {
231                            ++(PENDING(primitive));
232                            if( PENDING(primitive) > MAX(primitive)){
233                                    mutex_unlock( primitive->mutex);
234                                    mutexIsLocked = 0;
235                                    rw_unlock(compoint->rwlock);
236                                    threadLink_f.unlock(compoint->senderList);
237                                    thr_suspend( SERVICEID(compoint));
238                            }
239                            sendCode |= S_SUCCESS;
240                    }
241                    else   {
242                            sendCode |= S_FAIL;
243                    }
244            }
245            else
246                    sendCode |= S_FAIL;
247
248            mutex_unlock( primitive->mutex);
249            linkPtr = linkPtr->forward;
250    }
251    if( mutexIsLocked ) {
252            mutex_unlock(primitive->mutex);
253            rw_unlock(compoint->rwlock);
254            threadLink_f.unlock(compoint->senderList);
255    }
256    if( sendCode & S_SUCCESS )
257            return(errorCondition);
258    else if(sendCode & S_FAIL) {
259            if( flags & S_DUPLICATE)
```

Figure 19.B.8

```
260                free(data);
261                return(EINVAL);
262            }
263            return(errorCondition);
264    }
265
266
267    int
268    Clear(compoint_t *compoint, char **buffer, int maxsize,void *(function)(void *))
269    {
270        int    s = 0;
271
272        while( Receive(compoint,buffer,maxsize,&s,S_PENDING) == 0 ) {
273            function(buffer);
274        }
275        return(0);
276    }
277
278    generic_f_t generic_f = {
279        Connect,
280        Disconnect,
281        Send,
282        Receive,
283        Clear,
284    };
```

Figure 20.A.1 threadLinks.h -- thread link list header file

```
1    /* threadLinks.h */
2
3    #if ! defined(THREADLINKS_H)
4    #define THREADLINKS_H
5
6    #define     TRUE     0
```

Figur 20.A.2

```
7   #define FALSE      -1
8   #define      ADD   1
9   #define DELETE     2
10
11  typedef struct      _link {
12              struct _link   *forward;
13              struct _link   *backward;
14              void           *data;
15              unsigned long        referenceCount;
16  } link_t;
17
18
19  typedef struct      _linkbase {
20              struct _link   *head;
21              struct _link   *tail;
22              rwlock_t       *rwlock;
23  } linkbase_t;
24
25
26  typedef struct      _linkop     {
27              linkbase_t  *base;
28              int         (*function)(void *);
29              void        *data;
30              int         op_type;
31  } linkop_t;
32
33  typedef struct _threadLink_t     {
34         linkbase_t *(*create)( void );
35         int        (*destroy)( linkbase_t *);
36         int        (*writeLock)(linkbase_t *);
37         int        (*readLock)(linkbase_t *);
38         int        (*unlock)(linkbase_t *);
39         int        (*add)(linkbase_t *, void *);
40         int        (*delete)(linkbase_t *, void *, int (*destructor)(void *) );
41         void       *(*findFirst)(linkbase_t *);
42         int        (*printF)( const linkbase_t *,void (*function)() );
43         int        (*printB)( const linkbase_t *, void (*function)() );
44         void       *(*reference)( const linkbase_t *, const void *);
```

Figure 20.A.3

```
45      int         (*unreference)( const linkbase_t *, const void *);
46      long        (*getReference)(const linkbase_t *, const void *);
47      void        *(*op)( void *);
48      void        *(*apply)(const linkbase_t *,int (*function)(void *,void *),void *);
49   } threadlink_t;
50
51
52   extern threadlink_t threadLink_f;
53
54   #endif
```

Figure 20.B.1 threadLinks.c -- thread link list module

```
1    /* threadLinks.c */
2
3    #include <thread.h>
4    #include <synch.h>
5    #include <malloc.h>
6    #include <errno.h>
7    #include <memory.h>
8
9    #include "threadLinks.h"
10   #include "threadrw.h"
11   #include "mthreadLog.h"
12
13   static int          Add(linkbase_t *,void *);
14   static int          Delete(linkbase_t *,void *,int (destructor)(void *));
15   static int          Destroy(linkbase_t *);
16   static int          PrintB(const linkbase_t *,void (function)(void *) );
17   static int          PrintF(const linkbase_t *,void (function)(void *) );
18   static int          ReadLock(linkbase_t *);
19   static int          Unlock(linkbase_t *);
20   static int          Unreference(const linkbase_t *,const void *);
21   static int          WriteLock(linkbase_t *);
22   static linkbase_t   *Create(void);
23   static long         Getreference(const linkbase_t *,const void *);
```

Figure 20.B.2

```
24    static  void          *Apply(const linkbase_t *,
25                              int (function)(void *, void *),void *arg );
26    static  void          *First(linkbase_t *);
27    static  void          *Operation(void *);
28    static  void          *Reference(const linkbase_t *,const void *);
29
30    static linkbase_t *
31    Create( void )
32    {
33            linkbase_t * linkbasePtr = NULL;
34
35            threadLog_f.setError(0);
36            linkbasePtr = (linkbase_t *) malloc(sizeof(linkbase_t));
37
38            if( linkbasePtr == NULL )
39                    threadLog_f.setError(ENOMEM);
40            else {
41                    memset(linkbasePtr,'\0',sizeof(linkbase_t));
42                    linkbasePtr->rwlock   = threadrw_f.create();
43                    if( linkbasePtr->rwlock == NULL ) {
44                            free(linkbasePtr);
45                            linkbasePtr = NULL;
46                    }
47            }
48
49            return( linkbasePtr);
50    }
51
52
53    static int
54    Destroy( linkbase_t *linkbasePtr )
55    {
56            int     errorCondition = 0;
57
58            threadLog_f.setError(0);
59            if( ! linkbasePtr ) {
60                    threadLog_f.setError(EINVAL);
61                    return(EINVAL);
```

Figure 20.B.3

```
62          }
63          else
64                  errorCondition = threadrw_f.destroy( linkbasePtr->rwlock);
65
66          if( ! errorCondition )
67                  free(linkbasePtr);
68          else
69                  threadLog_f.setError(errorCondition);
70
71          return(errorCondition);
72  }
73
74
75  static int
76  WriteLock(linkbase_t *linkbasePtr )
77  {
78          int     errorCondition = 0;
79
80          if( linkbasePtr == NULL )
81                  errorCondition = EINVAL;
82          else
83                  errorCondition = rw_wrlock( linkbasePtr->rwlock );
84          return(errorCondition);
85  }
86
87  static int
88  ReadLock(linkbase_t *linkbasePtr )
89  {
90          int     errorCondition = 0;
91
92          if( linkbasePtr == NULL )
93                  errorCondition = EINVAL;
94          else
95                  errorCondition = rw_rdlock( linkbasePtr->rwlock );
96
97          return(errorCondition);
98  }
99
```

Figure 20.B.4

```
100  static int
101  Unlock( linkbase_t *linkbasePtr )
102  {
103          int     errorCondition = 0;
104
105          if( linkbasePtr == NULL )
106                  errorCondition = EINVAL;
107          else
108                  errorCondition = rw_unlock( linkbasePtr->rwlock );
109
110          return(errorCondition);
111  }
112
113
114  static int
115  Add(linkbase_t *linkbasePtr, void *data )
116  {
117          int     errorCondition = 0;
118          link_t  *linkPtr        = NULL;
119
120          if( linkbasePtr == NULL || data == NULL )
121                  return(EINVAL);
122
123          linkPtr = (link_t *) malloc( sizeof(link_t));
124
125          if( linkPtr == NULL )
126                  return(ENOMEM);
127          memset(linkPtr,'\0', sizeof(link_t));
128
129          linkPtr->data = data;
130
131          errorCondition = rw_wrlock( linkbasePtr->rwlock );
132          if( errorCondition )
133                  free(linkPtr);
134
135          else if( linkbasePtr->head == NULL ) {
136                  linkbasePtr->head = linkPtr;
137                  linkbasePtr->tail = linkPtr;
```

Figure 20.B.5

```
138            }
139
140            else {
141                    linkbasePtr->tail->forward = linkPtr;
142                    linkPtr->backward         = linkbasePtr->tail;
143                    linkbasePtr->tail         = linkPtr;
144            }
145            (void) rw_unlock( linkbasePtr->rwlock);
146
147            return(errorCondition);
148    }
149
150
151
152    static int
153    Delete(linkbase_t *linkbasePtr, void *data, int (destructor)(void *) )
154    {
155            link_t *linkPtr      = NULL;
156            int     errorCondition = 0;
157
158            threadLog_f.setError(0);
159            if( linkbasePtr == NULL || data == NULL )
160                    errorCondition = EINVAL;
161            else
162                    errorCondition = rw_wrlock( linkbasePtr->rwlock );
163
164            if( errorCondition ) {
165                    threadLog_f.setError(errorCondition);
166                    return(errorCondition);
167            }
168
169            linkPtr = linkbasePtr->head;
170
171            while( linkPtr ) {
172                    if( linkPtr->data == data )
173                            break;
174                    linkPtr = linkPtr->forward;
175            }
```

Figure 20.B.6

```
176
177     if( linkPtr ) {
178             if( linkPtr->referenceCount != 0 )
179                     errorCondition = EBUSY;
180             else {
181                     if( linkPtr->backward )
182                             linkPtr->backward->forward= linkPtr->forward;
183
184                     if( linkPtr->forward )
185                             linkPtr->forward->backward= linkPtr->backward;
186
187                     if( linkbasePtr->tail == linkPtr )
188                             linkbasePtr->tail = linkPtr->backward;
189
190                     if( linkbasePtr->head == linkPtr )
191                             linkbasePtr->head = linkPtr->forward;
192             }
193     }
194     else
195             errorCondition = ESRCH;
196
197     (void) rw_unlock( linkbasePtr->rwlock);
198
199     if( errorCondition )
200             threadLog_f.setError(errorCondition);
201
202     if( !errorCondition && linkPtr ) {
203             if( destructor ) {
204                     errorCondition = destructor(linkPtr->data);
205                     if( ! errorCondition )
206                             free( (void *) linkPtr );
207             }
208             else
209                     free((void *)linkPtr);
210     }
211
212     return(errorCondition);
213 }
```

Figure 20.B.7

```
214
215     static void *
216     First( linkbase_t *linkbasePtr)
217     {
218             link_t   *linkPtr       = NULL;
219             void     *data          = NULL;
220             int      errorCondition = 0;
221
222             if( linkbasePtr == NULL ) {
223                     threadLog_f.setError(EINVAL);
224                     return(NULL);
225             }
226
227             errorCondition = rw_wrlock( linkbasePtr->rwlock );
228             linkPtr = linkbasePtr->head;
229             if( linkPtr ) {
230                     if( linkPtr->referenceCount == 0 ) {
231                             linkbasePtr->head = linkPtr->forward;
232                             data              = linkPtr->data;
233                             free(linkPtr);
234                     }
235                     else
236                             errorCondition = EBUSY;
237             }
238             (void) rw_unlock( linkbasePtr->rwlock);
239             if( errorCondition )
240                     threadLog_f.setError(errorCondition);
241             return( data );
242     }
243
244     static int
245     PrintF( const linkbase_t *linkbasePtr,void (function)(void *) )
246     {
247             int      errorCondition = 0;
248             link_t   *linkPtr       = NULL;
249
250             if( linkbasePtr == NULL || function == NULL )
251                     return(EINVAL);
```

Figure 20.B.8

```
252
253        errorCondition = rw_rdlock( linkbasePtr->rwlock );
254        if( errorCondition )
255                return(errorCondition);
256
257        linkPtr = linkbasePtr->head;
258        if( ! linkPtr ) {
259                (void)rw_unlock(linkbasePtr->rwlock);
260                return(ESRCH);
261        }
262
263        while( linkPtr ) {
264                function(linkPtr->data );
265                linkPtr = linkPtr->forward;
266        }
267
268        (void)rw_unlock( linkbasePtr->rwlock);
269
270        return( 0 );
271 }
272
273
274 static int
275 PrintB( const linkbase_t *linkbasePtr, void (function)(void *) )
276 {
277        int      errorCondition   = 0;
278        link_t   *linkPtr         = NULL;
279
280        if( linkbasePtr == NULL || function == NULL)
281                return(EINVAL);
282
283        errorCondition = rw_rdlock( linkbasePtr->rwlock );
284        if( errorCondition )
285                return(errorCondition);
286
287        linkPtr = linkbasePtr->tail;
288
289        while( linkPtr ) {
```

Figure 20.B.9

```
290                 function(linkPtr->data );
291                 linkPtr = linkPtr->backward;
292         }
293
294
295         (void) rw_unlock( linkbasePtr->rwlock);
296
297         return( 0 );
298 }
299
300
301 static void *
302 Reference( const linkbase_t *linkbasePtr, const void *data )
303 {
304         int     errorCondition  = 0;
305         link_t  *linkPtr = NULL;
306
307         if( linkbasePtr == NULL || data == NULL ) {
308                 threadLog_f.setError(EINVAL);
309                 return(NULL);
310         }
311
312         errorCondition = rw_rdlock( linkbasePtr->rwlock );
313         if( errorCondition ) {
314                 threadLog_f.setError(errorCondition);
315                 return(NULL);
316         }
317
318         linkPtr = linkbasePtr->head;
319
320         while( linkPtr ) {
321                 if( linkPtr->data == data ) {
322                         linkPtr->referenceCount++;
323                         break;
324                 }
325                 linkPtr = linkPtr->forward;
326         }
327
```

Figure 20.B.10

```
328        rw_unlock( linkbasePtr->rwlock);
329
330        if( ! linkPtr ) {
331                threadLog_f.setError(ESRCH);
332                data = NULL;
333        }
334        return( linkPtr->data );
335  }
336
337
338  static int
339  Unreference( const linkbase_t *linkbasePtr, const void *data )
340  {
341        int     errorCondition   = 0;
342        link_t  *linkPtr = NULL;
343
344        if( linkbasePtr == NULL || data == NULL )
345                return(EINVAL);
346
347        errorCondition = rw_rdlock( linkbasePtr->rwlock );
348        if( errorCondition )
349                return( errorCondition );
350
351        linkPtr = linkbasePtr->head;
352
353        while( linkPtr ) {
354                if( linkPtr->data == data ) {
355                        linkPtr->referenceCount--;
356                        break;
357                }
358                linkPtr = linkPtr->forward;
359        }
360
361        rw_unlock( linkbasePtr->rwlock);
362
363        if( ! linkPtr )
364                errorCondition = ESRCH;
365
```

Figure 20.B.11

```
366            return( errorCondition );
367    }
368
369    static long
370    Getreference( const linkbase_t *linkbasePtr, const void *data )
371    {
372            int     errorCondition = 0;
373            link_t  *linkPtr        = NULL;
374            long    referenceCount  = 0;
375
376            threadLog_f.setError(0);
377            if( linkbasePtr == NULL || data == NULL ) {
378                    threadLog_f.setError(EINVAL);
379                    return(-1);
380            }
381
382            errorCondition = rw_rdlock( linkbasePtr->rwlock );
383            if( errorCondition ) {
384                    threadLog_f.setError(errorCondition);
385                    return(-1);
386            }
387
388            linkPtr = linkbasePtr->head;
389
390            while( linkPtr ) {
391                    if( linkPtr->data == data ) {
392                            referenceCount = linkPtr->referenceCount;
393                            break;
394                    }
395                    linkPtr = linkPtr->forward;
396            }
397
398            rw_unlock( linkbasePtr->rwlock);
399
400            if( ! linkPtr ) {
401                    threadLog_f.setError(ESRCH);
402                    return(-1);
403            }
```

Figure 20.B.12

```
404            return( referenceCount );
405    }
406
407    static void *
408    Operation( void *dataPtr )
409    {
410
411            linkop_t    *linkop;
412            int         errorCondition;
413
414            linkop = (linkop_t *) dataPtr;
415            if( linkop == NULL )
416                    return((void*)EINVAL);
417
418            if(linkop->op_type != ADD && linkop->op_type != DELETE)
419                    return((void *)EINVAL);
420
421            if( linkop->op_type == ADD )
422                    errorCondition= Add(linkop->base,
423                                        linkop->data);
424
425            else if( linkop->op_type == DELETE )
426                    errorCondition= Delete(linkop->base,
427                                           linkop->data,
428                                           linkop->function);
429
430            free(linkop);
431
432            return( (void *)errorCondition);
433    }
434
435    static void *
436    Apply( const linkbase_t *linkbasePtr,int (function)(void *, void *),void *arg )
437    {
438            int     errorCondition  = 0;
439            link_t  *linkPtr        = NULL;
440
441            if( linkbasePtr == NULL || function == NULL ) {
```

Figure 20.B.13

```
442                 threadLog_f.setError(EINVAL);
443                 return(NULL);
444         }
445
446         errorCondition = rw_rdlock( linkbasePtr->rwlock );
447         if( errorCondition ) {
448                 threadLog_f.setError(errorCondition);
449                 return(NULL);
450         }
451
452         linkPtr = linkbasePtr->head;
453         if( ! linkPtr ) {
454                 (void)rw_unlock(linkbasePtr->rwlock);
455                 threadLog_f.setError(ESRCH);
456                 return(NULL);
457         }
458
459         while( linkPtr ) {
460                 if( function(linkPtr->data, arg ) == 0 ).
461                         break;
462                 linkPtr = linkPtr->forward;
463         }
464
465         (void)rw_unlock( linkbasePtr->rwlock);
466
467         if( linkPtr != NULL )
468                 return( linkPtr->data );
469         return(NULL);
470 }
471
472 threadlink_t threadLink_f = {
473         Create,
474         Destroy,
475         WriteLock,
476         ReadLock,
477         Unlock,
478         Add,
479         Delete,
```

Figure 20.B.14

```
480         First,
481         PrintF,
482         PrintB,
483         Reference,
484         Unreference,
485         Getreference,
486         Operation,
487         Apply
488    };
489
```

Figure 21.A.1 mthreadLog.h Page 1
```
 1    #if ! defined(MTHREADLOG_H)
 2    #     define MTHREADLOG_H
 3
 4    typedef struct    {
 5           thread_key_t       appErrno;
 6           int                isSet;
 7           mutex_t            mutex;
 8    } threadKey_t;
 9
10    typedef struct    {
11           char      fileName[BUFSIZ];
12           FILE      *stream;
13           int       calls;
14           mutex_t   mutex;
15           long      head;
16           long      tail;
17    } threadLog_t;
18
19    #     define HIGHWATERMARK     200
20    #     define LOWWATERMARK      100
21
22    typedef struct _threadlog_t     {
```

Figure 21.A.2

```
23      int     (*getError)(void);
24      int     (*hasError)(void);
25      int     (*clearError)(void);
26      void    (*setError)(const int);
27      void    (*message)(const char *, ...);
28      int     (*open)( const char *);
29      int     (*close)(void);
30      int     (*setWaterMarks)(const int, const int);
31  } threadlog_t;
32
33  extern threadlog_t  threadLog_f;
34
35  #endif
```

Figure 21.B.1 mthreadLog.c Page 1 Mutex Thread Log Module.

```
1   #include <stdio.h>
2   #include <thread.h>
3   #include <stdarg.h>
4   #include <malloc.h>
5   #include <synch.h>
6   #include <errno.h>
7   #include <stdlib.h>
8   #include <string.h>
9   #include <unistd.h>
10
11  #include "mthreadLog.h"
12
13  static threadKey_t   threadKey    = { 0 , 0 };
14  static threadLog_t   threadLog    = { "", stderr, 0, { 0 }, 0L, 0L };
15
16  static int      HighWaterMark = HIGHWATERMARK;
17  static int      LowWaterMark  = LOWWATERMARK;
18
19  static int      ClearError(void);
20  static int      Close(void);
```

Figure 21.B.2

```
21  static int      GetError(void);
22  static int      HasError(void);
23  static int      Initialize(void);
24  static void     Message(const char *, ...);
25  static void     Minimize(void);
26  static int      Open(const char *);
27  static void     SetError(const int);
28  static int      SetWaterMarks(const int, const int);
29
30  static int
31  Initialize(void)
32  {
33          int     *errorCode    = NULL;
34          int     errorCondition = 0;
35
36          mutex_lock( &threadKey.mutex );
37          if( ! threadKey.isSet ) {
38                  errorCondition = thr_keycreate(&threadKey.appErrno, free);
39                  if( ! errorCondition )
40                          threadKey.isSet = 1;
41          }
42          mutex_unlock( &threadKey.mutex );
43
44          if( ! errorCondition ) {
45                  errorCode = malloc(sizeof(int));
46                  if( errorCode == NULL )
47                          errorCondition = ENOMEM;
48                  else    {
49                          *errorCode= 0;
50                          errorCondition = thr_setspecific( threadKey.appErrno,
51                                                  errorCode);
52                          if( errorCondition )
53                                  free(errorCode);
54                  }
55          }
56          return( errorCondition );
57  }
58
```

Figure 21.B.3

```
59
60   static int
61   GetError(void)
62   {
63          int     *errorCode = NULL;
64
65          if( threadKey.isSet )
66                  errorCode = (int *) thr_getspecific( threadKey.appErrno);
67
68          return( errorCode ? *errorCode : 0 );
69   }
70
71   static int
72   HasError(void)
73   {
74          int     *errorCode = NULL;
75
76          if( threadKey.isSet )
77                  errorCode = (int *) thr_getspecific( threadKey.appErrno);
78
79          return( errorCode != NULL ?( *errorCode ? 1 : 0) : 0 );
80   }
81
82   static int
83   ClearError(void)
84   {
85          int     *errorCode = NULL;
86
87          if( threadKey.isSet )
88                  errorCode = (int *) thr_getspecific( threadKey.appErrno );
89
90          if( errorCode != NULL )
91                  *errorCode = 0;
92
93          return(0);
94   }
95
96   static void
```

Figure 21.B.4

```
 97  SetError(const int code)
 98  {
 99          int     *errorCode = NULL;
100
101          if( threadKey.isSet && Initialize() != 0 )
102                  return;
103
104          errorCode = thr_getspecific( threadKey.appErrno );
105
106          if( errorCode == NULL ) {
107                  if( Initialize() != 0 )
108                          return;
109                  errorCode = thr_getspecific( threadKey.appErrno );
110          }
111          *errorCode = code;
112          return;
113  }
114
115  static void
116  Message(const char *format, ...)
117  {
118          va_list         args;
119          int     *errorCode = NULL;
120
121          if( format == NULL )
122                  return;
123
124          mutex_lock( &threadLog.mutex );
125
126          if( threadLog.stream != stderr ) {
127                  ++threadLog.calls;
128                  if( threadLog.calls == LowWaterMark )
129                          threadLog.head = ftell( threadLog.stream);
130
131                  if( threadLog.calls == HighWaterMark ) {
132                          threadLog.tail = ftell(threadLog.stream) -1L;
133                          Minimize();
```

Figure 21.B.5

```
134                    }
135            }
136
137            va_start(args, format);
138            fprintf(threadLog.stream,"Thread [%d]: ", thr_self());
139            vfprintf(threadLog.stream, format, args);
140            va_end(args);
141
142            if( threadKey.isSet ) {
143                    errorCode =(int *) thr_getspecific(threadKey.appErrno);
144                    if( errorCode != NULL && *errorCode != 0)
145                            fprintf(threadLog.stream,"Error [%u].",*errorCode);
146            }
147            fprintf(threadLog.stream, "\n");
148            mutex_unlock( &threadLog.mutex );
149            return;
150 }
151
152 static int
153 Open( const char *fileName)
154 {
155            int     errorCondition = 0;
156
157            mutex_lock( &threadLog.mutex );
158
159            if( threadLog.stream != stderr )
160                    errorCondition = EAGAIN;
161
162            else if( fileName != NULL ) {
163                    threadLog.stream = fopen(fileName,"w+");
164                    if( threadLog.stream != NULL ) {
165 threadLog_f.setWaterMarks(LOWWATERMARK,HIGHWATERMARK);
166                            strcpy(threadLog.fileName, fileName);
167                            threadLog.calls = 0;
168                            threadLog.head  = 0;
169                            threadLog.tail  = 0;
```

Figure 21.B.6

```
170                     }
171                 else
172                     errorCondition = -1;
173             }
174         else
175             threadLog.stream = stderr;
176
177         mutex_lock( &threadLog.mutex );
178         return(errorCondition);
179 }
180
181 static void
182 Minimize(void)
183 {
184         int     fdr;
185         int     fdw;
186         int     count;
187         char    buffer[1024];
188
189
190         fseek( threadLog.stream, threadLog.head, SEEK_SET);
191         fdr = fileno(threadLog.stream);
192
193         unlink( threadLog.fileName);
194
195         threadLog.stream = fopen(threadLog.fileName,"w+");
196         fdw = fileno(threadLog.stream);
197
198         while( (count = read(fdr,buffer,1024)) > 0 )
199                 write(fdw, buffer, count);
200
201         close(fdr);
202         threadLog.head   = 0;
203         threadLog.calls  = 0;
204         threadLog.tail          = 0;
205 }
206
```

Figure 21.B.7

```
207  static int
208  Close(void)
209  {
210          int     errorCondition = 0;
211
212          mutex_lock( &threadLog.mutex);
213          if( threadLog.stream != stderr) {
214                  errorCondition  = fclose(threadLog.stream);
215                  threadLog.stream = stderr;
216          }
217          mutex_unlock( &threadLog.mutex);
218          return(errorCondition);
219  }
220
221  static int
222  SetWaterMarks(const int lowWaterMark, const int highWaterMark )
223  {
224          if( lowWaterMark > highWaterMark )
225                  return(EINVAL);
226
227          mutex_lock( &threadLog.mutex );
228          LowWaterMark  = lowWaterMark;
229          HighWaterMark = highWaterMark;
230          mutex_unlock( &threadLog.mutex );
231          return(0);
232  }
233
234  threadlog_t   threadLog_f = {
235          GetError,
236          HasError,
237          ClearError,
238          SetError,
239          Message,
240          Open,
241          Close,
242          SetWaterMarks
243  };
```

Figure 22.A.

threadMutex.h -- thread mutex header file Page 1

```
1    typedef struct _threadMutex_f    {
2           mutex_t *(*create)(void);
3           mutex_t *(*createLocked)(void);
4           int     (*destroy)(mutex_t *);
5    } threadMutex_t;
6
7    extern threadMutex_t threadMutex_f;
```

Figure 22.B.1 threadMutex.c -- thread mutex auxiliary functions Page 1

```
1    #include <malloc.h>
2    #include <memory.h>
3    #include <synch.h>
4    #include <thread.h>
5    #include <errno.h>
6
7    #include "mthreadLog.h"
8    #include "threadMutex.h"
9
10   static mutex_t    *Create(void);
11   static mutex_t    *CreateLocked(void);
12   static int        Destroy(mutex_t *);
13
14   static mutex_t    *
15   Create(void)
16   {
17           mutex_t    *mutexPtr    = NULL;
18           int        errorCondition = 0;
19
20           mutexPtr = (mutex_t *) malloc(sizeof(mutex_t));
21           if( mutexPtr == NULL )
22                   threadLog_f.setError(ENOMEM);
23           else {
```

Figure 22.B.2

```
24              memset((void *)mutexPtr,'\0', sizeof(mutex_t));
25              errorCondition = mutex_init( mutexPtr, USYNC_THREAD, NULL);
26              if ( errorCondition ) {
27                      free((void *) mutexPtr );
28                      mutexPtr = NULL;
29                      threadLog_f.setError( errorCondition );
30              }
31      }
32      return(mutexPtr);
33 }
34
35 static mutex_t *
36 CreateLocked(void)
37 {
38      mutex_t   *mutexPtr = NULL;
39      int       errorCondition  = 0;
40
41      mutexPtr = Create();
42      if ( mutexPtr ) {
43              errorCondition  = mutex_lock( mutexPtr );
44              if( errorCondition ) {
45                      free( (void *)mutexPtr);
46                      mutexPtr = NULL;
47                      threadLog_f.setError( errorCondition );
48              }
49      }
50      return(mutexPtr);
51 }
52
53 static int
54 Destroy( mutex_t *mutexPtr)
55 {
56      int     errorCondition = 0;
57
58      errorCondition = mutex_destroy(mutexPtr);
59      if( errorCondition )
60              threadLog_f.setError( errorCondition );
61      else
```

Figure 22.B.3

```
62              free((void *)mutexPtr);
63          return( errorCondition );
64      }
65
66  threadMutex_t    threadMutex_f = {
67                   Create,
68                   CreateLocked,
69                   Destroy,
70  };
```

Figure 23.A.1 prims.h -- communication primitive header file Page 1

```
1   /*          prims.h             */
2
3
4
5
6   typedef struct _primops_f {
7                   void    *(*create)(void);
8                   int     (*destroy)(void *);
9                   int     (*send)(void *, void *, int );
10                  int     (*receive)(void *, void *,const int, int *);
11  } primops_f_t;
12
13
14  typedef struct _threshhold {
15              unsigned long    pending;
16              unsigned long    max;
17              unsigned long    min;
18  } threadhold_t;
19
20  typedef struct _primitive   {
21              primid_t         *id;
```

Figure 23.A.2

```
22              primdata_t          *data;
23              primops_f_t         *primops;
24              threadhold_t        threshold;
25              struct _compoint    *connector;
26              mutex_t              *mutex;
27      } primitive_t;
28
29      typedef struct _primitive_f {
30              primitive_t         *(*create)(char *,char *);
31              int                 (*destroy)(primitive_t *);
32              int                 (*load)(primitive_t *);
33              int                 (*unload)(primitive_t *);
34      } primitive_f_t;
35
36      extern primitive_f_t primitive_f;
```

Figure 23.B.1 prims.c -- communication primitive module

```
 1   /*     prims.c                    */
 2
 3   #include <thread.h>
 4   #include <synch.h>
 5   #include <stdio.h>
 6   #include <ermo.h>
 7   #include <malloc.h>
 8   #include <dlfcn.h>
 9
10   #include "threadMutex.h"
11   #include "threadLinks.h"
12   #include "threadrw.h"
13   #include "primid.h"
14   #include "primdata.h"
15   #include "primitive.h"
16   #include "point.h"
17   #include "comreg.h"
18   #include "comdata.h"
```

Figure 23.B.2

```
19  #include "comframe.h"
20  #include "registery.h"
21  #include "compoints.h"
22
23  static primitive_t *
24  Create(char *location, char *name)
25  {
26          primitive_t *primitive;
27
28          primitive      = malloc(sizeof(primitive_t));
29          memset(primitive,'\0',sizeof(primitive_t));
30          primitive->id  = primid_f.reference(location,name);
31          primitive->data = primdata_f.create();
32          primitive->mutex= threadMutex_f.create();
33          return(primitive);
34  }
35
36  static int
37  Destroy(primitive_t *primitive)
38  {
39          primid_f.unreference( ((primid_t *)primitive->id)->location,
40                                ((primid_t *)primitive->id)->name);
41          primdata_f.destroy(primitive->data);
42          threadMutex_f.destroy(primitive->mutex);
43          free(primitive);
44  }
45
46  static int
47  Load(primitive_t *primitive)
48  {
49          int             errorCondition = 0;
50
51          if( ((primid_t *)primitive->id)->name == NULL ) {
52                  fprintf(stderr,"primitive.Load() name is not defined\n");
53                  return(EINVAL);
54          }
55          rw_wrlock( ((primdata_t *)primitive->data)->rwlock);
```

Figure 23.B.3

```
56         ((primdata_t *)primitive->data)->handle = dlopen(((primid_t
*)primitive->id)->location,
57                                     RTLD_LAZY);
58         if( ((primdata_t *)primitive->data)->handle == NULL ) {
59                 fprintf(stderr,"         %s\n", dlerror());
60                 fprintf(stderr,"error: can't open [%s]\n", ((primid_t
*)primitive->id)->location);
61                 errorCondition = EINVAL;
62         }
63         else   {
64                 primitive->primops = dlsym(((primdata_t *)primitive->data)->handle,
((primid_t *)primitive->id)->name);
65                 if( primitive->primops == NULL ) {
66                         fprintf(stderr,"prims.Load() can't locate symbol [%s]\n",
((primid_t *)primitive->id)->name);
67                         errorCondition = EINVAL;
68                 }
69         }
70         if( ! errorCondition ) {
71                 ((primdata_t *)(primitive->data))->comlink = (((primops_f_t
*)primitive->primops)->create)();
72         }
73         rw_unlock( ((primdata_t *)primitive->data)->rwlock);
74         rw_rdlock( ((primdata_t *)primitive->data)->rwlock);
75         return(errorCondition);
76 }
77
78 static int
79 Unload(primitive_t *primitive)
80 {
81         int errorCondition = 0;
82
83         rw_wrlock(((primdata_t *)primitive->data)->rwlock);
84         dlclose(((primdata_t *)primitive->data)->handle);
85         rw_unlock(((primdata_t *)primitive->data)->rwlock);
86         return(errorCondition);
87 }
88
```

Figure 23.B.4

```
89
90   primitive_f_t primitive_f  = {
91                   Create,
92                   Destroy,
93                   Load,
94                   Unload,
95   };
```

Figure 23.C.

primdata.h -- communication primitive data header file Page 1

```
1    /*     primdata.h          */
2
3    typedef struct _primdata {
4                    rwlock_t    *rwlock;
5                    void        *handle;
6                    void        *comlink;
7                    void        *private;
8                    int         status;
9    } primdata_t;
10
11
12   typedef struct _primdata_f {
13                    primdata_t  *(*create)(void);
14                    int         (*destroy)(primdata_t *);
15   } primdata_f_t;
16
17   extern primdata_f_t primdata_f;
```

Figure 23.D.1 primdata.c -- communication primitive data module

```
1
2
3    #include <thread.h>
4    #include <synch.h>
```

Figure 23.D.2

```
5    #include <stdio.h>
6    #include <errno.h>
7    #include <malloc.h>
8    #include <dlfcn.h>
9
10   #include "threadLinks.h"
11   #include "threadrw.h"
12   #include "primdata.h"
13
14
15   static primdata_t *
16   Create()
17   {
18           primdata_t   *primdata;
19
20           primdata = malloc(sizeof(primdata_t));
21           memset(primdata,'\0',sizeof(primdata_t));
22           primdata->rwlock = threadrw_f.create();
23           return(primdata);
24   }
25
26   static int
27   Destroy(primdata_t *primdata)
28   {
29           int     errorCondition = 0;
30
31           errorCondition = threadrw_f.destroy(primdata->rwlock);
32           if( ! errorCondition )
33                   free(primdata);
34           return(errorCondition);
35   }
36
37   primdata_f_t primdata_f = {
38                   Create,
39                   Destroy,
40   };
```

Figure 24.A.

thread queue condition module header file Page 1

```
1   /*                   threadQcond.h                */
2
3   typedef struct _qmember {
4               void        *data;
5               int         size;
6               struct _qmember  *next;
7   }
8   qmember_t;
9
10  typedef struct _qcond_t {
11              mutex_t     *mutex;
12              cond_t      *condition;
13              qmember_t   *queueHead;
14              qmember_t   *queueTail;
15  }
16  qcond_t;
17
18
19  typedef struct _threadQcond_t  {
20              void    *(*create)(void);
21              int     (*destroy)(void *);
22              int     (*send)(void *, void *, int );
23              int     (*receive)(void *, void **,const int, int *);
24  } threadQcond_t;
25
26
27  extern threadQcond_t    threadQcond_f;
```

Figure 24.B.1 thread queue condition module Page 1

```
1   /*               threadQcond.c              */
2
3   #include <synch.h>
```

Figure 24.B.2

```
4   #include <malloc.h>
5   #include <memory.h>
6   #include <errno.h>
7
8   #include "threadCondv.h"
9   #include "threadMutex.h"
10  #include "threadQcond.h"
11  #include "mthreadLog.h"
12
13  static void *
14  Create(void)
15  {
16          qcond_t    *qcond;
17
18          qcond = (qcond_t *) malloc(sizeof(qcond_t));
19
20          if ( qcond == NULL ) {
21                  return(NULL);
22          }
23
24          (void) memset(qcond, '\0', sizeof(qcond_t));
25          qcond->mutex     = threadMutex_f.create();
26          qcond->condition = threadCondv_f.create();
27
28          if ( qcond->mutex == NULL || qcond->condition == NULL) {
29                  if( qcond->condition )
30                          threadCondv_f.destroy(qcond->condition);
31
32                  if( qcond->mutex )
33                          threadMutex_f.destroy(qcond->mutex);
34
35                  free( (void *) qcond );
36                  qcond = NULL;
37          }
38          return(qcond);
39  }
40
41
```

Figure 24.B.3

```
42  static int
43  Destroy(void *primitive)
44  {
45          int     errorCondition = 0;
46          qcond_t     *qcond              = primitive;
47
48          if( qcond == NULL )
49                  return(EINVAL);
50
51          errorCondition = threadMutex_f.destroy( qcond->mutex );
52          if( errorCondition )
53                  return(errorCondition);
54
55          errorCondition = threadCondv_f.destroy(qcond->condition);
56          if( ! errorCondition ) {
57                  free((void *)qcond->condition);
58                  free((void *)qcond->mutex);
59                  free((void *)qcond);
60          }
61
62          return( errorCondition );
63  }
64
65  static int
66  Receive( void *primitive, void **data, const int maxsize, int *size)
67  {
68          qmember_t   *qmember= NULL;
69          int         errorCondition = 0;
70          qcond_t         *qcond  = primitive;
71
72          if( qcond == NULL ) {
73                  return(NULL);
74          }
75
76          errorCondition = mutex_lock( qcond->mutex );
77
78          if( ! errorCondition ) {
```

Figure 24.B.4

```
79              while( qcond->queueHead == NULL ) {
80                      errorCondition = cond_wait( qcond->condition,
81                                              qcond->mutex);
82                      if( errorCondition ) {
83                              (void)mutex_unlock( qcond->mutex );
84                              break;
85                      }
86              }
87              if( ! errorCondition ) {
88                      qmember = qcond->queueHead;
89                      if( qmember->size > maxsize )
90                              errorCondition = EINVAL;
91                      else {
92                              *data   = qmember->data;
93                              *size   = qmember->size;
94                      }
95                      if( qcond->queueHead == qcond->queueTail )
96                              qcond->queueTail = NULL;
97
98                      qcond->queueHead = qmember->next;
99                      free( qmember );
100                     (void) mutex_unlock( qcond->mutex);
101             }
102     }
103
104     return( errorCondition );
105 }
106
107
108 static int
109 Send( void *primitive, void *data, int size)
110 {
111     int             errorCondition = 0;
112     qmember_t       *qmember;
113     qcond_t         *qcond = primitive;
114
115     if( qcond == NULL || data == NULL)
```

Figure 24.B.5

```
116            return(EINVAL);
117
118        errorCondition = mutex_lock( qcond->mutex );
119
120        if( ! errorCondition ) {
121                qmember = (qmember_t *)malloc(sizeof(qmember_t));
122                if( ! qmember ) {
123                        (void) mutex_unlock(qcond->mutex);
124                        return(ENOMEM);
125                }
126                memset(qmember,'\0',sizeof(qmember_t));
127                qmember->data = data;
128                qmember->size = size;
129                qmember->next = NULL;
130
131                if( ! qcond->queueHead ) {
132                        qcond->queueHead = qmember;
133                        qcond->queueTail = qmember;
134                }
135                else {
136                        qcond->queueTail->next = qmember;
137                        qcond->queueTail      = qmember;
138                }
139                cond_signal(qcond->condition);
140                (void)mutex_unlock(qcond->mutex);
141        }
142
143        return(errorCondition);
144 }
145
146 threadQcond_t    threadQcond_f = {
147            Create,
148            Destroy,
149            Send,
150            Receive
151 };
```

Figure 25.A.

registry.h header file

```
1
2   typedef struct _registery {
3               comid_t      *comid;
4               comdata_t    *comdata;
5   } registery_t;
6
7   typedef struct _registery_f {
8               registery_t  *(*create)(char *, char *);
9               int          (*destroy)(registery_t *);
10  } registery_f_t;
11
12  extern registery_f_t registery_f;
```

Figure 25.B.1 registery.c module

```
1   #include <stdio.h>
2   #include <malloc.h>
3   #include <errno.h>
4   #include <thread.h>
5
6   #include "point.h"
7   #include "comreg.h"
8   #include "comdata.h"
9   #include "registery.h"
10
11  static registery_t *
12  Create(char *location, char *name)
13  {
14          registery_t *registery;
15
16          registery = malloc(sizeof(registery_t));
17          memset(registery,'\0',sizeof(registery_t));
18
```

Figure 25.B.2

```
registery->comid=comid_f.reference(location,name,NULL,NULL,NULL,NULL,0);
19          registery->comdata= comdata_f.create();
20          return(registery);
21   }
22
23   static int
24   Destroy(registery_t *registery)
25   {
26          if( registery->comid) {
27
comid_f.unreference(registery->comid->serviceRegistration->location,registery->comid-
>serviceRegistration->name,NULL,NULL,NULL,NULL);
28          }
29          if( registery->comdata)
30                  comdata_f.destroy(registery->comdata);
31          free(registery);
32          return(0);
33   }
34
35   registery_f_t registery_f = {
36          Create,
37          Destroy,
38   };
```

Figure 26.A.1 service.c -- example minor services to be connected by the main program.
module communication services

```
1
2    #include <thread.h>
3    #include <synch.h>
4    #include <stdio.h>
5    #include <errno.h>
6    #include <malloc.h>
7    #include <dlfcn.h>
```

Figure 26.A.2

```
8
9   #include "threadLinks.h"
10  #include "threadrw.h"
11  #include "primid.h"
12  #include "primdata.h"
13  #include "primitive.h"
14  #include "point.h"
15  #include "comreg.h"
16  #include "comdata.h"
17  #include "comframe.h"
18  #include "registery.h"
19  #include "compoints.h"
20  #include "generic.h"
21
22  /*
23   * this is an example of service provider. It is simple and probably not
24   * extremely useful, but it illustrates the concepts. The first service is
25   * called "weatherService" and its location, for this example, is in the
26   * shared library called "service.so"  The weather service reads state, city,
27   * and temperatures from a data file, and will broadcast them to the receiving
28   * party. Note that once the weather service is started, it will remain
29   * running until the application tells the communication manager to terminate
30   * it.  For this example, the weather service will repeat the same temps
31   * over again once it hit the end of the data file. Since we are not
32   * attempting to patent the weather service, this the reported data is not
33   * necessary useful. again, however, the concept is. The broker weather
34   * service uses a generic sender method to send the data.
35   */
36  void *
37  weatherService(void *arg)
38  {
39          FILE            *fp             = NULL;
40          compoint_t      *weatherControl = arg;
41          char            city[BUFSIZ];
42          char            state[BUFSIZ];
43          char            temp[BUFSIZ];
44          char            *cp;
45          char            *message;
```

Figure 26.A.3

```
46          int         s;
47          int         msize;
48
49          fprintf(stderr,"weather service is starting...\n");
50          if( weatherControl == NULL ) {
51                  fprintf(stderr,"weather service stopped. no compoint\n");
52                  thr_exit(0);
53          }
54
55          fp = fopen("weather.data","r");
56          do     {
57                  while( fscanf(fp,"%s %s %s", state, city, temp) > 0 ) {
58                          msize = strlen(state)+strlen(city)+strlen(temp)+40;
59                          message = malloc(msize);
60                          memset(message,'\0',msize);
61                          sprintf(message,"%s, %s:   %s\n",city,state,temp);
62                          if( generic_f.send(weatherControl,message,msize,0) ) {
63                                  free(message);
64                          }
65                  }
66                  rewind(fp);
67          } while ( strcmp(cp,"QUIT") != 0 );
68          thr_exit(0);
69  }
70
71
72  /*
73   * this is an example of service provider.  It is simple and probably not
74   * extremely useful, but it illustrates the concepts.  The service is
75   * called "brokerService" and its location, for this example, is in the
76   * shared library called "service.so"  The broker service symbol, shares,
77   * and price from a data file, and will use a generic sender to send the
78   * data to the receiving party.  Note that once the broker service is
79   * started, it will remain running until the application tells the
80   * communication manager to terminate it.  For this example, the broker
81   * service will repeat the same data over again once it hit the end of the
82   * data file.  Since we are not
83   * attempting to patent the broker service, this the reported data is not
```

Figure 26.A.4

```
84      * necessary useful.  again, however, the concept is.
85      */
86      void *
87      brokerService(void *arg)
88      {
89              FILE        *fp            = NULL;
90              compoint_t  *BrokerControl  = arg;
91              char        shares[BUFSIZ];
92              char        symbol[BUFSIZ];
93              char        price[BUFSIZ];
94              char        *cp;
95              char        *message;
96              int         s;
97              int         msize;
98
99              fprintf(stderr,"Broker Service starting....\n");
100             if( BrokerControl->sender == NULL ) {
101                     fprintf(stderr,"Broker service stopped. no sender \n");
102                     thr_exit(0);
103             }
104             fp = fopen("broker.data","r");
105             do    {
106                     while( fscanf(fp,"%s %s %s", symbol, shares, price) > 0 ) {
107                             msize = strlen(symbol)+strlen(shares)+strlen(price)+40;
108                             message = malloc(msize);
109                             memset(message,'\0',msize);
110                             sprintf(message,"Company: [%s]\tshares: [%s]\tprice: [%s]\n", symbol,shares,price);
111                             if( generic_f.send(BrokerControl,message,msize,0)) {
112                                     free(message);
113                             }
114                     }
115                     rewind(fp);
116             } while ( strcmp(cp,"QUIT") != 0 );
117             thr_exit(0);
118     }
119
```

Figure 27.A.

threadrw.h -- thread reader - writer lock header Page 1

```
1   /* threadrw.h */
2
3   #define READER   1
4   #define WRITER   2
5
6   typedef struct _threadrw_t      {
7                   rwlock_t        *(*create)(void);
8                   rwlock_t        *(*createLocked)(const int);
9                   int             (*destroy)(rwlock_t *);
10  } threadrw_t;
11
12  extern threadrw_t threadrw_f;
```

Figure 27.B.1 threadrw.c -- thread reader - writer lock module Page 1

```
1   /*  threadrw.c      */
2
3   #include <errno.h>
4   #include <malloc.h>
5   #include <memory.h>
6   #include <synch.h>
7
8   #include "mthreadLog.h"
9   #include "threadrw.h"
10
11  static int          Destroy(rwlock_t *);
12  static rwlock_t     *Create(void);
13  static rwlock_t     *CreateLocked(const int);
14
15  static rwlock_t *
16  Create(void)
17  {
18          rwlock_t *rwlockPtr     = NULL;
```

Figure 27.B.2

```
19        int     errorCondition = 0;
20
21        rwlockPtr = (rwlock_t *) malloc(sizeof(rwlock_t));
22
23        if( rwlockPtr == NULL )
24                errorCondition = ENOMEM;
25
26        else {
27                memset((void *)rwlockPtr,'\0',sizeof(rwlock_t));
28                errorCondition = rwlock_init(rwlockPtr, USYNC_THREAD, NULL);
29                if( errorCondition ) {
30                        free( (void *)rwlockPtr);
31                        rwlockPtr = NULL;
32                }
33        }
34
35        if( errorCondition )
36                threadLog_f.setError(ENOMEM);
37
38        return(rwlockPtr);
39 }
40
41 static rwlock_t *
42 CreateLocked( const int type)
43 {
44        rwlock_t *rwlockPtr     = NULL;
45        int     errorCondition = 0;
46
47        if ( type != READER && type != WRITER ) {
48                threadLog_f.setError(EINVAL);
49                return(NULL);
50        }
51
52        rwlockPtr = Create();
53
54        if( rwlockPtr ) {
55                if( type == WRITER )
56                        errorCondition = rw_wrlock( rwlockPtr );
```

Figure 27.B.3

```
57              else
58                      errorCondition = rw_rdlock( rwlockPtr );
59
60              if( errorCondition ) {
61                      free( (void *)rwlockPtr );
62                      rwlockPtr = NULL;
63                      threadLog_f.setError(errorCondition);
64              }
65      }
66      return(rwlockPtr);
67 }
68
69
70 static int
71 Destroy(rwlock_t *rwlockPtr )
72 {
73      int     errorCondition = 0;
74
75      errorCondition = rwlock_destroy(rwlockPtr);
76      if( ! errorCondition )
77              free( (char *)rwlockPtr);
78
79      return(errorCondition);
80 }
81
82 threadrw_t threadrw_f = {
83              Create,
84              CreateLocked,
85              Destroy
86 };
```

EXECUTION OF DYNAMICALLY CONFIGURED APPLICATION SERVICE IN ACCESS METHOD-INDEPENDENT EXCHANGE

A portion of the disclosure of this patent document contains material which is subject to copyright protection. The copyright owner has no objection to the facsimile reproduction by anyone of the patent disclosure, as it appears in the PTO patent file or records, but otherwise reserves all copyright rights whatsoever.

This application is a continuation of U.S. patent application Ser. No. 08/353,905 filed Dec. 12, 1994 and issued Dec. 15, 1998 as U.S. Pat. No. 5,850,518, the entire disclosure therefor, including the specification, drawings, and abstract, being hereby incorporated by reference.

BACKGROUND OF THE INVENTION RECEIVED

1. Field of the Invention

This invention relates to computer networks and communication management, and to the establishment of communication between various users and/or software applications.

2. Background Discussion

The term "The Information Superhighway" is commonly thought of as an extension of the Internet, a network linking hundreds of thousands of computer systems together and communicating via a standard protocol.

A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart the term "wide area network" may be used.

As computer networks have developed, various approaches have been used in the choice of communication medium, network topology, message format, protocols for channel access, and so forth. Some of these approaches have emerged as de facto standards, but there is still no single standard for network communication. The Internet is a continually evolving collection of networks, including Arpanet, NSFnet, regional networks such as NYsernet, local networks at a number of university and research institutions, a number of military networks, and increasing, various commercial networks. The protocols generally referred to as TCP/IP were originally developed for use through Arpanet and have subsequently become widely used in the industry. The protocols provide a set of services that permit users to communicate with each other across the entire Internet.

A model for network architectures has been proposed and widely accepted. It is known as the International Standards Organization (ISO) Open Systems Interconnection (OSI) reference model. (See FIG. 10.) The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction. (See, e.g. The TCP/IP Companion, by Martin R. Arick, Boston: QED Publishing Group 1993, and U.S. Pat. No. 5,159,592. These, and all patents and publications referenced herein, are hereby incorporated by reference.)

As shown in FIG. 10, the lowest layer defined by the OSI model is called the "physical layer," and is concerned with transmitting raw data bits over the communication channel. Design of the physical layer involves issues of electrical, mechanical or optical engineering, depending on the medium used for the communication channel. The second layer, next above the physical layer, is called the "data link" layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

The Internet Protocol (IP) is implemented in the third layer of the OSI reference model, the "network layer," and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the "transport layer," namely the fourth layer of the OSI reference model.

Except as otherwise is evident from the context, the various functions of the present invention reside above the transport layer of the OSI model. The present invention may be used in conjunction with TCP/IP at the transport and network layers, as well as with any other protocol that may be selected.

As shown in FIG. 10, the OSI model provides for three layers above the transport layer, namely a "session layer," a "presentation layer," and an "application layer," but in the Internet these theoretical "layers" are undifferentiated and generally are all handled by application software. The present invention provides for session control and for communicating with applications programs. Thus the present invention may be described in accordance with the OSI theoretical model as operating at the session layer and application layers.

"Connectivity" and "convergence" have been used to describe two aspects of the communications and computing revolution taking place. In 1994, technology provides to communicate by telephone, pager, fax, email, cellular phone, and broadcast audio and video. However, to use these communication services, you have to employ a telephone number, beeper number, pager number, fax number, cellular number, and each of many email IDs, radio stations and television channels. The user is confronted with an overabundance of methods providing such physical connectivity, one which will only grow in the future.

The types of physical connections are provided by various systems including the Regional Bell Operating Companies, the Long Distance Carriers, the Cellular Networks, and others providing signal-based or wireless communications. The Cable Television Industry provides connectivity for video signals and increasingly other services.

SUMMARY OF THE INVENTION

The present invention provides a virtual network, sitting "above" the physical connectivity and thereby providing the administrative controls necessary to link various communication devices via an Access-Method-Independent Exchange. In this sense, the Access-Method-Independent Exchange can be viewed as providing the logical connectivity required. In accordance with the present invention, connectivity is provided by a series of communication primitives designed to work with each of the specific communication devices in use. As new communication devices are developed, primitives can be added to the Access-Method-Independent Exchange to support these new devices without changing the application source code. When viewed in accordance with the OSI model, the communication primitives operate at the level of the transport layer, and, to the extent appropriate, at the network layer, and in some instances down to the data link layer, and occasionally as needed, the physical layer.

Using the Access-Method-Independent Exchange of the present invention, anybody can provide a service. Similarly, anybody can be a client of a service. A service can even be a client of another service. This is because every user and every service is identified by a unique communication identifier. In accordance with the present invention, various communication points are connected together to form a communication link.

The aforesaid identifiers are assigned to the user, or service provider, during their subscription process. For service providers, additional information must be provided and added to the Thread Directory Service. This information includes the required physical connectivity to reach the service.

When users want to access the Access-Method-Independent Exchange, they simply supply Exchange with their unique identifiers. The Binding Service validates each user and permits access to the Exchange. The user may then connect to any registered service by simply calling the service's communication identifier. Of course, if they are unfamiliar with the service providers communication identifier, they can request assistance through the Thread Directory Service. The Thread Directory Service provides a listing of available services grouped by relationship. The user can search for keywords, titles, or other information such as service fees. Ultimately, the user can request to gain access to the service.

The Access-Method-Independent Exchange is not limited to servicing a particular geographic area and hence can easily work with foreign countries. The Access-Method-Independent Exchange includes the ability to provide voice or data message processing.

Access-Method-Independent Exchange Components: A Technical Overview The Thread Communication Service At the core of the technology is the Thread Communication Service (TCS), a software utility used to administer the dynamic communications between computer processes executing on a local computer, or, on a remote system. Two versions of the TCS have been implemented: one for intraprocess communications and a second for interprocess communications. The intraprocess version of the TCS is used for a single application process with multiple threads of control. The interprocess version of the TCS provides the administration of communications between processes executing in disjoint address spaces on a local, or remote computer system.

In the TCS everything is viewed as either being a communication primitive, or, a communication point. The communication primitives are the low-level mechanisms used to provide the physical communication between various processes. The processes participating in the communication are referred to as communication points. Two or more communication points are connected by a communication link using the communication primitives.

The Communication Primitives

The communication primitives are built using the underlying computer operating system intraprocess and interprocess communication facilities and thus are operating-system-specific. On one operating system there may be, for example, five communication primitives supported, while another operating system may support twenty. A communication primitive generally must provide for several operations to be applied such as:

Create: The ability to create an instance of the primitive

Destroy: The ability to destroy an instance of the primitive

Send: The ability to send data to the primitive

Receive: The ability to receive data from the primitive

Cycle: Send a default and receive default messages to/from the primitive

Connect: Primitive specific connection function

Disconnect: Primitive specific disconnection function

Suspend: Primitive specific suspension function

Resume: Primitive specific resumption function

Communication primitives are registered with the Thread Communication Service for the specific operating system the TCS is executing on. The name, the location, and certain characteristics describing the communication primitive are retained by the TCS for subsequent use. In this context, the communication primitives become a reusable asset, needing to be developed and tested only one time.

Each communication primitive has a shared object, referred to as the communication primitive object, describing the location of the various operations to be applied when using this primitive type. All primitives have the same communication primitive object structure. The TCS will load the communication primitive object at runtime only when requested for use by a communication point.

In a sense, the communication primitive can be thought of as analogous to the physical connection of a telephone on a phone network. A twisted pair telephone would use one primitive while a cellular telephone would use a different primitive.

The Communication Points

A process can register zero or more communication points with the TCS. Each point is said to describe a service. Note, however, that a service can be a client of a different service, or a client of itself. The registration process notifies the TCS as to the name and location of the service, the default primitive to use for communicating to the service, and the default primitive to use when receiving messages from the service.

The registration process also identifies certain characteristics of the communication point. These characteristics include system-dependent information, implementation-dependent information, and usage-dependent information. The characteristics include:

Scope: Determines if service executes as a sibling thread, or in separate address space.

Stack: Required stack size

Idle: If service is to be idle on non-connects

Maxmsg: Maximum number of pending messages prior to suspension

Minmsg: Minimum number of pending messages at which service is resumed

Restart: Service is restartable

Termination: Method for terminating the service

Discarded: Method for discarding unwanted messages

The registered communication points are then retained by the TCS for subsequent use. When a communication point has been registered, a process can request to be connected to the service.

Using the telephone model example, a communication point is the equivalent of a destination telephone. That is, you can call an individual only by knowing the attributes describing that individual, such as a telephone number. The registered characteristics would be similar to your name and address being entered into the phone book. The TCS calls the TDS, if requested, to record the registered communication point in the TDS.

Connecting Communication Points

When a process is executing, it may request the TCS to connect it to a communication point. For the intraprocess communication version of the TCS, the service executes as a separate thread of control. In the interprocess communication version of the TCS, the service executes as a separate process.

There are several modifications permitted. First, when a communication point is registered, the registering process can identify the communication point as a public point. As such, only one instance of the service needs to be executing at any time. All processes requesting to use this point will share the same primitive. Alternatively, a service can be registered as a private service, in which case each process requesting communication to the service will be connected to their own instance of the service. Finally, when a service is initially registered, a maximum number of connection points can be preset. When this limit is reached, then all new processes requesting access to the service will be denied, until such time as the number of current instantiations of the service falls below the threshold.

A single process can be connected to multiple services simultaneously. This can be accomplished through a single connection, or, though multiple connections established by the process with the various services. In the former case, each time the process sends data, the data is actually sent to all services using the communication link. In the latter instance, only a single destination is connected to the communication link.

Again, using the telephone model as an example, this is equivalent to your calling a business associate on your telephone system. While connected, you can put the call on hold and dial another associate, or you can conference the associate in on the same call.

Mixing the Intraprocess and Interprocess Models

On systems supporting multiple threads of control within a single process address space, the TCS uses a special communication point called the intra.sub.—p communication point to execute commands on behalf of the TCS within that address space. That is to say, when the application process makes its initial request to the TCS, the intra.sub.—p communication point will bootstrap itself as a communication point within the application process address space. The TCS then issues specific commands to the intra.sub.—p communication point who executes these commands on behalf of the TCS. The use of the intra.sub.—p communication point is essential to permit intraprocess communication points while supporting interprocess communication points at the same time.

When an application makes a request to connect with a registered communication point, and that point must execute as a separate thread of control within the address space of the requesting process, then the TCS must have a method to satisfy the request. Since the TCS itself is executing in a different address space, it needs a worker thread executing within the requesting process's address space to spawn the requested communication point thread on its behalf.

The TCS also provides a method for a intraprocess communication point to be. treated as an interprocess communication point. When an application process makes a request to use an intraprocess communication point as an interprocess communication point, the TCS will execute a generic front end loader to initialize the address space of the new process, and then invokes the specific thread requested in that address space.

Communicating With a Service

Once connected, a process can send messages to a service. The primitive to send this message must accept the message, the size of the message, and the destination. Similarly, a process can request to receive a message from a service. In receiving the message, the process must identify the service it is to receive the message from, the maximum length of a message it can consume, and the actual size of the message returned.

Note that from the point of view of the application process, there is no need to be aware of the underlying physical primitive in use. Instead, the application sees that a Thread Communication Link is provided and need not deal with how it is provided.

Disconnecting From a Service

A process can request the TCS to disconnect it from a particular service. When this happens, the service can be terminate by the TCS if this was the only process connected to it. Otherwise, the service remains executing.

Using TCS for Remote Communication

In the TCS model, a special communication point can be created to monitor a communication device available to the computer system. This communication point acts as the conduit to send messages to, and receive messages from the communication device. The primitive used for this communication point wraps the identifier of the sending process, along with the identifier of the receiving process, around the message prior to sending the data out on the communication device. Similarly, when this communication point receives a message from the communication device, it unwraps the message to determine the process that the message is to be sent to. In this sense, the communication point is the conduit for communications with external systems.

The Broker Service

When a communication point is registered, the communication point may have a specific communication primitive required to either send or receive message. This poses a challenge for another communication point to connect if the requesting communication point requires a different communication primitive. When this happens, the TCS will search for a broker communication point which can convert the messages from the first primitive type to the second primitive type. The broker service, if necessary, will be inserted between the requesting communication point and the requested service communication point.

The TCS Model

In the TCS model, processes are nothing more than communication points. Application programs residing on a disk are also viewed as communication points (albeit the application program must be started for execution by the TCS). This powerful model enables application software development which may effectively commoditize software.

The Thread Directory Service

The Thread Directory Service is an extension of the Thread Communication Service offering persistence to the registered communication primitives and registered communication points. When a communication point is registered with the TDS, it is assigned a unique communication identifier. Numerous additional characteristics of the service can be registered within the TDS such as:

1. Textual description of the type of service
2. Sending communication primitive and receiving communication primitive
3. Communication mechanism used in establishing this service
4. Location of the service
5. Input types understood by the service
6. Output types generated by the service
7. Keyword search list used to locate this service entry
8. Token describing if the execution of the service can be started
9. Token describing the data representation in communication with the service, i.e. binary, ASCII, etc.
10. Token describing if the execution of the service must have previously been started
11. Token describing if Thread Communication Identifier is listed or unlisted
12. Token describing if a public connection to the service can be used
13. Token describing if a private connection to the service can be used
14. Token describing if a public connection is mandatory
15. Token describing if a private connection is mandatory
16. Token describing if the service is a component of a larger service
17. Shell actions to execute in initializing this service
18. The maximum number of concurrent communications
19. Licensing information
20. Other general user information
21. Link to additional Services required in using this service
22. Series of status information components including but not limited to security privileges and owner information.
23. Series of additional information components used for future enhancements
24. Thread Communication Identifier
25. Secondary Thread Service Directory
26. Usage Fee
27. Directory Service Fees Of the foregoing, items 2 and 4 are essential; the others are optional, though desirable.

A process can request information from the Thread Directory Service specifying the desired search criteria. This is similar to dialing 411 and requesting a telephone number for an individual based on their name and street address. Each TDS has its own unique identifier. The registered communication points are assigned unique communication identifiers based on the TDS's identifier. Thus, communication points are fixed in the universe in this sense.

When the Thread Communication Service works in conjunction with the Thread Directory Service, all communication points to be connected are located via their communication identifiers.

When a connection is requested to a particular communication point, the requesting process specifies the unique communication identifier of the desired service. The TCS causes the identifier to be looked up in the TDS to determine how to connect to the service and then provides the actual connections.

The Thread Communication Switching Service

To minimize the message flow, a Thread Communication Switching Service is provided as a special instance of a communication point. It accepts multiple communication links redirecting the communications from one communication point to the appropriate destination communication point. As shown in FIGS. 1 to 4, a TCSS can communicate with communication points, or, to another TCSS.

Dynamic Configuration Management

Dynamic Configuration Management is a rule-based system for specifying components of software to use in constructing a Dynamically Configured Application Program. The components of software are loaded according to the specified rules and are subsequently executed.

The Application Process constructs the Dynamically Configured Application Program in the Dynamic Configuration Management (DCM) by specifying zero or more RULES identifying the components of the Dynamically Configured Application Program, the interactions between these components, the policy for evaluating these components, the order of evaluation of these components, and a method for satisfying the RULE. The Application Process can specify zero or more data files referred to as Virtual Program Rules Files containing RULES for the Dynamically Configured Application Program. In this sense, the Application Process provides the blueprint for constructing the Dynamically Configured Application Program.

The specification of a RULE includes the following information, although additional information may be incorporated by the implementation:

1. A unique alphanumeric name to identify the RULE
2. A DCM operator denoting the policy for evaluating the RULE
3. Zero or more Prerequisite RULES 4. Zero or more Attributes describing characteristics of the RULE 5. A method (possibly given as NULL) for satisfying the RULE There are two classifications of RULES supported by the DCM given as Reserved Rules and Universal Rules. The Reserved Rules have special meaning to the DCM. The Universal Rules are specified by the Application Process. In either case, however, the Rules contain the minimum information described above.

A series of Reserved Rules, referred to as the Flow Rules, provide the framework for executing the Dynamically Configured Application Program. Whenever a Dynamically Configured Application Program is to be executed, the DCM begins by evaluating the Flow Rules. All other actions are derived as a result thereof. The Flow RULES include:

1. DCMINIT RULE
2. APINIT RULE
3. MAIN RULE
4. APDONE RULE
5. DCMDONE RULE

Note, however, that additional Flow Rules may be incorporated by the implementation.

A Dynamically Configured Application Program is therefore constructed by specifying Universal Rules as Prerequisites Rules of the Flow Rules. In evaluating a Flow Rule, the DCM will ensure that all Prerequisite Rules of the Flow Rule are evaluated first.

In evaluating a RULE, the DCM views the RULE name as the current rule. The evaluation process is such that the DCM will first evaluate all Prerequisite Rules of the current rule. Thus, a Prerequisite Rule becomes the current rule and the evaluation continues with its Prerequisite Rules.

When the current rule has no Prerequisite Rules listed, and the current rule has never been evaluated, then the DCM will execute the method for this rule. After executing the method for the current rule, the DCM attaches a time stamp value denoting when the current rule was evaluated.

When the current rule has one or more Prerequisite Rules, then the DCM compares the time stamp value of the current rule with that of its Prerequisite Rules. If the time stamp value of the current rule is older than the time stamp value of its Prerequisite Rules, then the current rule's method is executed to satisfy the rule and the time stamp value of the current rule is updated to denote when the current rule was evaluated. Otherwise, the current rule's time stamp value remains unchanged and the method is not executed.

After evaluating the last Flow Rule of the Dynamically Configured Application Program, the DCM considers the application as having completed and returns control back to the initial Application Process.

Initially when a RULE is specified, the DCM makes no assumptions as to what the RULE name represents. During the evaluation of the RULE, the DCM associates the RULE name with an entity understood by the DCM. This is called the binding process. The list of entities understood by the DCM and their corresponding interpretation by the DCM are provided during the initialization of the DCM. In this sense, the list of entities can be modified and updated over time based on market demand for new entities and their interpretations.

The binding of the RULE name to an entity understood by the DCM is determined by the RULE's attributes. In this sense, the Application Process can specify how the RULE is to be interpreted by the DCM.

Through the use of this method, Minor Services for an Application Service can be designed, implemented, tested, and distributed independently of the corresponding Application Program. The end-user can therefore purchase and install only those Minor Services of interest. When the Application Program is to be executed, the resulting Application Process will dynamically configure itself to provide the available Minor Services.

The advantage to the computer industry is that the Minor Services, for example, can be designed after the Application Program and sold individually to the end user. The implications are that:

1) the base Application Program need not be altered to support these additional Minor Services 2) since the end-user is purchasing only those Minor Services of interest, the end user does not have to provide additional media storage capacity to support unwanted Minor Services 3) additional Minor Services can be designed, implemented, tested, and installed after the base Application Program thus providing:
    a) the designer of the Application Program the ability to design, implement, and test additional Minor Services based on new market demands without changing the existing base Application Program
    b) the ability to design, implement, and test additional Minor Services specific to an individual customer without effecting other customers. In this sense, all customers would have the exact same base Application Program, but potentially different installed Minor Services 4) the development of additional Minor Services can be thoroughly tested as smaller units when compared to the approach used today in which a new, monolithic representation of the Application Program must be tested. The advantage herein is that the computational resources required to develop the software are decreased, the cost of testing is decreased, and the Minor Services can be delivered to the market in a shorter time interval.

The Configurable Application Program Service

The Configurable Application Program Service provides a method to dynamically reconfigure an application process. Through the CAPS, a communication point can be dynamically replaced by another communication point. This is important for real-time systems in which you would not want to terminate the application process to replace a defective module.

The Application Process uses the Configuration Administrator Minor Service to administer zero or more components of software from shared libraries. Each component is said to offer a Minor Service. The specifications for the administration of the Minor Services can be provided directly by the Application Service, or, indirectly through a data store monitored by the Configuration Administrator. These specifications can instruct the Configuration Administrator Minor Service to perform the desired operation immediately, at a predefined time (which may be an interval), or, as a result of some event which is later communicated to the Configuration Administrator Minor Service.

The Configuration Administrator Minor Service provides the following operations:

1. Locates specified Minor Services
2. Loads specified Minor Services
3. Executes specified Minor Services 4. Establishes communication channel with the specified Minor Service.
5. Suspends execution of specified Minor Services
6. Resumes execution of specified Minor Services
7. Replaces specified Minor Service with a new Minor Service rerouting communication channels as appropriate
8. Unloads specified Minor Service
9. Provides for manual state retention between replaceable Minor Services
10. Notification Note that the Configuration Administrator Minor Service operations can be specified to occur at set time intervals; at predefined time periods; as a result of external events; or, as a result of internal events. Events, in this context are registered with the Configuration Administrator Minor Service to denote their occurrence.

The advantage is that an Application Program can be constructed and executed and subsequently reconfigured to take advantage of newly installed minor software services while the Application Process is executing. The implications of such a system are that:

1. Mission-critical Application Programs which require 24 hour, 365 days a year execution can be reconfigured without terminating execution of the existing Application Process.
2. An Application Process can be reconfigured without terminating that Application Process which would otherwise cause the Application Process to lose all data currently held in Random Access Memory
3. An Application Process which requires a significant initialization sequence does not need to be terminated to install new minor software services. Instead, the Application Process can be reconfigured on demand.
4. New software services can be designed, implemented, and tested using an existing Application Process such that the new services can be de-installed if found in fault without disrupting the existing Application Process.
5. Application Processes which monitor real-time events can be dynamically reconfigured to adjust to those real-time events without terminating the existing Application Process.
6. Diagnostic Minor Services can be configured into an existing Application Process for administrative, diagnostic, or statistical analysis and subsequently removed without affecting the existing Application Process.

BRIEF DESCRIPTION OF THE DRAWINGS

FIG. 11. Pseudo Procedural Code for Example of Threaded State Machine.

FIGS. 12.A and 12.B State Machine Representation of Example of Threaded State Machine.

Figure 1:
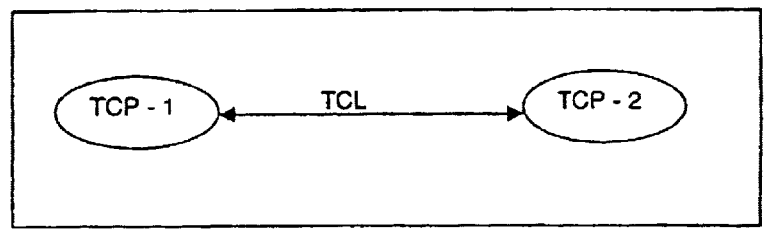
FIG. 1. Diagram showing Simple Thread Communication Link between TCP-1 and TCP-2.

The following figures show exemplary source code in the C programming language, as implemented for Unix 4.2 MP TLP/5:

FIG. 13. Examples of Source Code for Binding Services.
FIG. 13.A Commands Used to Compile Binder Example.
FIG. 13.B Running Binding Service Example.
FIG. 13.C Sample Output from Binding Service
FIG. 13.D Simple Services.
FIG. 13.E Registering Binding Method and Binding Arbitrary Named Representatives.
FIG. 13.F Header File Declaring Binding Method.

The following figures represent examples of data:

FIG. 13.G Examples of Pattern, Transformation, Locate, Status and Query for a Shared Object in a Shared Library.
FIG. 13.H Example of Shared Library Binding Method.
FIG. 13.I Example of Shared Library Binding Method including Pattern, Transformation, Locate, Status & Query.
FIG. 13.J Example of Data Structures Header File.
FIG. 13.K Example of Registering a Binding Service Method to Make Such Method Available to Binding Services (BSV).
FIG. 14. Samples of Particular Services.
FIG. 14.A Sample Communication Points Module.
FIG. 14.B Sample Output for Broker Data.
FIG. 14.C Sample Output for Weather Data.

The following figures show exemplary source code:

FIG. 15. Examples of Communications Modules.
FIG. 15.A Communication Data Header File.
FIG. 15.B Communication Data Module.
FIG. 16. Compoints.
FIG. 16.A Compoints Header File.
FIG. 16.B Compoints Module.
FIG. 17. Communications Registration.
FIG. 17.A Communications Registration Header File.
FIG. 17.B Communications Registration Module.
FIG. 17.C Communications Point Header File.
FIG. 17.D Communications Point Module.
FIG. 18. Thread Condition Variables.
FIG. 18.A Thread Condition Variable Header File.
FIG. 18.B Thread Condition Variable Module.
FIG. 19. Generic Compoints.
FIG. 19.A Generic Compoint Header File.
FIG. 19.B Generic Compoint Module.
FIG. 20. Thread Link Lists.
FIG. 20.A Thread Link List Header File.
FIG. 20.B Thread Link List Module.
FIG. 21. Mutex Thread Log.
FIG. 21.A Mutex Thread Log Header File.
FIG. 21.B Mutex Thread Log Module.
FIG. 22. Thread Mutex.

FIG. 22.A Thread Mutex Header File.
FIG. 22.B Thread Mutex Module.
FIG. 23. Communication Primitives.
FIG. 23.A Communication Primitive Header File.
FIG. 23.B Communication Primitive Module.
FIG. 23.C Communication Primitive Data Header File.
FIG. 23.D Communication Primitive Data Module.
FIG. 24. Thread Queue Conditions
FIG. 24.A Thread Queue Condition Header File.
FIG. 24.B Thread Queue Condition Module.
FIG. 25. Registry.
FIG. 25.A Registry Header File.
FIG. 25.B Registry Module.
FIG. 26. Minor Services Communication.
FIG. 26.A Minor Services Communication Module.
FIG. 27. Thread Reader-Writer.
FIG. 27.A Thread Reader-Writer Lock Header File.
FIG. 27.B Thread Reader-Writer Lock Module.

DETAILED DESCRIPTION OF THE INVENTION

The various aspects of the present invention can be implemented on a digital computer running an operating system that supports runtime-loadable software modules, such as Unix SVR4.2 MP TLP/5 (Unix System Laboratories, a subsidiary of Novell Corporation). Such a computer may, for example, be a Gateway 2000 computer having an Intel 486 microprocessor, or any other hardware compatible with that operating system. Many other operating systems may alternatively be used, including SunSoft Solaris 2.X, Microsoft Windows 95, Microsoft Windows NT, IBM's AIX, and Hewlett-Packard HP-UX, on any hardware compatible therewith. See, e.g. Solaris 2.2, SunOS 5.2 Reference Manual, Section 3, Library Routines (A-M) and (N-Z) (SunSoft Part No. 801-3954-10, Revision A, May 1993).

Configurable Application Program Service

The term Application Program is used to describe a software application residing on a medium accessible to the computer system.

An Application Process is said to provide some well-known service, e.g. wordprocessing, spreadsheet, graphics, etc. The Application Program may be devised to provide a series of one or more Minor Services and a Primary Service, which collectively constitute the Application Service.

The term Application Process, as used in this document, refers to the overall computer representation of the Application Program's execution. In this definition, the term Application Process is defined to incorporate all processes of various "weight" including, but not limited to, heavy weight, medium weight, and light weight processes relating to the Application Service. A heavy-weight process executes in its own address space, whereas medium-weight and light-weight processes may execute within the same address space. The Application Process may constitute one or more of these processes. Each of these processes is said to have a Thread of execution.

A Thread, in this context, represents an execution stream of the Application Process. The notion of a Thread can be provided by the underlying operating system, referred to as kernel-supported threads, or can be provided at the application level, referred to as user-level threads, or can be a mixture of the two. For the purposes of this description, these will collectively be referred to as Threads. Note that in a distributed environment, one or more of these Threads may be executing on a remote computer system.

The Application Process may be confined locally to the computer system on which the Application Process was initially started, or may have its execution threads distributed among various computer systems accessible to the computer system on which the Application Process was initially started.

When a user of the computer system requests to execute an Application Program, the Application Program is loaded into the computer's memory having a single Thread of execution. This initial Thread may then create additional Threads on the local computer system, or possibly on a remote computer system.

The creation of a new Thread requires the Application Process to specify the starting point of the new Thread. In procedural computer languages, for example, this would require the requesting Thread to specify the address of the procedure to begin as a new Thread. On some implementations, the new Thread must be identified by its Application Program name. The implication herein is that the Application Program is created (i.e. compiled) with this information present.

The Application Program is therefore a static representation of a well-known functionality and is not easily able to dynamically load additional Threads unknown at the time the Application Program was developed. There are, however, certain Applications Programs which provide a listing of installed computer Application Programs either through a textual display or through a graphical representation referred to as an icon. Additionally, certain Application Processes search specific directories for available Application Programs to execute as Application Co-Processes, but again, the criteria for their representation is static and unalterable by the end user.

In the textual representation, the name of the Application Program is provided with zero or more additional information components such as the owner, the size, and/or execution privileges. This listing is shown to the user, who may then enter the name of the application to execute.

Alternatively, when using a graphical user interface with an Icon, the name of the Application Program, its specific location on the computer system, and other information is required to execute the Thread. A further limitation of the Icon is that one Application Process can be started by selecting the Icon, but that Application Process cannot select a new Icon to execute as an Application Co-Process. That is to say, the Icon is a graphical representation for the end user to select.

A limitation of both the textual and graphical representation of the available Application Programs is that the information displayed to the user is dependent on the underlying operating system implementation. Certain operating systems will display the name, the size in bytes, the owner, the date created, and execution mode while others will display a subset of this information and possibly other system-dependent information. Regardless, however, the user cannot easily associate additional information with the installed application in a useful manner. Finally, many users have manually created what has become known as README files to describe this information.

There are many instances in which an Application Process will select different Minor Services depending on installed features, additional software available to the computer system, or due to other factors external to the Application Process itself. Currently, the only provisions to support such run-time changes to the Application Process are to design the Application Program with the appropriate logic.

This disadvantage to this approach, however, is that it limits the ability of the Application Process to dynamically configure itself based on available Minor Services, or due to other factors external to the Application Process itself. Additionally, the Application Process cannot appropriately handle cases in which an available Minor Service may conflict with another Minor Service. Once the incompatibility is detected, the Application Process will simply print an error message and terminate its processing.

Finally, an Application Process which locates available Minor Services has no simple provision for executing these Minor Services, communicating with these Minor Services, nor ensuring a proper ordering of the execution of these Minor Services.

The prior art therefore does not provide the necessary mechanisms for an Application Process to dynamically alter its execution based on Minor Services available either locally or remotely to the computer system. Additionally, the prior art does not provide the necessary mechanisms for the same Application Program to behave differently on two separate computer system offering two very different sets of Minor Services without this logic being introduced into the Application Program from the onset.

The prior art also does not provide the mechanisms for resolving feature conflicts in which there are two or more installed Minor Services available to the Application Process, but whose use are mutually exclusive. The Application Program will typically be designed to execute the first feature ("Feature A"), and then the second ("Feature B"). If Feature B conflicts with the use of Feature A, there are no simple remedies to support a resolution. Consider, for example, that the Application Process performs various initialization sequences required for Feature A. The Application Process may then also execute various initialization sequences for Feature B. During the initialization sequences for Feature A, certain values may be set in the Application Process which are inappropriate in the case of Feature B being present.

Within the prior art there are various approaches for configuration of Application Programs. Typically referred to as Software Construction Utilities, these approaches provide a rule-based system describing how an Application Program should be constructed from its corresponding application programming language source code. Examples of Software Construction Utilities include:

1. augmented make—"Augmented Version of Make," UNIX System V, Release 2.0 Support Tools Guide, pp: 3.1–19, April 1984.

2. build—Erickson, B., Pellegron, J. F., "Build—A Software Construction Tool," AT&T Bell Laboratories Technical Journal, vol. 63, No. 6, Part 2, pp: 1049–1059, July 1984.

3. make—Feldman, S., "Make—A Program for Maintaining Computer Programs," Software—Practice and Experience, vol. 9, No. 4, pp: 256–265, April 1979.

4. mk—Hume, A., "Mk: A Successor To Make," USENIX Phoenix 1987 Summer Conference Proceedings, pp: 445–457, 1987.

5. nmake—Fowler, G. S., "The Fourth Generation Make," USENIX Portland 1985 Summer Conference Proceedings, pp: 159–174, 1985.

6. Microsoft NMAKE—"Microsoft C: Advances Programming Techniques," Microsoft Corporation, pp: 103–132, 1990.

Here, the source code provides the necessary algorithm, logic, and instructions in a human-readable form. This source code must then be compiled into an Application Program which the computer can then load and execute. The process of determining the necessary actions to create the Application Program are typically controlled by a software construction Application Program (a "make" utility) which reads specifications from a data file known as a "makefile". This process is well known and well understood in the computer programming profession. The makefile contains specification of the form:

target.sub.—name:prerequisite.sub.—list

ACTION to denote that a target is dependent on prerequisites. If one or more of the prerequisites is newer than the target, then the ACTION is performed to construct the target. Each prerequisite can be listed as a target of another rule. As an example, consider:

rule 1 A:B C concatenate B and C to construct A rule 2 B:b copy "b" to "B"

rule 3 C:c copy "c" to "C"

In this example, the rule to construct the target "A" shows it has a dependency on prerequisites "B" and "C". Note, however, that "B" is dependent on "b" according to the second rule, and that "C" is dependent on "c" based on rule 3. If "c" has changed since the last time "C" was constructed, then the ACTION for rule 3 would be performed to reconstruct C. Similarly, if "b" has changed since the last time "B" was constructed, then the ACTION for rule 2 would be performed to reconstruct B. Note that the ACTION for rule 2 and the ACTION for rule 3 could in fact occur simultaneously since there are no other dependencies on these rules. After rule 2 and rule 3 has completed, then rule 1 can continue. Here, if "B" or "C" has changed since the last time "A" has been constructed, then the ACTION for rule 1 will be performed to reconstruct A.

The issue of software configuration has. historically been addressed by one of the following mechanisms:

1. All of the Application Program's Minor Services are developed and compiled into the Application Program which is then sold to the customer. I shall refer to this "Non-featuring Software."

2. All of the Application Program's Minor Services are developed and compiled into the Application Program which is then sold to the customer. Certain Minor Services, however, will be inaccessible to the customer unless the customer pays additional fees. At that time, a key file is provided to the customer with the appropriate purchased Minor Services turned on. I shall refer to this as "Run-Time Featuring."

3. All of the Application Program's Minor Services are developed, but during the software construction process certain features will be selected to include in the Application Program. I shall refer to this as "Compile-Time Featuring."

4. All of the Application Program's Minor Services are developed, but sold as separate Application Programs. In this instance, all of the components representing the Application are well known. During the execution of the Application Program, the features are tested to see if they are present. If a feature is not present, then it is simply ignored. I shall refer to this as "Load-Time Featuring."

Application Programs are typically designed and distributed following the Non-featuring Software model. Consider, for example, that when purchasing a Word Processing Application you receive all of the latest features available. This has the disadvantage that you are paying for features which you may not need.

With "Run-Time Featuring", the Application Program consists of the monolithic representation of the application. Thus you receive a potentially large Application Program with certain portions of the Application Program inaccessible to you.

Nonetheless, you receive the largest possible representation. The disadvantage to this approach is that you cannot ship the product until all features have been developed. Additionally, the customer must have enough memory and storage capacity for the entire Application Program even though only a one Minor Service may have been purchased.

With Compile-Time Featuring, the source code representing the application has numerous sections delineated with conditional inclusions based on specified criteria. As an example, in the C language it is customary to use:

```
#if defined(FEATURE.sub.-- A)
  ...
  #elif defined(FEATURE.sub.-- B)
  ...
#endif
```

The disadvantage to Compile-Time Featuring is that it makes the source code difficult to understand. Additionally, as more Minor Services are added, the complexity of maintaining the source code increases thus introducing the prospects for inadvertent software errors, known as bugs.

Load-Time Featuring is not very common in the industry as there is little perceived benefit. Considering that the Application must know the features to test for, there is little advantage in this approach versus the previously mentioned approaches.

An alternative method for dynamically configuring an application process during execution is to use a shared library >>ARNO86! >>ATT90! >>SUNS92!.

>>ARNO86! Arnold, J, "Shared Libraries On UNIX System V," 1986 Summer USENIX Conference Atlanta, Ga. pp: 395–404, 1986.

>>ATT90! AT&T, "UNIX System V Release 4 Programmer's Reference Manual", 1990.

>>SUNS92! Sun Microsystems, Inc., "SunOS 5.2 Linker and Libraries Manual", pp: 19–41, 1992.

With shared libraries, an application program references services available in the library without copying all of the text portion into the Application Program. When the Application Program is executed, the resulting Application Process opens the shared library, loads the service from the library, and then executes the service. The service is retained until the Application Process explicitly request that the service is to be removed from the Application Process. The advantage of using shared libraries is that the underlying library can be upgraded, altered, or otherwise changed independently of the Application Program.

The disadvantage in using shared libraries in this manner is that the shared library can only be altered when there are no Application Processes referencing the shared library. Another disadvantage in using shared libraries is that Application Programs are not normally designed to explicitly search and load services from the shared libraries on demand.

Thus the prior art provides a mechanism to administer the Application Program software construction process based on available Minor Services. It does not, however, address the needs or requirements for dynamic reconfiguration of the Application Process. The distinction here is that the former approach constructs a static representation of the Application Program while the later is a dynamic representation of the Application Process.

Thread Directory Service

The invention provides a Thread Directory Service to administer one or more Thread Service Directories. Through the Thread Directory Service a thread can:

1. register new services,
2. remove existing services, and/or
3. query the directory to search for services.

In registering a new service, a series of attributes are provided by the registering thread describing the type of service to be provided. These attributes are classified as Public or Private attributes. Public attributes are considered public information and are accessible through the Thread Directory Service by any thread executing locally, or remotely. Private attributes are only accessible by the Thread Directory Service. The administrator of the Thread Directory Service has access to all attributes. A complete description of the attributes is provided in the Embodiment section below.

In registering a new service, the Thread Directory Service assigns a unique Thread Communication Identifier to the new service and retains this Identifier in the Thread Service Directory.

Once registered, any thread can call the Thread Directory Service to query for a Thread Service by providing one or more Public Attributes. The Thread Directory Service will then search the Thread Service Directory reporting the Thread Communication Identifier(s) of those services matching the specified attributes. In querying the Thread Service Directory, a requesting thread can specify the search criteria attributes using Boolean expressions.

Only the Service Thread owner, or the administrator of the Thread Directory Service can delete entries from the Thread Service Directory.

Thread Communication Service

The Thread Commmunication Service (TCS) is a computer software method for dynamically administering the communications between two or more Minor Services of an Application Process.

The TCS Provides the Capability to 1. register low level communication primitives for connectivity and synchronization
2. register Minor Services as communication points
3. begin the execution of a communication point as a Minor Service of the Application Process
4. remove communication points
5. connect communication points using a communication link
6. disconnect communication points
7. suspend communication links
8. resume communication links
9. terminate the execution of a communication point
10. allow a communication point to broadcast to multiple communication points
11. allow a communication point to receive messages from multiple communication points

Thread Communication Switching Services

The Thread Communication Switching Services system has several features. It routes communications between two or more threads interconnected through a Thread Communication Link. It minimizes the number of Thread Communication Links required to be maintained by the Thread Connect Service. It also packages multiple Thread Communication Packets into a single packet for long distance communications. It also provides redundancy of communications in the event that a Thread Communication Point in the Thread Communication Link terminates unexpectedly.

Binding Service

The Binding Service is a computer software method to dynamically administer the association of one or more arbitrary named representations with entities understood by the Application Process. Each arbitrary named representation is a sequence of one or more bytes applied at the Application Process level.

Definitions

An arbitrary named representation is initially considered as Unbound. When an association between the arbitrary named representation is made with an entity understood by the Binding Service, then the arbitrary named representation is considered Bound. The process of determining the association is called the Binding Process. The Binding Process applies an ordered series of Binding Methods to determine if an association between an arbitrary named representation and the entities understood by the Binding Service can be made.

To determine the significance of an arbitrary named representation within the scope of the Application Process, the Application Process can request the Binding Service to apply the Binding Methods to the arbitrary named representation to determine what entity the name represents.

Binding Methods

The Binding Service provides a series of Default Binding Methods including the ordering of Binding Methods as should be applied by the Binding Service. These Binding Methods and their ordering are specified in a Binding Configuration File which is read by the Binding Service during its initialization. Additional Binding Methods can be added to the Binding Configuration File by the end user. Other Binding Methods can be registered with the Binding Service during the Application Process run time execution. The registration of a Binding Method must include the information shown in Table 1.

TABLE 1

Binding Method Registration Information.

Order of Evaluation
Location of Binding Method
Name of Binding Method

Example descriptive Binding Methods and their definitions are shown in Table 2. An Example of implementing a Shared Library Binding Method and a Shared Object Binding Method are shown in shown in FIG. 13.E through FIG. 13.K and are compiled using the second command line of FIG. 13.A. FIG. 13.D provides a listing of a simple minor service that is compiled using the first command line shown in FIG. 13.1. An example execution of the said compiled program is shown in FIG. 13.B. The sampled output from the execution of said compiled program is shown in FIG. 13.C.

TABLE 2

Default Binding Methods.

File Binding Method
    a method to bind the arbitrary named representation to a file accessible by the computer system
Shell Binding Method
    a method to bind the arbitrary named representation to a user level shell
Data Binding Method
    a method to bind the arbitrary named representation to a datum available to the Application Process
Function Binding Method
    a method to bind the arbitrary named representation to a function (procedure) accessible to the Application Process
Thread Binding Method
    a method to bind the arbitrary named representation to a thread of the Application Process
Process Binding Method
    a method to bind the arbitrary named representation to an existing Application Process Each Binding Method must have associated with it the operations shown in Table 3.

TABLE 3

Binding Method Operations

Pattern Matching Method
Name Transformation Method
Locate Method
Status Method
Query Method

The Binding Method Operations

Pattern Matching: if the arbitrary named representation matches the specified regular expression pattern, then apply the Locate Operation to determine if the named representation can be found. If the Pattern Matching Method is specified as NULL, then proceed as if the name was matched. If the arbitrary named representation does not match the specified regular expression pattern, then go to the next Binding Method.

Transformation: if the arbitrary named representation successfully completes the Pattern Matching operation, then apply the Transformation operation to the arbitrary named representation and use this transformed name for subsequent operations. If the Transformation operation is not specified for this Binding Method, then use the specified arbitrary named representation for subsequent operations.

Locate Operation: use the registered Locate operation to see if the arbitrary named representation can be found. If the Locate Method returns success, then the arbitrary named representation is considered BOUND using this Binding Method. If the Locate operation fails, then the arbitrary named representation remains unbound.

Status Operation: given a BOUND arbitrary named representation, use this operation to retrieve the status information describing this entity. This includes the following information:

arbitrary name: the specified arbitrary named representation expanded name: the expanded description to be associated with this arbitrary named representation owner information: description of the owner of this bound entity status timers: includes the creation time, the last modification time, the last access time size: the size of the entity in bytes value: the last recorded value associated with the entity entity specific data: entity specific data values including the size of this data Query Operation: given a BOUND arbitrary named representation, report the status information as described by in the Status Operation.

Binding Service Interface

The Binding Service itself provides the following methods for the Application Process:

Register register a new Binding Method

Set Order set the ordering of the Binding Methods

Unregister remove a Binding Method

Bind apply the Binding Methods on a specified arbitrary named representation

Unbind unbind the arbitrary named representation

Establish request the Binding Service to read a specified Binding Service Configuration File Report report the requested information to the Application Process. This may include the list of Binding Methods, the order of evaluation of Binding Methods, and/or the characteristics of the Binding Methods Query report the requested information on the arbitrary named representation to the Application Process Purge delete all references to arbitrary named references that are currently UNBOUND.

Dynamic Configuration Management

The Dynamic Configuration Management, hereinafter sometimes referred to as the DCM, provides a method for an Application Process to dynamically construct and subsequently execute a Dynamically Configured Application Program offering an Application Service with zero or more Minor Services.

The Application Process constructs a Dynamically Configured Application Program in the DCM by specifying a series of RULES identifying the components of the Dynamically Configured Application Program, the interactions between these components, the policy for evaluating these components, the order of evaluation of these components, and a method for satisfying the RULE. Additionally, the Application Process can specify zero or more data files referred to as Program Rules Files containing RULES for the Dynamically Configured Application Program. In this sense, the Application Process provides the blueprint for constructing the Dynamically Configured Application Program either through an Application Programming Interface and through zero or mode Application Program Rules Files. Once constructed, the Application Process can then request the DCM to execute the Dynamically Configured Application Program.

The specification of a RULE includes the information shown in Table 4, although additional information may be provided by the actual implementation:

TABLE 4

Rule Specification Components

A unique alphanumeric name to identify the RULE
A DCM operator denoting the policy for evaluating the RULE
Zero or more Prerequisite Universal RULES
Zero or more Attributes describing characteristics of the RULE
A method (possibly given as NULL) for satisfying the RULE There are two classifications of RULES supported by the DCM given as Reserved Rules and Universal Rules. The Reserved Rules have special meaning to the DCM and cannot be redefined. The Universal Rules are specified by the Application Process. In either case, however, the Rules contain the minimum information described in Table 4.

A series of one or more Reserved Rules, referred to as the Flow Rules, provide the framework for executing the Dynamically Configured Application Program. Whenever a Dynamically Configured Application Program is to be executed, the DCM begins by evaluating the Flow Rules. All other actions are derived as a result thereof. The Flow Rules are shown in Table 5.

TABLE 5

The Flow Rules.

DCMINIT RULE
APINIT RULE
MAIN RULE
DONE RULE
APDONE RULE
DCMDONE RULE

The MAIN RULE must be specified for the Dynamically Configured Application Program to execute. The other Flow Rules (DCMINIT, APINIT, DONE, APDONE, and DCMDONE are optional).

The DCM groups all Rules with the same name together as if they were specified as a single entity. This permits, for example, the Application Process to specify potions of a Rule during initialization sequences and the remainder of the Rule when initialization has completed.

When the Dynamically Configured Application Program is to be executed, the DCM will evaluate each of the specified Flow Rules. In evaluating a RULE, the DCM views the RULE name as the current rule. The evaluation process is such that the DCM will first evaluate all Prerequisite Rules of the current rule. Thus, a Prerequisite Rule becomes the current rule and the evaluation continues with its Prerequisite Rules. This is implemented using well known directed graph techniques.

When the current rule has no Prerequisite Rules listed, and the DCM determines the current rule must be evaluated, then the DCM will execute the method for this rule. After executing the method for the current rule, the DCM attaches a time stamp value denoting when the current rule was evaluated.

When the current rule has one or more Prerequisite Rules, then the DCM compares the time stamp value of the current rule with that of its Prerequisite Rules. If the time stamp value of the current rule is older than the time stamp value of its Prerequisite Rules, then the current rule's method is executed to satisfy the rule and the time stamp value of the current rule is updated to denote when the current rule was evaluated. Otherwise, the current rule's time stamp value remains unchanged and the method is not executed.

After evaluating the last Flow Rule of the Dynamically Configured Application Program, the DCM considers the application as having completed and returns control back to the initial Application Process.

The policy for evaluating a RULE is determined by the DCM operator component of the RULE. By default, a TIME.sub.—VALUE operator (:) will be applied which provides the behavior as described above. Additional DCM operators can be derived and implemented into the DCM to describe the relationship between the RULE and its Prerequisite Rules.

Initially when a RULE is specified, the DCM makes no assumptions as to what the RULE name represents. During the evaluation of the RULE, the DCM uses the Binding Service to associate the RULE name with an entity understood by the DCM. The list of entities understood by the DCM and their corresponding interpretation by the DCM are provided during the initialization of the DCM. In this sense, the list of entities can be modified and updated over time based on market demand for new entities and their interpretations. The DCM provides the following default Binding Methods:

SHARED LIBRARY BINDING METHOD: The rule represents a shared library available to the Application Process.

SHARED OBJECT BINDING METHOD: The RULE name represents a shared object from a shared library. If the RULE has a prerequisite RULE BOUND to a SHARED LIBRARY, then the shared object is presumed to exist in that library. If the method for the rule is to be executed, then the DCM opens the shared library, extracts the shared object, and executes the shared object. To specify a SHARED OBJECT BINDING METHOD, the rule must have the Reserved Rule SHARED OBJECT as a prerequisite rule.

THREAD BINDING METHOD: The RULE name represents a procedure to invoke as a separate thread of execution within the Application Process. To specify a THREAD BINDING METHOD, the rule must have the Reserved Rule THREAD as a prerequisite rule.

SHELL BINDING METHOD: The RULE name does not represent a physical entity, but rather, its method is specified as statements to be executed by the underlying SHELL provided by the operating system. To specify a SHELL BINDING METHOD, the rule must have the Reserved Rule SHELL as a prerequisite rule.

FUNCTION BINDING METHOD: The FUNCTION BINDING METHOD associates the rule name with a function (procedure) available in the application program. The DCM will search the symbol name list for the Application Process to locate the address of the function. If the DCM must trigger the method for the rule, then the function is invoked.

FILE BINDING METHOD: The rule name represents the name of a file accessible by the computer system.

DEFAULT BINDING METHOD: If no binding method has not been specified for the rule, then the DCM will bind the rule name using the DEFAULT BINDING METHOD. The DEFAULT BINDING METHOD is to associate the rule name with a function (procedure) available in the application program. The DCM will search the symbol name list for the Application Process to locate the address of the function. If the DCM must trigger the method for the rule, then the function is invoked. If the DCM cannot locate the function in the Application Process's symbol table, then the RULE is considered to have failed.

The DCM can exist as a co-process of the Application Process, or as a sibling process of the Application Process. In the former sense, the DCM can be accessed by multiple Application Programs thus providing a sharing of information. In the later case, the DCM resides within the Application Process. There are no constraints inherent in the model to preclude the use of the DCM across multiple computer systems.

Through the use of the Dynamic Configuration Management method, Minor Services for an Application Service can be designed, implemented, tested, and distributed independently of the corresponding Application Program. The end-user can therefore purchase and install only those Minor Services of interest. When the Application Program is to be executed, the resulting Application Process will dynamically configure itself to provide the available Minor Services.

The advantage to the computer industry is that the Minor Services, for example, can be designed after the Application Program and sold individually to the end user. The implications are that:

1) the base Application Program need not be altered to support these additional Minor Services;
2) since the end-user is purchasing only those Minor Services of interest, the end user does not have to provide additional media storage capacity to support unwanted Minor Services;
3) additional Minor Services can be designed, implemented, tested, and installed after the base Application Program thus providing:
   a) the designer of the Application Program the ability to design, implement, and test additional Minor Services based on new market demands without changing the existing base Application Program
   b) the ability to design, implement, and test additional Minor Services specific to an individual customer without effecting other customers. In this sense, all customers would have the exact same base Application Program, but potentially different installed Minor Services
4) the development of additional Minor Services can be thoroughly tested as smaller units when compared to the approach used today in which a new, monolithic representation of the Application Program must be tested. The advantage herein is that the computational resources required to develop the software are decreased, the cost of testing is decreased, and the Minor Services can be delivered to the market in a shorter time interval.

Configurable Application Program Service

The Configurable Application Process Service is a computer software method for dynamically administering the component Minor Services of an Application Process. The Configurable Application Process Service consists of a Configuration Administrator Minor Service thread using the Communication Manager Program Service described elsewhere in this patent application. Various other Minor Service threads may be created by the Configuration Administrator as described herein.

The Application Process uses the Configuration Administrator Minor Service, hereinafter referred to as the CAMS, to administer zero or more components of software. Each component is said to offer a well defined application Minor Service hereinafter singularly and collectively referred to as the AMS.

The specifications for the administration of the AMS can be provided directly by an Application Process, or, indirectly through a data store monitored by the CAMS. These specifications can instruct the CAMS to perform the desired operation immediately, at a predefined time (which may be an interval), or, as a result of some event which is later communicated to the CAMS.

There are fifteen general operations available through the Configurable Application Process Service given as:
1. LOCATE: locate and report the location of a specified AMS
2. LOAD: configure the specified AMS into the Configurable Application Program Service
3. EXECUTE: execute the specified AMS
4. REPLACE: replace the specified AMS with a new AMS
5. UNLOAD: unload the specified AMS from main memory
6. DUMP.sub.—MAP: dump a map of the current values of a specified AMS
7. LOAD.sub.—MAP: load a map of current values for a specified AMS
8. NOTIFICATION: notify the CAMS that the specified event has occurred
9. INSERT: insert the specified AMS in between two existing AMS
10. EXTRACT: removes specified AMS previously inserted with INSERT operation
11. SUSPEND: suspend the communications to a specified AMS
12. RESUME: resume the communications to a specified AMS
13. COMPRIMS: set the default communication primitives for an AMS
14. TERMINATE: terminate the execution of the specified AMS.
15. QUERY: report useful information on the current AMS being administered through the configurable Application Process Service.

Other technology which may be configured with the Configurable Application Program Service includes the Binding Service as described in this application.

The advantage to the computer industry is that an Application Program can be constructed and executed and subsequently re configured to take advantage of newly installed minor software services while the Application Process is executing. The implications of such a system are that:
1. Mission critical Application Programs which require 24 hour, 365 days a year execution can be re configured without terminating the existing Dynamically Configured Application Process's execution.
2. An Application Process can be re configured without terminating that Application Process which would otherwise cause the Application Process to lose all data currently held in Random Access Memory.
3. An Application Process which requires a significant initialization sequence does not need to be terminated to install new minor software services. Instead, the Application Process can be re configured on demand.
4. New software services can be designed, implemented, and tested using an existing Application Process such that the new services can be deinstalled if found in fault without disrupting the existing Application Process.
5. Application Processes which monitor real time events can be dynamically reconfigured to adjust to those real time events without terminating the existing Application Process.
6. Diagnostic Minor Services can be configured into an existing Application Process for administrative, diagnostic, or statistical analysis and subsequently removed without affecting the existing Application Process.

Named Execution Environment

This portion of the invention is a computer application service called the Named Execution Environment Manager. A series of one or more machines interconnected through some form of a networking scheme can register one or more arbitrary attributes describing the characteristics of the machine. These attributes are known as the Registered Environment Attributes within the Named Execution Environment. This registration process can be completed by the system administrator (the owner of the machine), or can be completed by an automated Application Process which probes the machine to determine the default attributes of the machine.

When an Application Process requires the use of an execution environment, the Application Process calls the Named Execution Environment Manager and specifies one or more attributes describing the requirements of the desired execution environment. These attributes are referred to as the Required Environment Attributes. Further, the Application Process provides the Named Execution Environment Manager specific information to be associated with the new environment if it can be created. This information is called the Named Execution Environment Attributes.

The Named Execution Environment Manager then selects an appropriate machine based on a boolean evaluation of the Required Environment Attributes provided by the Application Process, and the Registered Environment Attributes describing the physical machines.

When the Named Execution Environment Manager finds a machine whose Registered Environment Attributes satisfy the specified Required Environment Attributes, the Named Execution Environment Manager then establishes an execution environment on the associated physical machine for use by the Application Process. The Named Execution Environment Manager then applies the various Named Execution Environment Attributes to this newly created execution environment, and retains this information either in memory, or on a storage device accessible to the Named Execution Environment Manager.

One of the Named Execution Environment Attributes specified by the Application Process is a logical name to be associated with the execution environment. The Application Process then provides the Named Execution Environment Manager the logical name of an environment and a request to execute in that environment. The Named Execution Environment Manager locates the associated environment and sends the Application Process's request to that environment. The request can be any command understood by the environment.

The returned values from executing the Application Process's request in the named environment is then sent to the Application Process. This is accomplished using the Thread Communication Service as described in this patent application.

Threaded State Machine

This part of the invention is a state machine manager thread providing the administration of a state machine, and the administration and execution of various components of a state machine.

EXEMPLARY EMBODIMENTS OF THE INVENTION

Without limiting the generality of the invention as summarized above, the following descriptions, taken with the accompanying Figures, further provide specific examples of how the various aspects of the invention may be embodied in particular software. Those skilled in the art will recognize that changes in form and details may be made therein without departing from the scope and spirit of the invention.

Thread Directory Service

A Thread Service Directory contains zero or more entries describing Service Threads. A Service Thread is defined as an entity providing some form of a service which may or may not require direct interaction with an application program. Each Thread Service Directory entry contains items 2 and 4 below, and desirably one or more of the other entries described below:

1. textual description of the type of service;
2. sending communication primitive and receiving communication primitive;
3. communication mechanism used in establishing this service;
4. Location of the service;
5. input types understood by the service;
6. output types generated by the service;
7. keyword search list used to locate this service entry;
8. token describing if the execution of the service can be started;
9. token describing the data representation in communication with the service, i.e., binary, ASCII, etc.;
10. token describing if the execution of the service must have previously been started;
11. token describing if Thread Communication Identifier is listed or is unlisted;
12. token describing if a public connection to the service can be used;
13. token describing if a private connection to the service can be used;
14. token describing if a public connection is mandatory;
15. token describing if a private connection is mandatory;
16. token describing if the service is a component of a larger service;
17. shell actions to execute in initializing this service;
18. the maximum number of concurrent communications;
19. licensing information;
20. other general user information;
21. link to additional Services required in using this service;
22. series of status information components including but not limited to security privileges and owner information;
23. series of additional information components used for future enhancements;
24. Thread Communication Identifier;
25. Secondary Thread Service Directory;
26. Usage Fee;
27. Directory Service Fees.

Access to the Thread Service Directory is provided by the Thread Directory Service which executes as a separate thread but which may be called from an application program. The Thread Directory Service offers a series of operations such as REGISTER, DELETE, QUERY, and others.

When a new Service Thread is made available to the computer system, it can register its service by calling the Thread Directory Service specifying a REGISTER operation and providing the required information along with any optional information or attributes. Alternatively, a separate application can register other Service Threads available to the computer system by calling the Thread Directory Service and specifying a REGISTER operation along with the appropriate information. This permits a separate application program to provide this information without requiring the Service Thread to register itself. Duplicate entries in a given Thread Service Directory are not permitted. In this instance, the Thread Directory Service will return an error indication to the registering thread. In registering the Service Thread, the Thread Directory Service will assign a unique Thread Communication Identifier to be associated with the Service Thread. The Thread Directory Service will then return this identifier to the thread registering the service.

A Service Thread can subsequently request that its entry is to be deleted from the Thread Service Directory by calling the Thread Directory Service and requesting a DELETE operation. Alternatively, a separate application thread, with appropriate permissions can perform the same operation.

A thread can query the information in the Thread Service Directory by calling the Thread Directory Service specifying a QUERY operation and providing zero or more components of an entry on which the Thread Service Directory is to search for. This information is then made available to the requesting thread.

A special Thread Directory Administrator Service is also provided to the owner of the Thread Directory Service to perform various administrative functions such as report generation, directory reordering, billing, and trouble reporting. The Thread Directory Service and its components provides for software what the telephone companies provide for their end users. The entire Thread Directory Service and its components are implemented through software and require no physical wire connection as does the telephone to use its service with the exception of any internal computer hardware.

Note that the Thread Directory Service and its representation of the Thread Service Directory can be maintained on separate computer facilities connected through some form of a communication channel such as, but not limited to, a network, a telephone modem, a direct link, fiber connection, or wireless connection. The only caveat is that there must be some form of communication available between these computer systems. Additionally, it is possible for the Thread Directory Service to establish communications through several computer systems to ultimately reach one or more additional Thread Service Directories.

Thread Communication Service

The Architecture

The Thread Communication Service (TCS) is a computer software method to dynamically administer the communications of two or more Minor Services of an Application Process. In this context, the Minor Services are referred to as communication points.

A communication point can request the TCS to connect it to another communication point and in doing so, the TCS is said to have established a Thread Communication Link (TCL) between the communication points. Through the TCL, a communication point can send data to the connected communication point, and, can receive data from the connected communication point. When a communication point no longer needs the TCL, it notifies the TCS to disconnect the TCL.

Communication Primitives

Communication primitives are the low level mechanism used to transmit and receive data between two or more communication points. The communication primitives are constructed using low level operating system interfaces which provide the underlying connectivity and synchronization requirements. To use a communication primitive with the Communication Manager, the communication primitive must provide the following operations:

CREATE: allocates and initializes a new copy of the communication primitive

DESTROY: de-allocates a copy of the communication primitive

SEND: sends data out to the communication primitive and notifies receiver of pending message RECEIVE: receives data from the communication primitive RECONNECT: provides a method to cycle a communication primitive with a NULL message CONNECT: a special method for perform a connection DISCONNECT: a special method to perform a disconnect SUSPEND: a special method to suspend the execution of this type of communication primitive RESUME: a special method to resume the execution of this communication primitive Two examples of communication primitives are the: queueConditionThread and queueConditionProcess. The queueConditionThread provides a communication primitive between Application Services executing in the same address space, whereas a queueConditionProcess provides a communication primitive for use between Application Processes executing in disjoint address spaces.

queueCondition Thread Operations

The following are queueConditionThread operations:

CREATE: allocate the storage space for a QueueCondition primitive and initialize the message queue, the condition variable and the mutex DESTROY: de-allocates the storage space of a queueConditionThread SEND: locks the message queue, posts the message to the queue, broadcasts the condition of the queue has changed and unlocks the queue RECEIVE: locks the message queue, reads the message from the queue, and unlocks the queue RECONNECT: locks the message queue, posts a NULL message to the queue, broadcasts the condition of the queue has changed and unlocks the queue queueConditionProcess Operations The following are queueConditionProcess operations:

CREATE: allocates the storage space for a queueConditionProcess primitive in a shared memory segment, or a mapped memory region and initialize the message queue, the condition variable and the mutex DESTROY: de-allocates the storage space of the queueConditionProcess primitive from the shared memory segment, or the mapped memory region SEND: locks the message queue, posts the message to the queue, broadcasts the condition of the queue has changed and unlocks the queue RECEIVE: locks the message queue, reads the message from the queue, and unlocks the queue RECONNECT: locks the message queue, reads a NULL message from the queue, and unlocks the queue The TCS maintains a list of available communication primitives for use by the communication points. This list is referred to as the Communication Primitives List. The queueConditionThread and queueConditionProcess primitives are added to this list. Each member of this list is a communication primitive and contains references to the available operations for this primitive.

The Application Process can add a member, delete a member, or query member information from the Communication Primitive List.

Communication Primitives can be added for all low level physical networks, and for higher level OSI protocols. These include NetWare, TCP/IP, X.25 communications and the likes. The only requirement is that the communication primitive provide the operations described above.

The Application Process can request the TCS to REGISTER a communication primitive for use in subsequent communications. The communication primitive is identified by:

1) its address within the operating system, or
2) by its reference name supported by the underlying operating system, such as a shared object from a shared library, or,
3) the Application Process can request the communication primitive to be registered in the Thread Directory Service (see the description of TDS), or
4) the Application Process can request the BINDER SERVICE to bind the identifiable name to an entity understood by the BINDER SERVICE.

The Communication Primitive should, however, be a loadable module that the underlying operating system can load as part of the Application Process requesting a connection to a communication point, as described below.

The list of Communication Primitives available to the Application Process can be retained in memory, or, retained in a file on a storage medium (disk), or, retained in the TDS, or, retained in an Application Process accessible to the requesting Application Process.

Registering Communication Points

The Application Process can requests the TCS to REGISTER a Minor Service as a communication point. The Minor Service is identified by:

1) its address within the operating system, or,
2) by its reference name supported by the underlying operating system, such as a shared object from a shared library, or,
3) the Application Process can request a Minor Service to be registered in the Thread Directory Service (see the description of TDS), or
4) the Application Process can request the BINDER SERVICE to bind the identifiable name of the service to an entity understood by the BINDER SERVICE, or,
5) by other means supported by the underlying operating system to ensure that the operating system can resolve the reference (i.e., the binding of the name is done by the operating system when the name is referenced in a connection).

In the registration process, the communication point can be identified as either a Sender communication point, a Receiver communication point, or as both a Sender and a Receiver communication point. The registration process can also permit the Application Process to specify the desired low level communication primitive to use when the communication points is to Receive communications, and the communication primitive to use when the communication point is to Send communications. The specifications for the low level communication primitive can include:

1) its address within the operating system, or,
2) by its reference name supported by the underlying operating system, such as a shared object from a shared library, or,
3) the Application Process can query the list of available communication primitives from the TDS, or from the Application Process itself, or,
4) the Application Process can request the BINDER SERVICE to bind the identifiable name of the communication primitive to an entity understood by the TCS, or,
5) by other means supported by the underlying operating system to ensure that the operating system can resolve the reference (i.e., the binding of the name is done by the operating system when the name is referenced).

The list of registered communication points can be retained in memory, or, retained in a file on a storage medium accessible to the computer system, or, retained in the TDS, or, retained in an Application Process accessible to the requesting Application Process.

Connecting Communication Points

The Application Process can request the TCS to CONNECT two communication points with a TCL. In specifying the communication points, the TCS ensures that one communication point is a Sender communication point and the other communication point is a Receiver communication point. Further, the Communication Manager ensures that the Sender communication point and the Receiver communication point both use the same underlying synchronization primitive for connectivity and synchronization. If either condition is not satisfied, the Communication Manager will abort the request and notifies the Application Process of the error condition.

Communication Point Selection

The selection of the communication points is determined by the implementation which could include:
1) the Application Process provides the name (and possibly the location) of the Minor Service, or,
2) the Application Process calls the TDS to search for a communication point based on specific criteria, or,
3) the Application Process uses the BINDER SERVICE to bind an arbitrary named representation to an entity understood by the TCS, or,
4) the Application Process uses the underlying operating system implementation to resolve the name of the entity.

Regardless of the method used, the TCS must be able to resolve the name and location of the communication point. If the TCS cannot determine the name and location of the first communication point, it will call the TDS to determine if the name represents a Thread Communication Identifier as described in the Thread Directory Service (TDS) section of this application.

Creating Communication Points

If necessary (based on registration data; see the section on TDS), the TCS will start an invocation of a communication point as a separate thread of control. The invocation of a communication point can be as a separate process, or, as a separate thread. In either case, the TCS will begin the invocation of the Minor Service if the Minor Service must be executed, and if there are no administrative constraints, such as the number of instances of runnable Minor Services of the specified type has been exhausted (See the section on TDS).

Alternatively, the Application Process can request that the TCS CREATE an instance of a particular Minor Service without specifying a communication point that should be attached to it. This permits the TCS to begin the execution of the communication point, subject to the constraints in the preceding paragraph), and permit the communication point to perform some processing prior to having a connected communication point. This is particularly useful for daemon Minor Services performing housekeeping (memory management, etc). At a later time, the Application Process can request the TCS to connect a communication point to this CREATED communication point.

In creating the Minor Service, the requesting Application Process can specify if the Minor Service is to be executed as a Sender, Receiver, or both. This information can be compared against the registered information to ensure the Minor Service has desired communication capability. The TCS performs the following actions:

1) locate the requested service and complain if it cannot be found; otherwise establish a thread communication link for this communication point (allocates memory and initializes) and record the location of the Minor Service communication point.
2) if the Minor Service communication point has the capability to send:
   a) locate the communication primitive used by the Minor Service to send.
   b) create an instance of the communication primitive (allocate memory and initialize). This is accomplished by executing the communication primitive's CREATE operation.
   c) set the minimum threshold value (when there are this many messages waiting to be retrieved from the connected communication point, then resume the execution of this communication point). Note that a default value of zero discontinues this feature.
   d) set the maximum threshold value (when there are this many messages having been sent, but still not received by the connected communication point, then suspend the execution of this communication point). Note that a default value of zero discontinues this feature.
   e) load the communication primitive into memory if not already available.
   f) this information (related to step 2) is stored in the Minor Service communication point's thread communication link area for the sender.
3) if the Minor Service communication point has the capability to receive:
   a) locate the communication primitive used by the Minor Service to receive.
   b) create an instance of the communication primitive (allocate memory and initialize). This is accomplished by executing the communication primitive's CREATE operation.
   c) set the minimum threshold value (when there are this many message waiting to be received, then resume the execution of the sender). Note that a default value of zero discontinues this feature.
   d) set the maximum threshold value (when there are this many messages waiting to be received, then suspend the sender). Note that a default value of zero discontinues this feature.

e) load the communication primitive into memory if not already available.

f) this information (related to step 3) is stored in the Minor Service communication point's thread communication link area for the receiver.

4) using the located communication point information, start an instance of the communication point and notify it of the communication control structure as defined above.

Connecting Communication Points

The Application Process can request the TCS to connect two communication points such that the communication points can communicate with each other. If either communication point is not currently active, the TCS will CREATE the missing communication point (see Creating Communication Points).

When both communication points are created, the TCS will link the two communication points based on the specified communication direction which is given as one of:

Direction 1) the request is to connect two communication points with each communication point being able to send and receive, or Direction 2) the request is to connect one communication point to send and the other communication point to receive, or Direction 3) the request is to connect one communication point to receive and the other communication point to send, or Direction 4) the request is to connect one communication point to neither receive nor send, and the other communication point to neither receive nor send; thus ensuring the specified communication points are simply CREATED.

Figures 9, 10:
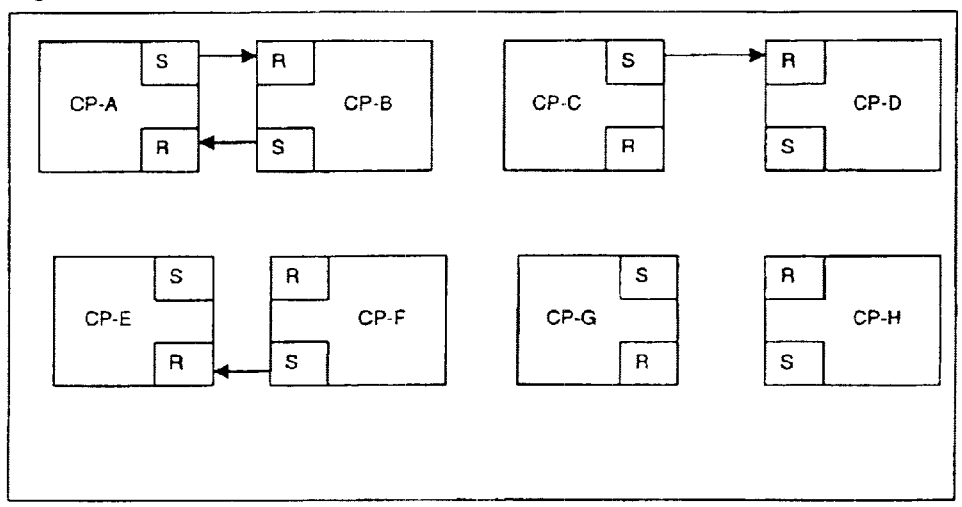
FIG. 9. Diagram showing Directed Communication Types between Communication Points FIG. 10. Diagram showing Theoretical Open Systems Interconnection (OSI) Model.

For the purposes of describing the connection process, with reference for example to FIG. 9, we describe the case of CP-A being connected to CP-B using communication direction 1 as described above:

step 1) add CP-B's receiver to CP-A's senderList.

step 2) add CP-A's sender to CP-B's receiverList.

step 3) add CP-A's receiver to CP-B's senderList.

step 4) add CP-B's sender to CP-A's receiverList.

step 5) if the CP-A service is idle, then reactivate it.

step 6) if the CP-B service is idle, then reactivate it.

For the case of CP-C being connected to CP-D using communication direction 2, as described above, then step 1) and step 2) are not completed. For the case of CP-E being connected to CP-F using communication direction 3, as described above, then step 3 and step 4 are not completed. For the case of CP-G being connected to CP-H using communication direction 4, as described above, then step 1), step 2), step 3) and step 4) are not completed.

In this manner, the TCS establishes a communication link between the two communication points. In specifying a CONNECT request, the Application Process may specify only one of the two communication points.

If a Sender communication point is not specified, then the requesting Application is Process is assumed to be the Sender communication point. If the specified Receiver communication point is not currently executing, then the TCS will issue a CREATE operation for the Receiver communication point.

Alternatively, if the Application Process does not specify a Receiver communication point, then the Application Process is assumed to be the Receiver communication point. If the specified Sender communication point is not currently executing, then the TCS will issue a CREATE operation for the Sender communication point.

Once connected, the Receiver communication point uses the RECEIVE operation of its Receiver to Receive message. The Sender communication point uses the SEND operation of its Sender to send message.

Note that certain communication primitives require specialized initializations for establishing connections and hence, if the communication primitive contains a CONNECT function pointer, then the communication primitive's CONNECT function will be executed before any other steps in this section.

Suspending Communication Points

The Application Process can request the TCS to SUSPEND a TCL currently in use by two communication points. In suspending the TCL, the TCS will temporarily suspend the execution of the Sender communication points. Alternatively, if the Sender communication primitive has a special SUSPEND operation defined, then the TCS will invoke that SUSPEND operation.

Resuming Communication Points

The Application Process can request the TCS to RESUME a TCL currently in the suspended state. In resuming the TCL, the TCS will resume the execution of the Sender communication points. Alternatively, if the communication primitive of the SENDER has a special RESUME operation defined, then the TCS will invoke that RESUME operation.

Disconnecting Communication Points

The Application Process can request the TCL to DISCONNECT one or more communication points using a TCL. In performing the disconnect, the TCS temporarily suspends the communication points, removes the current TCL, and restores the prior TCL associated with the communication points. The execution of the communication points are then resumed. The requesting Application Process can specify if the TCS is to terminate either or both of the communication points participating in the thread communication link being disconnected. For each point being disconnected, the TCS will perform the following actions:

1) if the receiver component of the communication point is defined and the receiver communication primitive has a DISCONNECT operation defined, then the TCS will invoke that operation.

2) if the sender component of the communication point is defined and the sender communication primitive has a DISCONNECT operation defined, then the TCS will invoke that operation.

Destroying a Communication Point

The Application Process can request the TCS to DESTROY a communication point. In doing so, the TCS will eliminate the registered information regarding this communication points from its storage. If the communication point is currently executing, then the TCS sends a signal to the communication point to terminate. On some implementations, a special message may be sent by the TCS to the communication point notifying it that it is to terminate.

Reconnecting a Communication Point

An Application Process can request the TCS to RECONNECT a specified communication point. In doing so, the TCS will send a NULL message to the communication point. This is useful to determine the state of the communication point and to cycle the communication primitive.

Executing a Communication Point

The Application Process can request the TCS to EXECUTE a specified communication point. In doing so, the TCS will examine its TCL for a communication point having the specified name. If the communication point is not currently executing, then TCL will issue a CREATE. request for the specified communication point. The communication point's thread is then specified to resume execution. In this manner, a daemon Minor Service can be created.

Note that if the communication point is a Receiver communication point, then the communication point will presumably block on its first call to its communication primitive's RECEIVE operation. Alternatively, if the communication point is a Sender Minor Service, then the communication point will presumably continue to send messages using its communication primitive's SEND operation, and these message will remain until a Receiver communication point is connected.

EXAMPLE TCS Application Program

FIG. 14.A provides an example of registering communication points (Minor Services) and connecting the Application Process to these communication points to take advantage of the Minor Service.

FIG. 14.B contains sample input for a Minor Service called the broker service.

FIG. 15.A contains the communication data header file used by the communication data module with the example TCS Application Program.

FIG. 15.B contains an example communication data module to be used with the example TCS Application Program.

FIG. 16.A contains the communication point header file used by the communication point module with the example TCS Application Progra, FIG. 16.B contains the communication point module providing the ability to create a communication point in the example TCS Application Program. A communication point can also be destroyed using the Destroy function of this module.

FIG. 17.A contains an example communication registration header file used by the communication registration module with the example TCS Application Program.

FIG. 17.B contains an example communication registration module to register a Minor Service available to the example Application Process.

FIG. 17.C contains the example compoint header file used by the example compoint module with the example TCS Application Program.

FIG. 17.D contains the example compoint module describing memory management functions representing the communication point with the example TCS Application Example.

FIG. 18.A contains an example thread condition variable header file used by the example thread condition variable module with the example TCS Application Program.

FIG. 18.B contains an example thread condition variable module for use with the example TCS Application Program.

FIG. 19.A contains an example generic communication point header file for use with the example TCS Application Program.

FIG. 19.B contains an example generic communication module for use with the example TCS Application Program.

FIG. 20.A contains an example thread link list header file for use with the example TCS Application Program.

FIG. 20.B contains an example thread link list module for use with the example TCS Application Program.

FIG. 21.A contains an example of a mutex thread log header file for use with the example TCS Application Program.

FIG. 21.B contains an example of a mutex module for use with the example TCS Application Program.

FIG. 22.A contains an example of a thread mutex module header file for use with the thread mutex module with the example TCS Application Program.

FIG. 22.B contains an example of a thread mutex module for use with the example TCS Application Program.

FIG. 23.A contains an example of a communication primitive header file for use with the communication primitive module listed in FIG. 23.B.

FIG. 23.B contains an example of a communication primitive module providing a Create, Destroy, Load, and Unload function for use with the example TCS Application Program.

FIG. 23.C contains an example of a communication primitive's data header file for use with the communication primitive's data module described in FIG. 23.D for use with the example TCS Application Program.

FIG. 23.D contains an example of a communication primitive's data module for use with said example TCS Application Program.

FIG. 24.A contains an example of a thread queue condition header file for use with the thread queue condition module described in FIG. 24.B for use with said example TCS Application Program.

FIG. 24.B contains an example of a thread queue condition module for use with said example TCS Application Program.

FIG. 25.A contains an example of a registry header file for use with the registry module described in FIG. 25.B for use with the said example TCS Application Program.

FIG. 25.B contains an example of a registry module for use with the said example TCS Application Program.

FIG. 26.A provides an example of a minor service communication module providing a weather service as an available Minor Service for the Application Process to register, create, and subsequently connect to, and a broker service as an available Minor Service for the Application Process to register, create, and subsequently connect to. These are to be used with the said example TCS Application Program.

FIG. 27.A provides an example of a thread reader-writer lock header file for use with the thread reader-writer module described in FIG. 27.B for use with the said example TCS Application Program.

FIG. 27.B provide an example of a thread reader-writer module for use with the said example TCS Application Program;

Thread Communication Switching Services

The Thread Service Directory Communication Link provides the ability for a Thread Communication Link between Application Threads and Service Threads. A Service Thread may establish additional Thread Communication Links with other Service Threads, or Application Threads. In this context, each thread is said to be a Thread Communication Point (TCP). Note: As used in this section, the term TCP does NOT refer to "Transmission Control Protocol." In its simplest example, this is shown in FIG. 1 in which the Thread Communication Point labeled TCP-1 is connected to the Thread Communication Point labeled TCP-2 through a Thread Communication Link (TCL). See FIG. 1.

Figure 2:
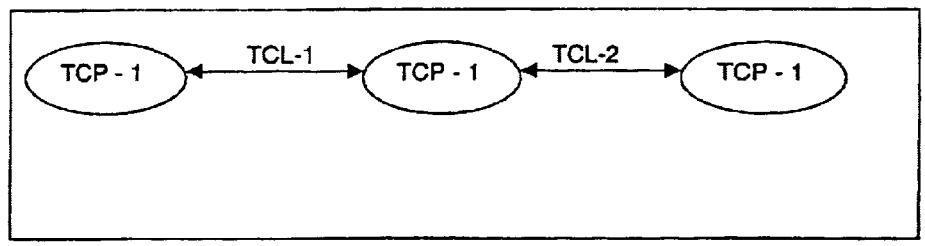
FIG. 2. Diagram showing Two Thread Communication Links.

With additional Thread Communication Points becoming linked through Thread Communication Links it is possible for a particular thread to request a Thread Communication Link to another thread already linked at some further point. As an example, consider FIG. 2 which shows a Thread Communication Point labeled TCP-1 connected to a Thread Communication Point labeled TCP-2 through a Thread Communication Link labeled TCL-1. Additionally, TCP-2 is connected to a Thread Communication Point labeled TCP-3 through a Thread Communication Link labeled TCL-2. In this example, if TCP-1 requested a link to TCP-3, an additional Thread Communication Link must be established. (See FIG. 2.)

Figure 3:
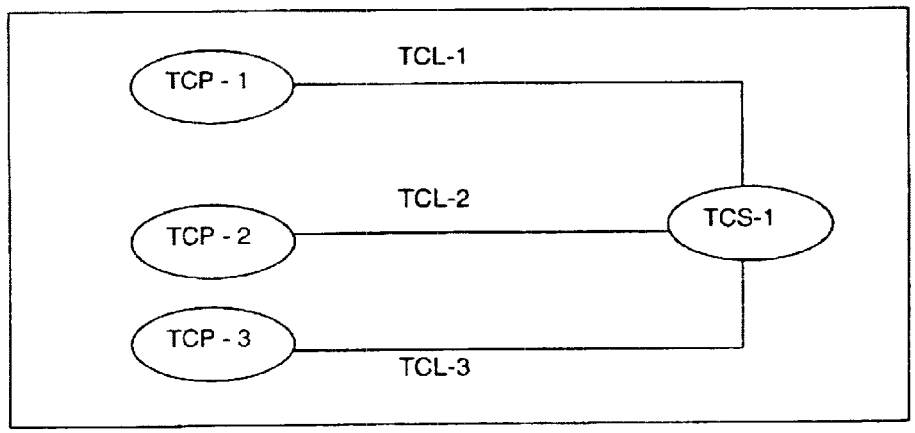
FIG. 3. Diagram showing Thread Communication Switch and Three Thread Communication Links.

Through the use of this invention, it is possible to have multiple Thread Communication Points sharing a Thread Communication Link by establishing a Thread Communication Switch to route the communications between the appropriate Thread Communication Points. As an example of using a Thread Communication Switch, see FIG. 3, which shows three Thread Communication Points labeled TCP-1 though TCP-3 connected to a Thread Communication Switch labeled TCS-1 through Thread Communication Links labeled TCL-1 through TCL-3. (See FIG. 3.)

Figure 4:
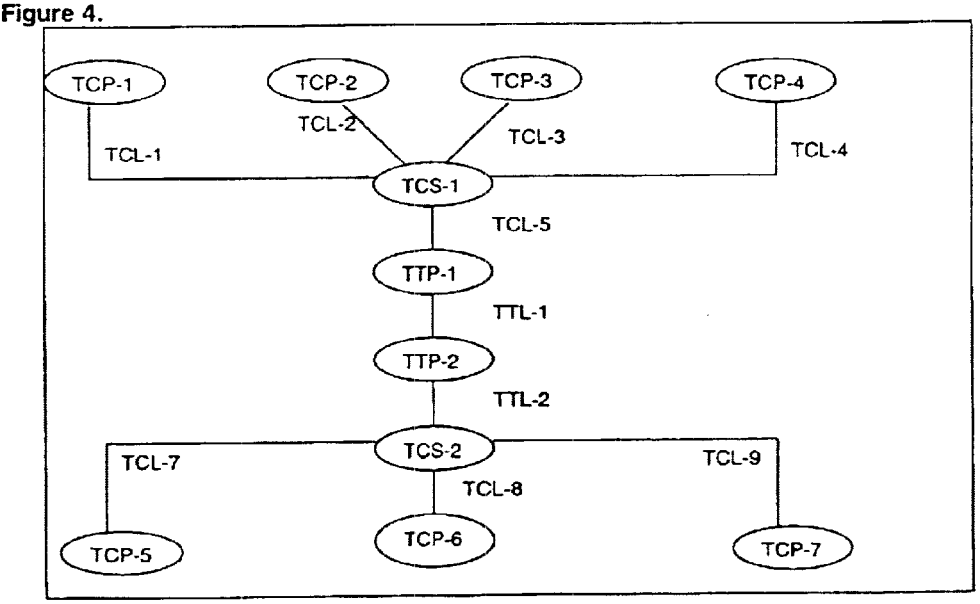
FIG. 4. Diagram showing Thread Trunk Line.

A Thread Communication Switch can be connected to a Thread Trunk Point (TTP) which provides for communications to another Thread Trunk Point which may in turn have a Thread Communications Link to a Thread Communication Switch or to a Thread Communication Point. This provides a communications link over longer distances than the simple point-to-point as described in FIG. 1. As an example of using a Thread Trunk Point, see FIG. 4 which shows four Thread Communication Points labeled TCP-1 through TCP-4 connected to a Thread Communication Switch labeled TCS-1. The TCS-1 has a Thread Communication Link to the Thread Trunk Point labeled TTP-1. This Thread Trunk Point in turn has a Thread Trunk Link labeled TTL-1 to a destination Thread Trunk Point labeled TTP-2. The TTP-2 has a Thread Communication Link to a second Thread Communication Switch labeled TCS-2. The TCS-2 has Thread Communication Links to Thread Communication Points labeled TCP-5 through TCP-7. (See FIG. 4.)

The use of the Thread Communication Points, the Thread Communication Link, the Thread Communication Switch, the Thread Trunk Link, and Thread Trunk Points can span multiple computer systems interconnected through some form of communications such as, but not limited to a network, a direct connection, a fiber connection, a telephone modem, and a wireless connection.

As will be appreciated by those skilled in the art, the specific representation of the Thread Communication Link is dependent on the underlying operating system's communications capability and its synchronization primitives.

Binding Service

1. Overview

The Binding Service is a method, implemented in computer software, to dynamically administer the association of one or more arbitrary named representations with entities understood by the Application Process. Each arbitrary named representation is a sequence of one or more bytes applied at the Application Process level.

1.1. Definitions

An arbitrary named representation is initially considered as Unbound. When an association between the arbitrary named representation is made with an entity understood by the Binding Service, then the arbitrary named representation is considered Bound. The process of determining the association is called the Binding Process. The Binding Process applies an ordered series of Binding Methods to determine if an association between an arbitrary named representation and the entities understood by the Binding Service can be made.

To determine the significance of an arbitrary named representation within the scope of the Application Process, the Application Process can request the Binding Service to apply the Binding Methods to the arbitrary named representation to determine what entity the name represents.

1.2. Binding Methods

The Binding Service provides a series of Default Binding Methods including the ordering of Binding Methods as should be applied by the Binding Service. These Binding Methods and their ordering are specified in a Binding Configuration File which is read by the Binding Service during its initialization. Additional Binding Methods can be added to the Binding Configuration File by the end user. Other Binding Methods can be registered with the Binding Service during the Application Process's run time execution. The registration of a Binding Method must include the information shown in Table 6.

TABLE 6

Binding Method Registration Information.

Order of Evaluation
Location of Binding Method
Name of Binding Method 1.3. The Default Binding Methods The Default Binding Methods and their definitions include those shown in Table 7.

TABLE 7

Default Binding Methods.

File Binding Method
    a method to bind the arbitrary named
    representation to a file accessible by the
    computer system
Shell Binding Method
    a method to bind the arbitrary named
    representation to a user level shell
Data Binding Method
    a method to bind the arbitrary named
    representation to a datum available to the
    Application Process
Function Binding Method
    a method to bind the arbitrary named
    representation to a function (procedure)
    accessible to the Application Process
Thread Binding Method
    a method to bind the arbitrary named
    representation to a thread of the Application
    Process
Process Binding Method
    a method to bind the arbitrary named
    representation to an existing Application
    Process 1.4. The Binding Method Operations Each Binding Method must have associated with it the series of binding method operations shown in Table 8. The Binding Method is described to the Binding Service through five function pointers describing the location of each operation. The function pointers are specified in the order shown in Table 8.

TABLE 8

Binding Method Operations.

Pattern Matching Method
Name Transformation Method
Locate Method
Status Method
Query Method 1.4.1. Description of Binding Method Operations Pattern Matching: if the arbitrary named representation matches the specified regular expression pattern, then apply the Locate Operation to determine if the named representation can be found. If the Pattern Matching Method is specified as NULL, then proceed as if the name was matched. If the arbitrary named representation does not match the specified regular expression pattern, then go to the next Binding Method.

Transformation: if the arbitrary named representation successfully completes the Pattern Matching operation, then apply the Transformation operation to the arbitrary named representation and use this transformed name for subsequent operations. If the Transformation operation is not specified for this Binding Method, then use the specified arbitrary named representation for subsequent operations.

Locate Operation: use the registered Locate operation to see if the arbitrary named representation can be found. If the Locate Method returns success, then the arbitrary named representation is considered BOUND using this Binding Method. If the Locate operation fails, then the arbitrary named representation remains unbound.

Status Operation: given a BOUND arbitrary named representation, use this operation to retrieve the status information describing this entity. This includes the following information:

arbitrary name: the specified arbitrary named representation expanded name: the expanded description to be associated with this arbitrary named representation owner information: description of the owner of this bound entity status timers: includes the creation time, the last modification time, the last access time size: the size of the entity in bytes value: the last recorded value associated with the entity entity-specific data: entity-specific data values including the size of this data Query Operation: given a BOUND arbitrary named representation, report the status information as described by in the Status Operation.

1.5. Binding Service Interface

The Binding Service itself provides the following interfaces for the Application Process:

Register: register a new Binding Method

Set Order: set the ordering of the Binding Methods

Unregistered: remove a Binding Method

Bind: apply the Binding Methods on a specified arbitrary named representation

Unbind: unbind the arbitrary named representation

Establish: request the Binding Service to read a specified Binding Service Configuration File Report: report the requested information to the Application Process. This may include the list of Binding Methods, the order of evaluation of Binding Methods, and/or the characteristics of the Binding Methods Query: report the requested information on the arbitrary named representation to the Application Process Purge: delete all references to arbitrary named references that are currently UNBOUND.

2. The Architecture 2.1. Binding Service Initialization

The Binding Service, upon initialization will read a Binding Service Configuration File containing zero or more entries of the form:

1. Order of Evaluation: is a numeric value describing the order in which this entry should be used in binding an arbitrary named representation
2. Location of Binding Method: is the name of a dynamically loadable module (which could include a shared library name) containing the Binding Method
3. Name of Binding Method: is the name of a shared object within the dynamically loadable module that contains the references to the operations provided by the binding service.

2.2. The Binding Service Interface 2.2.1. The Register Interface

The Application Process uses the Binding Service's Register interface to register additional Binding Methods not specified in a Configuration File. The specification for the new Binding Method requires the same data as that provided through the Configuration Files. The Register interface provides a mechanism to specify additional Binding Methods even after the Binding Service has started execution.

2.2.2. The Set Order Interface

The Application Process uses the Binding Service's Set Order interface to establish a new order of evaluation to use when applying the registered Binding Methods to an arbitrary named representation.

2.2.3. The Unregistered Interface

The Application Process uses the Binding Service's Unregistered interface to remove a Binding Method from the list of available Binding Methods. The Binding Method can be removed only after all references to the Binding Method have completed their use of the method.

2.2.4. The Bind Interface

The Application Process applies the Binding Service's Bind interface to an arbitrary named representation. The Binding Service maintains a table in memory of the arbitrary named representations requested to be bound by the Application Process. This table contains the collection of arbitrary named representations previously specified to the Bind interface on behalf of the Application Process.

The first step in applying the Bind interface is to search the table to see if the specified arbitrary named representation has already been BOUND. If not, then the Binding Service will create a new entry in the table for the specified arbitrary named representation. This entry includes the arbitrary named representation and initially is marked as unbound. If the specified arbitrary named representation is already listed in the table and is marked as BOUND, then the Bind interface completes successfully without further action being required. If the specified arbitrary named representation is already listed in the table, but is marked as UNBOUND, then the Bind interface continues.

The Binding Service will then apply the Binding Methods based on the specified order of evaluation for the Binding Methods. The arbitrary named representation is then BOUND using the first Binding Method to complete successful.

In applying the Binding Methods, the Binding Service will determine if the Binding Method has been loaded into memory. If not, then the Binding Service uses the Location Operation for the Binding Method and the Name of Binding Method to dynamically load the Binding Method into memory. The Binding Method is then applied given the constraints mentioned above.

During the evaluation of the Binding Methods, the Binding Service will first examine the Binding Method to see if it has an associated Pattern Matching operation. If so, then the arbitrary named representation is compared against the specified expression pattern using the specified Pattern Matching operation. If the arbitrary name does not compare with the specified regular expression pattern then the next Binding Method is applied. If the Pattern Matching operation is specified as NULL, or if the expression pattern is specified as NULL, or if the arbitrary named representation compares with the specified pattern, then the arbitrary named representation is considered for binding to this Binding Method.

Upon successfully completing the Pattern Matching operation, the Binding Service applies the Name Transformation operation, if specified for the Binding Method. The Name Transformation operation is used to generate an alternative named representation which will then be used for the Locate and the Status operations described below.

When the arbitrary named representation is considered for binding to a Binding Method, then the Binding Service will invoke the Binding Method's Locate operation to locate the entity associated with the alternative named representation, or the arbitrary named representation if the alternative is not defined. If the Locate operation fails and a pattern was specified, then the arbitrary named representation is considered BOUND, but not found. Otherwise, the arbitrary named representation remains UNBOUND.

Finally, when the arbitrary named representation has been BOUND, and has been located, then the Binding Service applies the Binding Method's Status Operation to ascertain the current status of the bound entity. This information is then retained in the Binding Service's table.

The Binding Service maintains the representation of the BOUND entity within its scope. This information is not directly available to the Application Process. Instead, the Application Process must use the Binding Service's Query operation to access this information.

2.2.5. The Unbind Interface

The Application Process uses the Binding Service's Unbind Interface to mark a previously bound arbitrary named representation as now being unbound.

2.2.6. The Report Interface

The Application Process uses the Binding Service's Report interface to report useful information on the current representation of the contents of the Binding Service's data. This includes information relating to the Binding Methods.

2.2.7. The Query Interface

The Query interface reports the information available through the Query operation of the Binding Method used to bind the arbitrary named representation. If the arbitrary named representation is currently UNBOUND, then the Query interface returns only the name of the entity.

2.2.8. The Purge Interface

When the application calls the Binding Service's Purge interface, the Binding Service deletes all arbitrary named references in its table that are UNBOUND at the time of the call.

Dynamic Configuration Management

The Application Process constructs a Dynamically Configured Application Program in the DCM by specifying a series of RULES identifying the components of the Dynamically Configured Application Program, the interactions between these components, the policy for evaluating these components, the order of evaluation of these components, and a method for satisfying the RULE. Additionally, the Application Process can specify zero or more data files referred to as Application Program Rules Files containing RULES for the Dynamically Configured Application Program. In this sense, the Application Process provides the blueprint for constructing the Dynamically Configured Application Program either through an Application Programming Interface and through zero or mode Application Program Rules Files. Once constructed, the Application Process can then request the DCM to execute the Dynamically Configured Application Program.

Rule Specifications

The specification of a RULE includes the information shown in Table 9, although additional information may be provided by the actual implementation:

TABLE 9

Rule Specification Components.

A unique alphanumeric name to identify the RULE
A DCM operator denoting the policy for evaluating the RULE
Zero or more Prerequisite Universal RULES
Zero or more Attributes describing characteristics of the RULE
A method (possibly given as NULL) for satisfying the RULE Rule Classifications There are two classifications of RULES supported by the DCM given as Reserved Rules and Universal Rules. The Reserved Rules have special meaning to the DCM and cannot be redefined. The Universal Rules are specified by the Application Process. In either case, however, the Rules contain the minimum information described in Table 9.

A series of one or more Reserved Rules, referred to as the Flow Rules, provide the framework for executing the Dynamically Configured Application Program. Whenever a Dynamically Configured Application Program is to be executed, the DCM begins by evaluating the Flow Rules. All other actions are derived as a result thereof. The Flow Rules are shown in Table 10.

TABLE 10

The Flow Rules.

DCMINIT RULE
APINIT RULE
MAIN RULE
DONE RULE
APDONE RULE
DCMDONE RULE

The MAIN RULE must be specified for the Dynamically Configured Application Program to execute. The other Flow Rules (DCMINIT, APINIT, DONE, APDONE, and DCMDONE are optional).

Executing The DynamicalIV Configured Application Program

The DCM groups all Rules with the same name together as if they were specified as a single entity. This permits, for example, the Application Process to specify potions of a Rule during initialization sequences and the remainder of the Rule when initialization has completed.

The DCM will evaluate each of the specified Flow Rules in the order shown in Table 10. In evaluating a RULE, the DCM views the RULE name as the current rule. The evaluation process is such that the DCM will first evaluate all Prerequisite Rules of the current rule. Thus, a Prerequisite Rule becomes the current rule and the evaluation continues with its Prerequisite Rules. This is implemented using well known directed graph techniques.

When the current rule has no Prerequisite Rules listed, and the DCM determines the current rule's method must be executed, then the DCM will execute the method for this rule. After executing the method for the current rule, the DCM attaches a time stamp value denoting when the current rule was evaluated.

When the current rule has one or more Prerequisite Rules, then the DCM compares the time stamp value of the current rule with that of its Prerequisite Rules. If the time stamp value of the current rule is older than the time stamp value of its Prerequisite Rules, then the current rule's method is executed to satisfy the rule and the time stamp value of the current rule is updated to denote when the current rule's method was executed Otherwise, the current rule's time stamp value remains unchanged and the method is not executed.

After evaluating the last Flow Rule of the Dynamically Configured Application Program, the DCM considers the application as having completed and returns control back to the requesting Application Process.

Evaluation Policies

The policy for evaluating a RULE is determined by the DCM operator component of the RULE. By default, a TIME.sub.—VALUE operator (:) will be applied which provides the behavior as described above. Additional DCM operators can be derived and implemented into the DCM to describe the relationship between the RULE and its Prerequisite Rules.

Figures 5, 6:
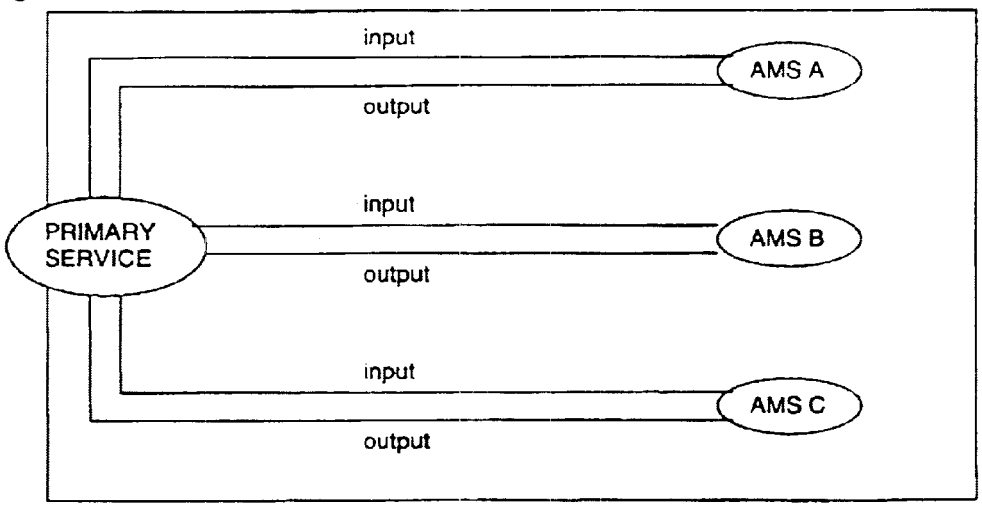
FIG. 5. Diagram showing Example Dynamically Configured Application Program Rules.
FIG. 6. Diagram showing Example Application Process.

The Application Program Rules, shown in FIG. 5, provides an example of a Dynamically Configured Application Program. (See FIG. 5.)

The DCMINIT and the APINIT Rules are shown without Prerequisite Rules. When the MAIN Rule is evaluated, the DCM finds that it is dependent on Rule-A and thus must evaluate Rule-A. In doing so, it finds Rule-A is dependent on Rule-B and must therefore evaluate Rule-B. The evaluation of Rule-B shows that Rule-B does not have any prerequisite Rules. After Rule-B has been evaluated, the DCM resumes the evaluation of Rule-A. Upon completion of Rule-A, the DCM resumes the evaluation of the MAIN Rule. When the MAIN Rule has been completed, the DCM next evaluates the DONE Rule and finds that it has Rule-C as a prerequisite rule. It therefore evaluates Rule-C and then continues with the DONE Rule. Finally, the APDONE and DCMDONE Rules are evaluated.

Binding Methods

Initially when a RULE is specified, the DCM makes no assumptions as to what the RULE name represents. During the evaluation of the RULE, the DCM uses the Binding Service to associate the RULE name with an entity understood by the DCM. The list of entities understood by the DCM and their corresponding interpretation by the DCM are provided during the initialization of the DCM. The list of entities appear in the Binding Service's Configuration File. In this sense, the list of entities can be modified and updated over time based on market demand for new entities and their interpretations. Initially, the DCM provides the Binding Methods for:

SHARED LIBRARY BINDING METHOD: The rule represents a shared library available to the Application Process.

SHARED OBJECT BINDING METHOD: The RULE name represents a shared object from a shared library. If the RULE has a prerequisite RULE BOUND to a SHARED LIBRARY, then the shared object is presumed to exist in that library. If the method for the rule is to be executed, then the DCM opens the shared library, extracts the shared object, and executes the shared object. To specify a SHARED OBJECT BINDING METHOD, the rule must have the Reserved Rule SHARED.OBJECT as a prerequisite rule.

THREAD BINDING METHOD: The RULE name represents a procedure to invoke as a separate thread of execution within the Application Process. To specify a THREAD BINDING METHOD, the rule must have the Reserved Rule THREAD as a prerequisite rule.

SHELL BINDING METHOD: The RULE name does not represent a physical entity, but rather, its method is specified as statements to be executed by the underlying SHELL provided by the operating system. To specify a SHELL BINDING METHOD, the rule must have the Reserved Rule SHELL as a prerequisite rule.

FUNCTION BINDING METHOD: The FUNCTION BINDING METHOD associates the rule name with a function (procedure) available in the application program. The DCM will search the symbol name list for the Application Process to locate the address of the function. If the DCM must trigger the method for the rule, then the function is invoked.

FILE BINDING METHOD: The rule name represents the name of a file accessible by the computer system.

DEFAULT BINDING METHOD: If no binding method has not been specified for the rule, then the DCM will bind the rule name using the DEFAULT BINDING METHOD. The DEFAULT BINDING METHOD is to associate the rule name with a function (procedure) available in the application program. The DCM will search the symbol name list for the Application Process to locate the address of the function. If the DCM must trigger the method for the rule, then the function is invoked. If the DCM cannot locate the function in the Application Process's symbol table, then the RULE is considered to have failed.

Example: The following RULES are registered in the DCM:

spellCheck: libspell.so SHARED.OBJECT report: spellCheck

In executing the report rule, the DCM will first evaluate the prerequisite "spellCheck" rule. In evaluating the spellCheck rule, the DCM will first evaluate the libspell.so rule. In evaluating the libspell.so rule, the DCM will not find any prerequisites of the rule and will therefore attempt to bind the libspell.so rule name. The binding method will match using the SHARED LIBRARY BINDING METHOD and the name libspell.so will be BOUND to a shared library. In evaluating the SHARED.OBJECT rule, the DCM will recognize that the spellCheck rule name is to be interpreted as a function available in the shared library libspell.so. If the method for the rule is to be executed, then the spellCheck shared object is extracted from the shared library and is invoked as a function of the Dynamically Configured Application Program.

Application Process Scope

The DCM can exist as a co-process of the Application Process, or as a sibling process of the Application Process. In the former sense, the DCM can be accessed by multiple Application Programs thus providing a sharing of information. In the later case, the DCM resides within the Application Process. There are no constraints inherent in the model to preclude the use of the DCM across multiple computer systems.

Example of Use of Invention

A Word Processing Application Program is designed. Using a standard software construction utility, converting the source code to the Application Program which in turn is sold to end-users. After the initial market acceptance of the Word Processing Application Program, additional features are developed including a Thesaurus, a Spell Checking Feature and a Grammar Checking Feature. Each of these features is designed, developed, implemented and sold as separate Minor Services for the Word Processing Application Service.

When a user purchases the Word Processing Application Program, the installation process creates a Application Program Rules file for the Word Processing Application Service. The Rules file contains:

APINIT: SetEnvironment
MAIN: WordProcessor
DONE: CleanEnvironment
SetEnvironment: setEnv
setEnv: THREAD
WordProcessor: wp
wp: THREAD
CleanEnvironment: clearEnv
clearEnv: THREAD The Application Program Rules file is then given to the DCM to establish the rules for the Dynamically Configured Application Program. When executed, the APINIT rule is evaluated, which causes the SetEnvironment rule to be evaluated which in turn causes the setEnv rule to be evaluated. The setEnv rule has a THREAD prerequisite causing the DCM to begin the procedure named setEnv as a thread of execution within the Application Process. Similarly, the wp and clearEnv rules, when evaluated, will cause the DCM to create a thread of execution within the Application Process for their named procedures.

The user subsequently purchases the Spell Checker feature and the Thesaurus, but not the Grammar Checking Feature. The installation of the Spell Checking Feature and the Thesaurus Feature cause the Application Program Rules file for the Word Processing Application Service to be modified as follows:

APINIT: SetEnvironment
MAIN: WordProcessor
DONE: CleanEnvironment
SetEnvironment: setEnv setSpellEnv setThesEnv
setEnv: THREAD
setSpellEnv: SHARED.OBJECT spell.so
setThesEnv: SHARED.OBJECT thes.so
WordProcessor: wp
wp: THREAD
CleanEnvironment: clearEnv
clearEnv: THREAD When the Dynamically Configured Application Program is executed, the following actions are taken by the DCM:

The APINIT rule is evaluated. In evaluating the rule, the setenv, setSpellEnv procedure from the spell.so shared library, and the setThesEnv procedure from the thes.so shared library will both be executed during the evaluation of the APINIT rule. It is presumed that these procedures will modify the Application Process's data structures to identify their existence to the wp thread.

In this manner, individual components of an Application Service are designed, implemented, and subsequently sold as individual units to the end user.

Configurable Application Process Service

The Configurable Application Process Service is a computer software method for dynamically administering the component Minor Services of an Application Process. The Configurable Application Process Service consists of a Configuration Administrator Minor Service thread using the Communication Manager Program Service, hereinafter referred to as the CMPS, described in this patent application. Various other Minor Service threads may be created by the Configuration Administrator as described herein.

The Application Process uses the Configuration Administrator Minor Service, hereinafter referred to as the CAMS, to administer zero or more components of software. Each component is said to offer a well defined application Minor Service hereinafter singularly and collectively referred to as the AMS.

The specifications for the administration of the AMS can be provided directly by an Application Process, or, indirectly through a data store monitored by the CAMS. These specifications can instruct the CAMS to perform the desired operation immediately, at a predefined time (which may be an interval), or, as a result of some event which is later communicated to the CAMS.

Other technology which may be configured with the Configurable Application Process Service includes the Binding Service, as described in this patent application, hereinafter referred to as the BSV.

There are fifteen general operations available through the Configurable Application Process Service given as:

1. LOCATE: locate and report the location of a specified AMS
2. LOAD: configure the specified AMS into the Configurable Application Process Service
3. EXECUTE: execute the specified AMS
4. REPLACE: replace the specified AMS with a new AMS
5. UNLOAD: unload the specified AMS from main memory
6. DUMP.sub.—MAP: dump a map of the current values of a specified AMS
7. LOAD.sub.—MAP: load a map of the current values for a specified AMS
8. NOTIFICATION: notify the CAMS that the specified event has occurred
9. INSERT: insert the specified AMS in between two existing AMS
10. EXTRACT: removes specified AMS previously inserted with INSERT operation
11. SUSPEND: suspend the communications to a specified AMS 12. RESUME: resume the communications to a specified AMS
13. COMPRIMS: set the default communication primitives for an AMS
14. TERMINATE: terminate the execution of the specified AMS.
15. QUERY: report useful information on the current AMS being administered through the configurable Application Process Service.

Each of these operations is described below.

The LOCATE Operation

The LOCATE operation instructs the Configurable Application Process Service to locate a specified AMS. The default action performed by the CAMS is to search through the current Application Process for the specified AMS, and if not found, to search through zero or more specified shared libraries. Once located, the CAMS returns the location of the specified AMS.

When used in conjunction with the CMPS, the CAMS will also attempt to locate the specified AMS as a registered communication point.

When used in conjunction with the Binding Service, the CAMS will also attempt to locate the specified AMS according to the specified rules for binding as defined in the BSV.

The LOAD Operation

The LOAD operation instructs the Configurable Application Process Service to dynamically configure a specified AMS. The default action of the CAMS is to dynamically load the specified AMS if the AMS had not previously been loaded. Alternatively, the Application Process can request that the Configurable Application Process Service to force the LOAD to be completed, even if there is a previously loaded version of the specified AMS.

When used in conjunction with the CMPS, the CAMS will register the specified AMS as a communication point if it has not already been registered. Note that when used with the CMPS, the AMS may not be loaded into memory, but simply marked as a communication point within the CMPS. In this sense, the AMS is considered to have been configured by the LOAD operation.

Note that the LOCATE operation can be combined with the LOAD operation to provide a single operation performing the desired functionality.

Once loaded, the specified AMS is added to the LOADED AMS List maintained by the Configurable Application Process Service.

During the LOAD operation, the Application Process can specify certain attributes describing characteristics of the specified AMS. These attributes may include, but are not limited to the following:

1. Communication Manager Program Service registration process attributes
2. Attribute describing if specified AMS can be suspended through SUSPEND operation
3. Attribute describing if specified AMS can be replaced by another AMS through the REPLACE operation
4. Attribute describing if Minor Service can have its current state dumped through the DUMP.sub.—MAP operation.
5. Attribute describing if Minor Service can have its current state changed by the LOAD.sub.—MAP operation
6. Attribute describing if the Minor Service can be Terminated through TERMINATE operation
7. Attribute describing if the Minor Service can be removed from between two Minor Services through the EXTRACT operation.
8. Attributes describing the MAP AREA generated by this AMS through the DUMP.sub.—MAP operation.
9. Attributes describing a de-allocation process for communications pending to the specified AMS at the point that the AMS is terminated through a TERMINATE operation.

Note that the actions associated with the LOAD operation can be deferred until the receipt of a specified event by the Configurable Application Process Service. If the action is to be deferred, the request is added to the EVENT AMS List maintained by the CAMS, and no further action is taken by this operation.

The EXECUTE Operation

The EXECUTE operation instructs the Configurable Application Process Service to begin the execution of a specified AMS. The specified AMS must have previously been configured with the LOAD operation.

This operation adds the specified AMS to an ACTIVE AMS List maintained by the CAMS.

The CAMS uses the CMPS to establish the necessary connectivity to the specified Minor Service. The communication primitives used by the CMPS are determined in part by the COMPRIMS operation described below.

Note that the actions associated with the EXECUTE operation can be deferred until the receipt of a specified event by the Configurable Application Process Service. If the action is to be deferred, the request is added to the EVENT AMS List maintained by the CAMS, and no further action is taken by this operation.

Note that the Application Process can specify the desired scope of the AMS to be executed. The scope must be specified as:

PRIVATE: a private version of the AMS must be executed.

PUBLIC: establish connectivity to an existing executing AMS, or start a new version of the AMS.

In either event, the Configurable Application Process Service maintains a reference for the number of executions of the AMS currently in use.

The REPLACE Operation

The REPLACE operation specifies that the Configurable Application Process Service is to replace a specified ACTIVE AMS with a different specified AMS. The existing AMS must have been started using the EXECUTE operation (thus must appear on the ACTIVE AMS List). The REPLACE operation searches the ACTIVE AMS List for the specified AMS to replace. If not found, then the operation is aborted. The new AMS replacing the existing AMS must have previously been configured with the LOAD operation and must therefore appear in the LOADED AMS List.

The CAMS will replace the existing AMS with the new AMS and reroute the communications previously destined for the existing AMS to the new AMS.

The Application Process must specify the disposition of the existing AMS which describes to the Configurable Application Process Service what is to happen to the existing AMS upon replacement by the new AMS. The disposition can be one of:

TERMINATE: the existing AMS is to be terminated according to the TERMINATE operation described below upon successful replacement by the new AMS.

SUSPEND: the existing AMS is to be suspended according to the SUSPEND operation described below.

STACK: the existing AMS is to be suspended, and a link is to be maintained from the new AMS to the existing AMS such that upon termination of the new AMS, the existing AMS will be resumed and all communications to be re-established.

DAEMON: the existing AMS is to be left untouched, although no new communications will be permitted to that AMS.

Details on the REPLACE operation are provided in the section titled "Replace Operation Detailed Architecture."

Note that the actions associated with the REPLACE operation can be deferred until the receipt of a specified event by the Configurable Application Process Service. If the action is to be deferred, the request is added to the EVENT AMS List maintained by the CAMS, and no further action is taken by this operation.

The SUSPEND Operation

The SUSPEND Operation specifies that the Configurable Application Process Service is to temporarily suspend the execution of the specified AMS which was previously invoked through the EXECUTE operation and can be found on the ACTIVE AMS List. Note that the actual suspension may be implemented differently on various computer systems depending on the lower level operating system instructions available for the implementation. Regardless, however, the SUSPEND Operation is guaranteed to suspend the execution of the specified AMS. Once suspended the specified AMS is moved from the ACTIVE AMS List to the SUSPENDED AMS List.

Note that the actions associated with the SUSPEND operation can be deferred until the receipt of a specified event by the Configurable Application Process Service. If the action is to be deferred, the request is added to the EVENT AMS List maintained by the CAMS, and no further action is taken by this operation.

The RESUME Operation

The RESUME Operation specifies that the Configurable Application Process Service is to resume the execution of an AMS previously suspended with the SUSPEND operation. Once resumed, the AMS is moved from the SUSPENDED AMS List to the ACTIVE AMS List.

Note that the actions associated with the RESUME operation can be deferred until the receipt of a specified event by the Configurable Application Process Service. If the action is to be deferred, the request is added to the EVENT AMS List maintained by the CAMS, and no further action is taken by this operation.

The DUMP MAP Operation

The DUMP.sub.—MAP operation specifies that the Configurable Application Process Service is to send a DUMP.sub.—MAP request to the specified AMS. The specified AMS must currently be on the ACTIVE AMS List.

The CAMS will allocate a storage area, referred to as the MAP AREA for the specified AMS and associate an identifier with this MAP AREA. The CAMS will mark the MAP AREA with administrative information including, but not limited to the specific machine architecture on which the specified AMS is currently executing, timing information, security information to prevent unauthorized access to the MAP AREA, ownership information indicating the specified AMS as the owner of this MAP AREA and other information.

It is expected that upon receipt of the DUMP.sub.—MAP request, the AMS will write to the MAP AREA that information described by its MAP AREA attributes. This data is written in a machine independent format.

The Application Process can specify to the CAMS the persistence criteria for this MAP AREA. This information is used to determine when the CAMS is de-allocate the MAP AREA. The options are to keep the MAP AREA until the specified AMS terminates with the TERMINATE Operation, or, to keep the MAP AREA until a LOAD.sub.—MAP Operation specifying this MAP AREA is issued by the Application Process The DUMP.sub.—MAP Operation, upon completion, informs the Application Process of the identifier associated with MAP AREA.

The LOAD MAP Operation

The LOAD.sub.—MAP operation specifies that the Configurable Application Process Service is to send a LOAD.sub.—MAP request to the specified AMS. The operation requires the specification of a particular MAP AREA to be loaded. The specification of the MAP AREA may be through the identifier assigned during a DUMP MAP operation, or specified values supplied by the Application Process.

Once the LOAD.sub.—MAP operation has completed, the CAMS determines if the specified MAP AREA is to be de-allocated based on the persistence value set by the DUMP.sub.—MAP operation, and if necessary, will de-allocate this MAP AREA.

The TERMINATE Operation

The TERMINATE operation specifies to the Configurable Application Process Service that the execution of the specified AMS is to be terminated. In performing the termination, the Configurable Application Process Service will decrement the reference count associated with that AMS. If the reference count is non-zero, then other instances of the AMS are still in use. If the AMS was executed with a PUBLIC scope and the AMS reference count is non-zero, then no additional action is required by the Configurable Application Process Service. Upon termination, the AMS is removed from the ACTIVE AMS List.

All pending communications to the specified AMS are de-allocated according to the De-allocation Attribute specified during the LOAD Operation for the specified AMS. Note that in certain cases, this may result in the pending communications remaining untouched, and not being de-allocated.

When used in conjunction with the CMPS, the communications to the specified AMS will be terminated through a disconnect operation supplied by the CMPS.

Note that the actions associated with the TERMINATE operation can be deferred until the receipt of a specified event by the Configurable Application Process Service. If the action is to be deferred, the request is added to the EVENT AMS List maintained by the CAMS, and no further action is taken by this operation.

The NOTIFICATION Operation

The NOTIFICATION operation specifies to the Configurable Application Process Service that a particular internal or external event has occurred. The Configurable Application Process Service searches the EVENT AMS List to determine the any actions it is to perform based on the receipt of this event, and then performs these actions.

The INSERT Operation

The INSERT operation specifies that the Configurable Application Process Service is to insert the specified AMS between two specified AMS's previously started with the EXECUTE operation. Note that the specified AMS being inserted must appear in the ACTIVE AMS List.

Note that the actions associated with the INSERT operation can be deferred until the receipt of a specified event by the Configurable Application Process Service. If the action is to be deferred, the request is added to the EVENT AMS List maintained by the CAMS, and no further action is taken by this operation.

The EXTRACT Operation

The EXTRACT operation is the inverse of the INSERT operation. It specifies that the Configurable Application Process Service is to extract a specified AMS from between two other specified AMS's. Note that the Application Process can specify the disposition of the extracted AMS which must be one of:

TERMINATE: the extracted AMS is to be terminated according to the TERMINATE operation described above.

SUSPENDED: the extracted AMS is to be suspended according to the SUSPEND operation described above.

Note that the actions associated with the EXTRACT operation can be deferred until the receipt of a specified event by the Configurable Application Process Service. If the action is to be deferred, the request is added to the EVENT AMS List maintained by the CAMS, and no further action is taken by this operation.

The COMPRIMS Operation

The COMPRIMS operation specifies the default communication primitives to be used by the Application Process when communicating with an AMS. Note that the Communication Manager can adjust these primitive specifications as necessary to ensure the proper communication link between the Application Process and the AMS. Note further that any existing communication links created prior to the execution of this operation remain untouched. In this manner the Application Process can reset its default communication primitive as needed.

The UNLOAD Operation

The UNLOAD operation specifies that the Configurable Application Process Service is to unload the specified Minor Service from memory. The specified Minor Service cannot currently be on the ACTIVE AMS List, or the operation is aborted. The specified Minor Service is then removed from the LOADED AMS List.

The QUERY Operation

The QUERY operation specifies that the Configurable Application Process Service is to report specified information based on the current lists that it maintains. This information may include, for example, the list of all outstanding requests pending on the receipt of an event. This information is then made available to the Application Process.

The REPLACE Operation Detailed Architecture

An AMS may be executing as a separate thread of execution, either locally on the same machine as the CAMS, or remotely on a machine accessible to that machine on which the CAMS is executing. To replace this AMS with another AMS, the default actions taken by the Configurable Application Process Service is given as:

1. SUSPEND input communications to the specified AMS.

2. Permits existing AMS output to be directed towards Application Process, but monitors the output channel for special Configuration Messages.

3. Begins execution of new AMS potentially as a separate thread of execution.

4. Issues a DUMP.sub.—MAP operation for the specified existing AMS

5. Issues a LOAD.sub.—MAP operation to new AMS using the DUMP AREA created in 4.

6. Redirects all input destined for existing AMS to the new AMS.

7. Multiplexes output from existing AMS and new AMS to the Application Process-or-multiplexes output from existing AMS as input to the AMS.

8. Handles disposition of the existing AMS as specified by the Application Process.

Note that Step 2 is performed using the Thread Communication Switching Service described in this patent application.

Example Discussion

An example of an Application Process using a Primary Service and three Minor Services is shown in FIG. 6. Here, the Primary Service communicates with each of the Minor Services using a communication link provided by the CMPS. (See FIG. 6.)

Figure 7:
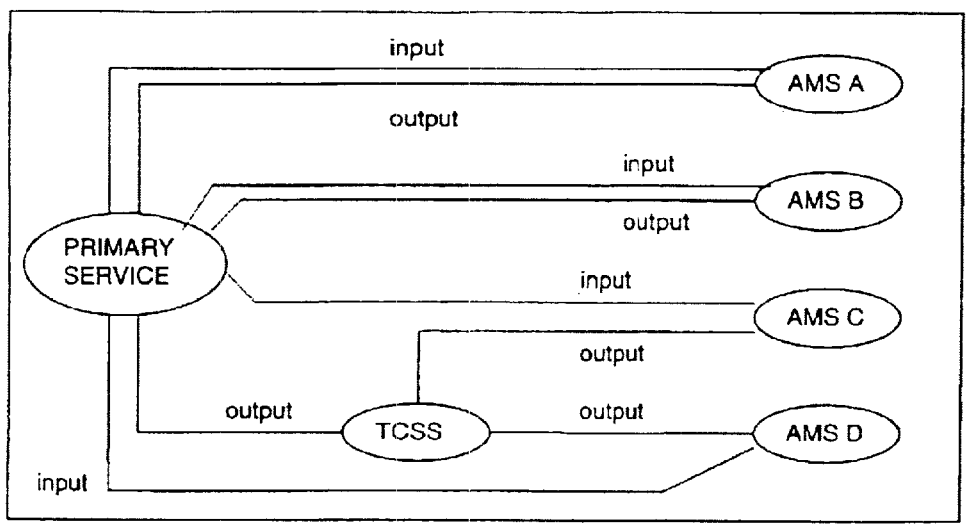
FIG. 7. Diagram showing Reconfiguring an Application Process.

To reconfigure the Application Program to use AMS D in place of AMS C, a REPLACE operation is applied. Upon receipt of this request, the CAMS will temporarily suspend the input channel to AMS C (from the Primary Service). It then loads AMS D. The input channel to AMS D is then established from the Primary Service as a replacement for input channel to AMS C. The CAMS then applies the specified disposition to AMS C. (See FIG. 7.)

Named Execution Environment

Overview

A Named Execution Environment, hereinafter referred to as NEE, is an execution environment created by the Named Execution Environment Manager on behalf of a requesting Application Process. The Application Process requesting the creation of the NEE is referred to as the Owner of the NEE. The Application Process does not know, nor cares where the NEE is physically located, only that the binding of the NEE to the physical execution environment by the Named Execution Environment Manager satisfies the REQUESTED ATTRIBUTE expression as specified by the Owner of the NEE. Through the creation process, the Owner of the NEE specifies a logical name to be associated with the NEE, and provides additional attributes describing the usage of the NEE. All subsequent references to the NEE by the Owner of the NEE, or by other Application Processes specify the logical name of the NEE, the operation to be performed, and other parameters to be used. The underlying physical connectivity and physical information passing is then handled by the Named Execution Environment Manager.

The Named Execution Environment Configuration File

A user or Application Process of a computer system registers with the Named Execution Environment Manager, hereinafter referred to as the NEEM, a set of one or more attributes describing an environment available on the computer system. These attributes, known as the REGISTERED ATTRIBUTES may include, but are not limited to those shown in Table 11.

Multiple REGISTERED ATTRIBUTES SETS can be registered for a single computer system. The REGISTERED ATTRIBUTES, along with the name of the computer system are stored in memory, or on a storage media accessible to the computer system on which the NEEM is executing. A permanent copy of the REGISTERED ATTRIBUTES along with their computer system name can be stored in the Named Execution Environment Configuration File, hereinafter referred to as the NEECF. stored in memory, or on a storage media accessible to the computer system on which the NEEM is executing. A permanent copy of the REGISTERED ATTRIBUTES along with their computer system name can be stored in the Named Execution Environment Configuration File, hereinafter referred to as the NEECF.

TABLE 11

The Registered Environment Attributes.

1. Attributes describing the operating system
2. Attributes describing the underlying hardware
3. Attributes describing installed software
4. Attributes describing access methods
5. Attributes describing physical execution environment
6. Attributes describing security requirements
7. Attributes describing default shell
8. Attributes with special meaning to an application process, or user
9. Attributes describing maximum number of connections to the environment
10. Attributes describing the environment's physical computer system
11. Attributes describing access method to physical computer system
12. Attributes describing functionality to be associated with the environment
13. Attributes describing the communication identifier describing the physical machine as a communication point of the Communication Manager Service as described in this patent application.

Executing the Named Execution Environment Manager

The NEEM executes as a co-process of the Application Process. As such, the Named Execution Manager (the NEEM) is either linked with the Application Program directly (either through static or dynamic linkage), is executed as a separate process on a computer system accessible to the computer system executing the Application Process, or, is invoked through the Dynamic Configuration Management described in this patent application.

In any case, when the NEEM is executed, it reads the NEECF, detailing the REGISTERED ATTRIBUTES describing the computer system. Note that additional REGISTERED ATTRIBUTES can be subsequently added (registered), deleted, or otherwise modified even after the NEEM is executing.

The entries in the NEECF may include specifications identifying remote computer system accessible to the current computer system through some form of communications mechanism. Such an entry includes information detailing if the remote computer system is expected to have a NEEM executing on it, and/or, if there is a NEECF located on that computer system.

The NEEM creates a Minor Service thread, known as the NEEM STATUS THREAD to periodically poll the remote computer systems identified in the NEECF and performs a statistical analysis to determine their state. If a remote computer system fails, or if the communications between the local computer system and the remote computer system fails, then the NEE Status Thread will mark the remote computer system as UNACCESSIBLE by the NEEM. At such time as the NEE Status Thread can re-establish contact with the failed remote computer system, the NEEM will mark the computer system as ACCESSIBLE by the NEEM.

Initially, each entry of the NEECF is read by the NEEM and its corresponding NEE is placed on an INACTIVE NEE List maintained by the NEEM. As new Named Execution Environments are created, the NEEM adds them to the ACTIVE NEE List.

Creating a Named Execution Environment

The Application Process makes a request to create a new NEE, by specifying, in a Boolean Expression, one or more REQUESTED ATTRIBUTES. The Application Process also specifies one or more NEE ATTRIBUTES including, but not limited to:

a logical name to be associated with the newly created environment.

an attribute describing if the NEE is PUBLIC or PRIVATE an attribute describing if the NEE is to only execute foreground commands.

an attribute describing if the NEE is to only execute background commands.

an attribute describing if other processes can execute in the foreground.

an attribute describing if other processes can execute in the background an attribute describing where the output is to be sent an attribute describing CPU threshold values an attribute describing if NEE is to be suspended when not in use an attribute describing the shell Application Process to execute in this NEE an attribute describing if the NEE can be terminated by any process an attribute describing seconds of IDLE time prior to termination of the NEE an attribute describing if NEE is to be terminated upon the termination of owner The NEEM searches the REGISTERED ATTRIBUTE entries for an environment satisfying the REQUESTED ATTRIBUTES set forth by the Application Process. When a match has been found, then the NEEM will establish a shell on the associated computer system to execute the requests of the Application Process. The newly created environment then becomes an ACTIVE NEE, and is added to the ACTIVE NEE List maintained by the NEEM.

Note that if the REQUESTED ATTRIBUTES can be satisfied by an ACTIVE NEE with a PUBLIC NEE ATTRIBUTE, then the NEEM will simply alias the specified logical name with the previous specified logical name of the current ACTIVE NEE satisfying the request. The reference count associated with this ACTIVE NEE is then incremented.

Figure 8:
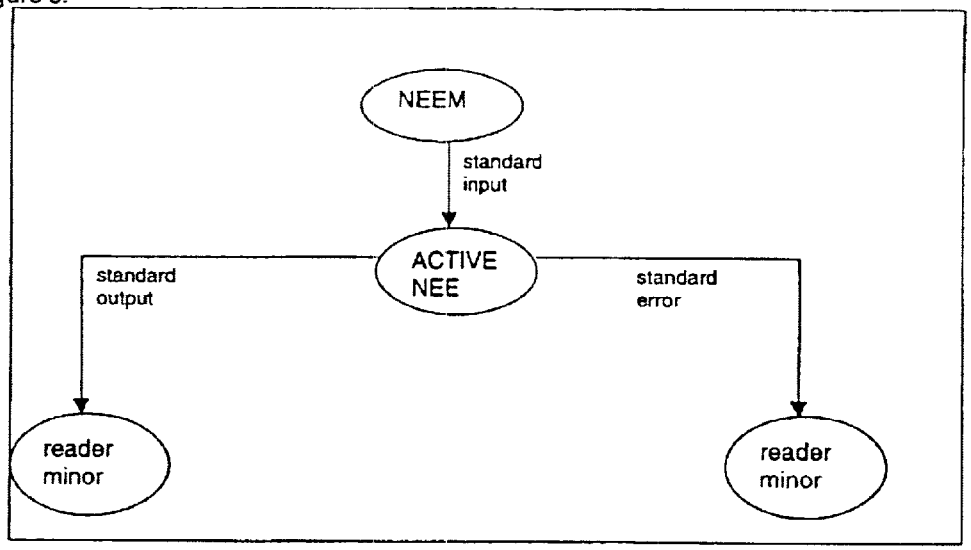
FIG. 8. Diagram showing Active NEE Takes Input from NEEM, Output Read by Minor Service Reader Threads.

Just prior to executing the shell Application Process associated with a new ACTIVE NEE, the NEEM will arrange for the standard input, the standard output, and the standard error file descriptors to be redirected to/from the NEEM itself. In this manner, the NEEM will be able to appropriately redirect all I/O requests on this file descriptors appropriately. The NEEM will also establish Minor Service Reader/Writer threads to read the standard output and standard error file descriptors and to redirect this output to the appropriate Application Process making a request to execute in the ACTIVE NEE. This is shown in FIG. 8.

Using a Named Execution Environment

An Application Process can request the NEEM to execute a request in a specific NEE by specifying the logical name of the NEE. The NEEM will look up the logical name in its ACTIVE NEE List and will send the request to that named environment. At this point, the Application Process is considered ATTACHED to the logically named NEE and can read its standard output and its standard error through the NEEM. When the NEEM determines that the request has completed, the NEEM will automatically DETACH the Application Process from the logically named NEE.

Using a standard Application Programming Interface, the Application Process can read the standard output of the logically named NEE to which it is ATTACHED. This is accomplished by the Minor Service Reader/Writer Thread of the NEEM that is reading the actual standard output of the NEE. It will send the standard output to the Application Process. Likewise, the Minor Service Reader/Writer Thread of the NEEM which reads the actual standard error will send the standard error output to the Application Process.

There are a series of commands understood by the NEEM through which the Application Process can control the use of a logically named NEE. These include:

1. EXECUTE: the Application Process specifies a request to be executed in a logically named NEE. The logically-named NEE must have previously been created. Additional attributes can be specified to describe the characteristics of the execution itself. These include, but are not limited to:
   A. FOREGROUND: the request is to be executed in the foreground
   B. BACKGROUND: the request is to be executed in the background
   C. PERIOD: the request must complete within a specified time period
2. QUERY: the Application Process can query the NEEM for specified information related to ACTIVE, or INACTIVE logical environments.
3. REDIRECT: the Application Process owner of the logically named NEE can request that the standard input, standard output, and/or the standard error output be redirected from the logically named NEE to another NEE.
4. DUPLICATE: the Application Process can request that the NEEM make a duplicate copy of a specified logically named NEE. The Application Process specifies a new logical name for the duplicate environment.
5. SUSPEND: the Application Process owner of the specified logically named NEE can request the NEEM to suspend subsequent requests for this NEE. All requests remain pending until the NEE is either RESUMED, the pending requests are CANCELED, or, the NEE is terminated.
6. RESUME: the Application Process owner of the specified logically named NEE can request the NEEM to resume the previously suspended NEE. All pending requests of this NEE are then acted upon given the constraints of the EXECUTE command as described above.
7. CANCEL: the Application Process owner of the specified logically named NEE can request the NEEM to cancel all pending requests for the specified NEE.

Terminating a Named Execution Environment

The owner of the Named Execution Environment can terminate the Named Execution Environment by sending a TERMINATE request to the Named Execution Environment Manager.

Threaded State Machine

The application program defines a set of states describing a state machine with exactly one start state, and potentially many different end states. The application then attaches a datum to the State Machine. The State Machine Thread Manager then administers the transition of this datum through the state machine.

For each defined state, there is a corresponding state thread. When a datum enters a particular state, the State Machine Thread Manager invokes the State Thread as a separate thread of execution. The exiting value of this State Thread is then used to determine the next transition from the current state. In this manner, various datums may simultaneously be attached to the same Multithreaded State Machine and the State Machine Thread Manager will administer and synchronize their transitions simultaneously.

Finally, the State Machine Thread Manager provides a special "Error" state to which a datum will transition when the exiting value of the State Thread is undefined in the current state machine.

Example of Use of the Invention

Software construction is the process of compiling source code components to produce a binary representation. In this instance, a rule specification of the form:

target.sub.—name: prerequisite.sub.—list action is specified to show that a target is dependent on prerequisites. If one or more of the prerequisites are newer than the target, then the action is triggered to construct the target. Each prerequisite can be listed as a target of another rule. As an example, consider:

rule 1 A:B C concatenate B and C to construct A rule 2 B:b copy "b" to "B"

rule 3 C:c copy "C" to "C"

In this example, the rule to construct the target "A" shows it has a dependency on prerequisites "B" and "C". Note, however, that "B" is dependent on "b" according to the second rule, and that "C" is dependent on "c" based on rule 3. If "c" has changed since the last time "C" was constructed, then the action for rule 3 would be triggered to reconstruct C. Similarly, if "b" has changed since the last time "B" was constructed, then the action for rule 2 would be triggered to reconstruct B. Note that the action for rule 2 and the action for rule 3 could in fact occur simultaneously since there are no other dependencies on these rules. After rule 2 and rule 3 has completed, then rule 1 can continue.

Here, if "B" or "C" has changed since the last time "A" has been constructed, then the action for rule 1 will be triggered to reconstruct A.

Using a procedural language, the algorithm to provide this service can be specified as shown in FIG. 11 Using a state machine representation, the same algorithm would be given according to FIGS. 12A and 12B.

Having thus described the invention, what it is desired to claim and thereby protect by Letters Patent is: What is claimed is:

1. In the Internet network, a method for a service provider to provide a software service to users, the method comprising a multiplicity of computers, each computer having a communication device, and each computer having an operating system with interfaces for communication connectivity and synchronization, comprising:
   a) a user process of a user computer having access to the Internet through a physical communication provider, uses an Internet protocol to connect to a service provider process executing on a service provider computer, the service provider process includes replacing a first minor service with a second minor service, wherein the first minor service communicates state information to the user process, and the user process communicates the state information to the second minor service;
   b) the user process sends a communication to a service provider process;
   c) the user process receives a response from the service provider process;
   d) the user process disconnects from the communication with the service provider process; and
   e) the user is billed for the service.

2. The method of claim 1 wherein the user process causes an instance of the service to begin execution.

3. The method of claim 1 wherein the service provider process is a dynamically configured service which provides a primary service and one or more minor services.

4. The method of claim 3 wherein:
   a minor service is provided by a third process of a third computer of the network; and the user process communicates with the minor service.

5. The method of claim 1 wherein the service provider process includes an operation specification which includes information representative of an operation to be performed immediately.

6. The method of claim 1 wherein the service provider process includes an operation specification which includes information representative of an operation to be performed at intervals of time.

7. The method of claim 1 wherein the service provider process includes an operation specification which includes information representative of an operation to be performed as the result of communication of a specified event to the user process.

8. The method of claim 1 wherein the service provider process includes an operation specification to locate a minor service.

9. The method of claim 1 wherein the service provider process includes an operation specification to load a minor service.

10. The method of claim 1 wherein the service provider process includes an operation specification to execute a minor service.

11. The method of claim 1 wherein:
   the service provider process includes establishing a communication channel with a minor service; and the user process communicates with the minor service.

12. The method of claim 1 wherein the service provider process includes suspending the execution of a minor service.

13. The method of claim 1 wherein the service provider process includes resuming the execution of a minor service.

14. The method of claim 1 wherein the service provider process includes unloading a minor service.

15. The method of claim 1 wherein the service provider process provides notification that an event has occurred.

16. The method of claim 1 wherein the user process and the second process communicate using the Internet Protocol.

17. The method of claim 1 wherein the request is sent using an industry standard protocol.

18. The method of claim 1 wherein the network is a commercial network.

19. The method of claim 3 wherein a component of software provides the minor service.

20. The method of claim 19 wherein the component of software is stored in a shared library.

21. The method of claim 20 wherein the component of software is dynamically loaded.

22. The method of claim 19 wherein a thread of execution is created to execute the component of software.

23. The method of claim 3 wherein a process executing on a third computer provides a minor service.

24. In the Internet network comprising a multiplicity of computers, each computer having a communication device, and an operating system with interfaces for communication connectivity and synchronization, a method for a first process of an end user computer to configure a service, the method comprising:
   the first process uses an operating system interface to receive a communication from a second process of a second computer of the network, the communication including a specification for the use of at least one service;
   the first process disconnects from the communication with the second process; and
   the first process accesses the specification and configures the use of said service.

25. The method of claim 24 wherein the specification is communicated to the first process according to a protocol.

26. The method of claim 25 wherein the second process executes on a second computer of the network.

27. The method of claim 26 wherein the specification is received using the Internet Protocol.

28. The method of claim 24 wherein the first process causes an instance of the service to begin execution in a separate address space.

29. The method of claim 24, wherein the first process is an application service providing a primary service and one or more minor services.

30. The method of claim 24 further comprising the use of a third process of a third computer of the network, the third process providing a minor service, wherein the first process communicates with the third process when the first process requires the use of the service provided by the third process.

31. The method of claim 24 wherein the specification includes information representative of an operation to be performed immediately.

32. The method of claim 24 wherein the specification includes information representative of an operation to be performed at a specified time, which may be an interval.

33. The method of claim 24 wherein the specification includes information representative of an operation to be performed as the result of an event.

34. The method of claim 24 wherein the specification includes information for locating a service.

35. The method of claim 24 wherein the specification includes instructions for loading a service.

36. The method of claim 24 wherein the specification includes instructions to execute a service.

37. The method of claim 24 wherein the specification includes at least one specification for communicating with a service.

38. The method of claim 24 further comprising converting at least a portion of the communication from a first data type to a second data type.

39. The method of claim 24 wherein the specification includes information for replacing a first service with a second service.

40. The method of claim 24 wherein the specification includes information for suspending the use of a service.

41. The method of claim 24 wherein the specification includes information for resuming the use of a service.

42. The method of claim 24 wherein the first process and the second process communicate using an industry standard protocol.

43. The method of claim 24 wherein the first process communicates using a hierarchy of protocols.

44. The method of claim 24 wherein the service is provided by a component of software stored in a shared library, and the first process uses one or more operating system interfaces to dynamically load the software into the address space of the process.

45. The method of claim 44 wherein a thread of execution is created to execute the component of software.

46. The method of claim 24 further comprising the use of a communication to initialize the state of the service.

47. The method of claim 24 further comprising registering the service as a communication point.

48. In the Internet network, a method for a service provider to provide a service to an end user of a user computer having access to the Internet through a physical communication provider, the method comprising a multiplicity of computers, each computer having a communication device, and each computer having an operating system with interfaces for communication connectivity and synchronization, comprising:

a first process of a user computer connects to a service provider process executing on a service provider computer;

the first process sends a request to the service provider service process, the request including criteria for selecting a service, and in response to receiving and accessing the communication, the service provider service provides the requested service;

the first process receives a response from the service provider process;

the first process disconnects from the communication with the service provider process; and billing for the service.

49. The method of claim 48 wherein the service provider service selects at least one service satisfying the criteria, and causes an instance of the service to begin execution.

50. The method of claim 48 wherein the service provider service dynamically configures the service as providing a primary service and one or more minor services.

51. The method of claim 48 further comprising the service provider process communicating with a second service, in order to provide the service to the first process.

52. The method of claim 48 further comprising the use of a specification containing information representative of an operation to be performed immediately.

53. The method of claim 48 further comprising the use of a specification containing information representative of an operation to be performed at a specified time, which may be an interval.

54. The method of claim 48 further comprising the use of a specification containing information representative of an operation to be performed upon notification of an event.

55. The method of claim 48 further comprising the use of a specification to locate a service.

56. The method of claim 48 further comprising the use of a specification to load a service.

57. The method of claim 48 further comprising the use of a specification to execute a service.

58. The method of claim 48 further comprising:

the service provider service communicating communications from the user process to the service; and the service provider service communicating communications from the service to the user process.

59. The method of claim 48 further comprising suspending the use of a service.

60. The method of claim 48 further comprising resuming the use of a previously suspended service.

61. The method of claim 48 further comprising replacing a first service with a second service.

62. The method of claim 48 further comprising the use of state information to initialize a service.

63. The method of claim 48 further comprising unloading a previously loaded service.

64. The method of claim 48 further comprising the use of at least one event to cause an operation to be performed.

65. The method of claim 48 wherein at least one input type understood by the requested service is not public information.

66. The method of claim 48 further comprising the service provider providing at least one component of software used by the first process.

67. The method of claim 48 wherein the criteria includes information to identify the user.

68. The method of claim 48 further comprising the use of a multiplicity of directory services.

69. The method of claim 48 wherein a component of software provides a service.

70. The method of claim 48 wherein the service provider process uses one or more operating system interfaces to dynamically load a component of software into address space of the first process.

71. The method of claim 70 wherein a thread of execution is created to execute the component of software.

72. The method of claim 48 wherein the service provider process communicates with a second service provider process on a third computer to provide the service.

73. The method of claim 48 further comprising the use of a service to provide an expanded description of a named representation.

74. The method of claim 48 further comprising the use of a service to associate a named representation with an entity providing a service.

75. The method of claim 48 further comprising the use of a hierarchy of protocols.

76. In the Internet a method for a service provider application service process executing on a service provider computer having an operating system with interfaces for communication connectivity and synchronization, and a communication device, to be responsive to a communication from a user application service process executing on an end user computer, the end user computer having an operating system with interfaces for communication connectivity and synchronization, a communication device, and physical communication to the Internet provided by a communication provider, the method comprising:

the service provider application service process receives a request communication communicated from the user application service process, the communication including information representative of criteria for selecting a service from a set of one or more registered services;

the service provider application service process accesses the request communication and interacts with the communication to select at least one accessible service satisfying the criteria;

the service provider application service process sends a response communication including information representative of the at least one accessible service, the response including the connectivity required to use the accessible service; and the service provider application service process disconnects from the communication with the user application service.

77. In the Internet a method for a service provider application process executing on a service provider computer to be responsive to a communication from a user application process executing on an end user computer, the end user computer having an operating system with interfaces for communication connectivity and synchronization, a communication device, and physical connection to the network provided by a communication provider, the method comprising:

a) the service provider service application process receives a request communication communicated from the user application process, the communication including one or more unique identifiers assigned to the user during a subscription process;

b) the service provider application process accesses the request communication, validates the user, locates at least one accessible service, provides the requested service; and c) the service provider application process disconnects from the communication with the user application process.

78. The method of claim 77 wherein the communication provider is at least one of:

a Regional Bell Operating Company, a Long Distance Carrier, a Cellular Network provider, a signal-based communication provider, a wireless communication provider, or a cable industry communication provider.

79. In the Internet a method for a service provider application process executing on a service provider computer to be responsive to a request from a user application process executing on an end user computer, the end user computer having an operating system with interfaces for communication connectivity and synchronization, a communication device, and physical communication provided by a communication provider, the method comprising:

the service provider application process receives a request communication communicated from the user application process, the communication including information representative of criteria for selecting a service from a set of one or more registered services;

the service provider application process accesses the request communication and selects at least one accessible service satisfying the criteria; and and in response thereto, the service provider application process provides the requested service.

80. The method of claim 79 wherein at least one input type understood by the service provider application process is not public information.

81. In the Internet, a method for a first service provider application service process executing on a first service provider computer to be responsive to a communication communicated from a second application service of a second computer of the network, the method comprising:

the first service provider application service receives a communication, and accesses the communication, the communication containing information representative of a request for a service;

and in response thereto, the first service provider application process uses one or more operating system interfaces to dynamically configure a service to satisfy the request.

82. The method of claim 81 wherein at least one input type understood by the service provider application process is not public information.

83. In the Internet, a method comprising:

a service provider application service executing on a service provider computer uses at least one operating system interface to receive a communication communicated from a user application process of an end user computer, said communication representative of a request for a service when an event occurs;

and in response thereto, the service provider process accesses the communication, records the request and provides a response communication intended for the user process; and in response to the recorded event occurring, the service provider process provides the requested service.

84. The method of claim 83 wherein at least one input type understood by the service provider application process is not public information.

85. A system for a service provider to extend the service of an application program sold to an end user, for use with an end user computer, the end user computer having an operating system with interfaces for communication connectivity and synchronization, a communication device, and physical communication connectivity provided by a communication provider, the system comprising:

an application program configured to use one or more operating system interfaces for communication connectivity and synchronization to communicate with, and be responsive to received communications from, a service provided by the service provider if the service is available; and a service configured for use on a service provider computer to be responsive to communications received from an application process, interact with the communication, and to send a response to the application process wherein the application process corresponds to said application program.

86. A system for a service provider to extend the services of software sold to an end user, for use with an end user computer, the end user computer having an operating system with interfaces for communication connectivity and synchronization, a communication device, and communication connectivity provided by a communication provider, the system comprising:

software configured by the service provider to use one or more operating system interfaces for communication connectivity and synchronization to communicate with, and be responsive to received communications from, the service provided by the service provider if the service is available, the received communication including instructions for using an accessible service; and a service configured for use on the service provider computer to be responsive to communications received from an application process, interact with the communication, and to send a response to the application process to use an accessible service wherein the application process corresponds to said software.

87. The system of claim 86 wherein the accessible service provides a minor service to said application software, and wherein the accessible service is at least one of:
- a function,
- a thread,
- a process,
- a communication point providing a service,
- a component of software,
- a dynamically loadable object,
- an operating system service, or
- a service provided by at least one statement executed by a shell.

88. A system for a service provider to extend the services of software sold to an end user, for use with an end user computer, the end user computer having an operating system with interfaces for communication connectivity and synchronization, a communication device, and communication connectivity provided by a communication provider, the system comprising:

an application program configured to use a protocol to send a communication to, and receive a communication from, a service provider service if the service is available; and a service configured for use on a service provider computer to be responsive to communications received from an application process, to interact with the communication, and to send a response to the application process including one or more statements for using at least one service, wherein the application process corresponds to said application program.

89. The system of claim 88 wherein the accessible service provides a minor service to said application process, and wherein the accessible service is at least one of
- a function,
- a thread,
- a process,
- a communication point providing a service,
- a component of software,
- a dynamically loadable object,
- an operating system service, or
- a service provided by at least one statement executed by a shell.

* * * * *